United States Patent [19]

Morin

[11] 4,383,258

[45] May 10, 1983

[54] TIME ENCODED SPATIAL DISPLAY

[75] Inventor: Richard J. Morin, San Diego, Calif.

[73] Assignee: The United States of America as represented by the Secretary of the Navy, Washington, D.C.

[21] Appl. No.: 168,988

[22] Filed: Jul. 14, 1980

[51] Int. Cl.³ .............................................. G01S 7/04
[52] U.S. Cl. ................................................. 343/5 SC
[58] Field of Search ..................................... 343/5 SC

[56] References Cited

U.S. PATENT DOCUMENTS

| | | | |
|---|---|---|---|
| 3,765,018 | 10/1973 | Heard et al. | 343/5 SC |
| 3,810,174 | 5/1974 | Heard et al. | 343/5 SC X |
| 3,838,420 | 9/1974 | Heard et al. | 343/5 SC |
| 4,002,827 | 1/1977 | Nevin et al. | 343/5 SC |
| 4,065,770 | 12/1977 | Berry | 343/5 SC |
| 4,099,179 | 7/1978 | Hofstein | 343/5 SC |
| 4,128,838 | 12/1978 | Brands et al. | 343/5 SC |
| 4,214,269 | 7/1980 | Parker et al. | 343/5 SC X |
| 4,305,073 | 12/1981 | Curry, Jr. et al. | 343/5 SC |

*Primary Examiner*—T. H. Tubbesing
*Attorney, Agent, or Firm*—Robert F. Beers; Ervin F. Johnston; Harvey Fendelman

[57] ABSTRACT

A time compressed radar display system for presenting to the operator radar return video which has been accumulated over a relatively long period of time in a very short time span, preferably at TV frame rates. A scan converter receives the radar position data in polar coordinate format and converts it to rectangular coordinate format. Each of the rectangular cells, resulting from the scan conversion, is provided with an address. The radar video is continuously converted from analog to digital. Memory and comparison logic are used for determining and storing the highest value of video data occurring in each of the data cells, during a predetermined number (n) of revolutions of the radar scanning antenna. Logic circuitry is also provided to determine and store the number of antenna revolutions over the most recent (n) scans of the antenna, in which the video level exceeded a predetermined threshold for each of the addressable cells. Additionally, the count of the last frame or antenna scan (within the most recent (n) antenna revolutions) in which the video level exceeded the threshold for each cell is stored. Output processing logic is provided which processes the highest video level for each cell, the number of times the threshold level was exceeded and the count of the last frame on which this threshold was exceeded for each data cell to generate a time compressed radar display picture.

8 Claims, 74 Drawing Figures

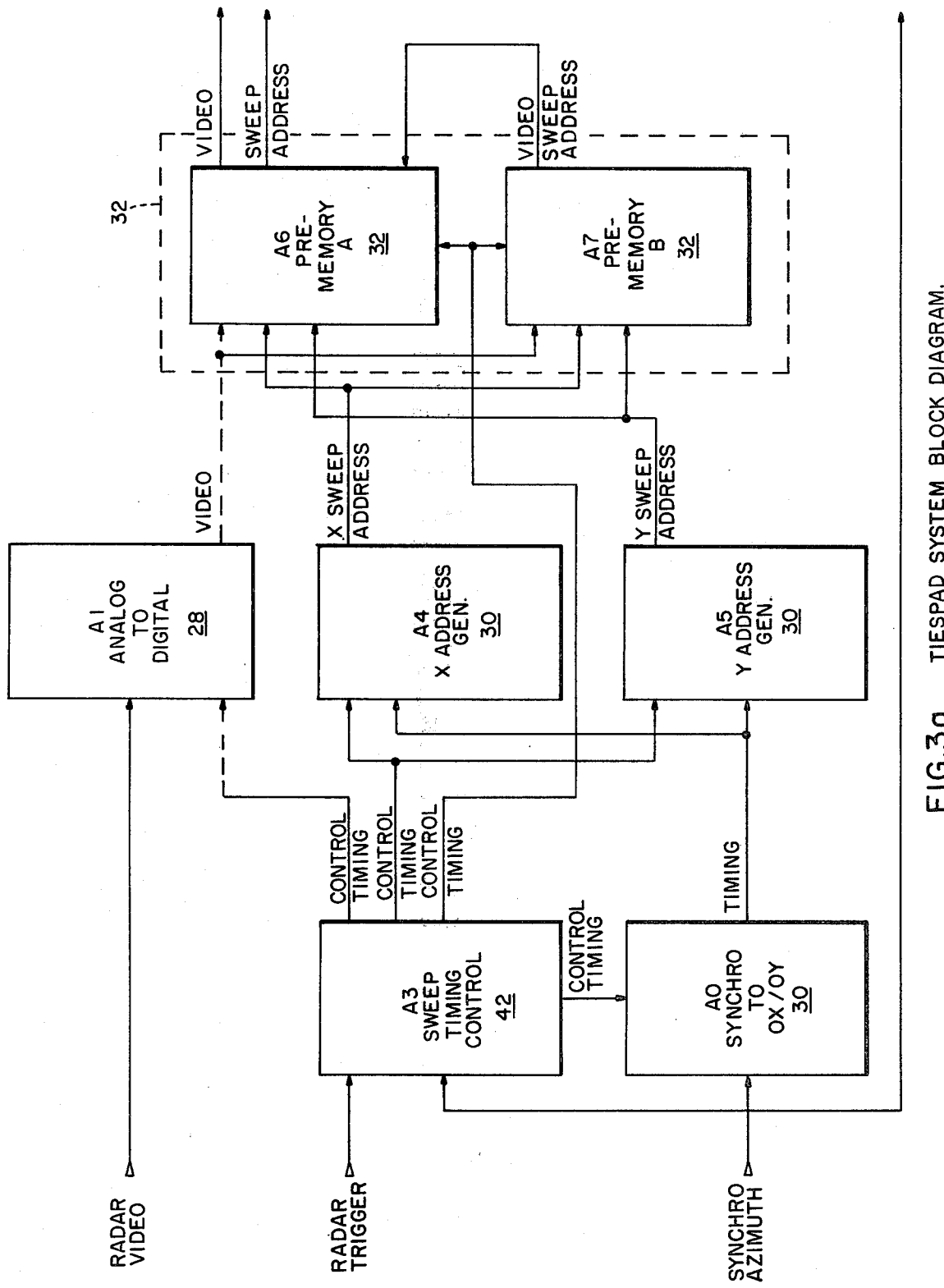
FIG.3a   TIESPAD SYSTEM BLOCK DIAGRAM.

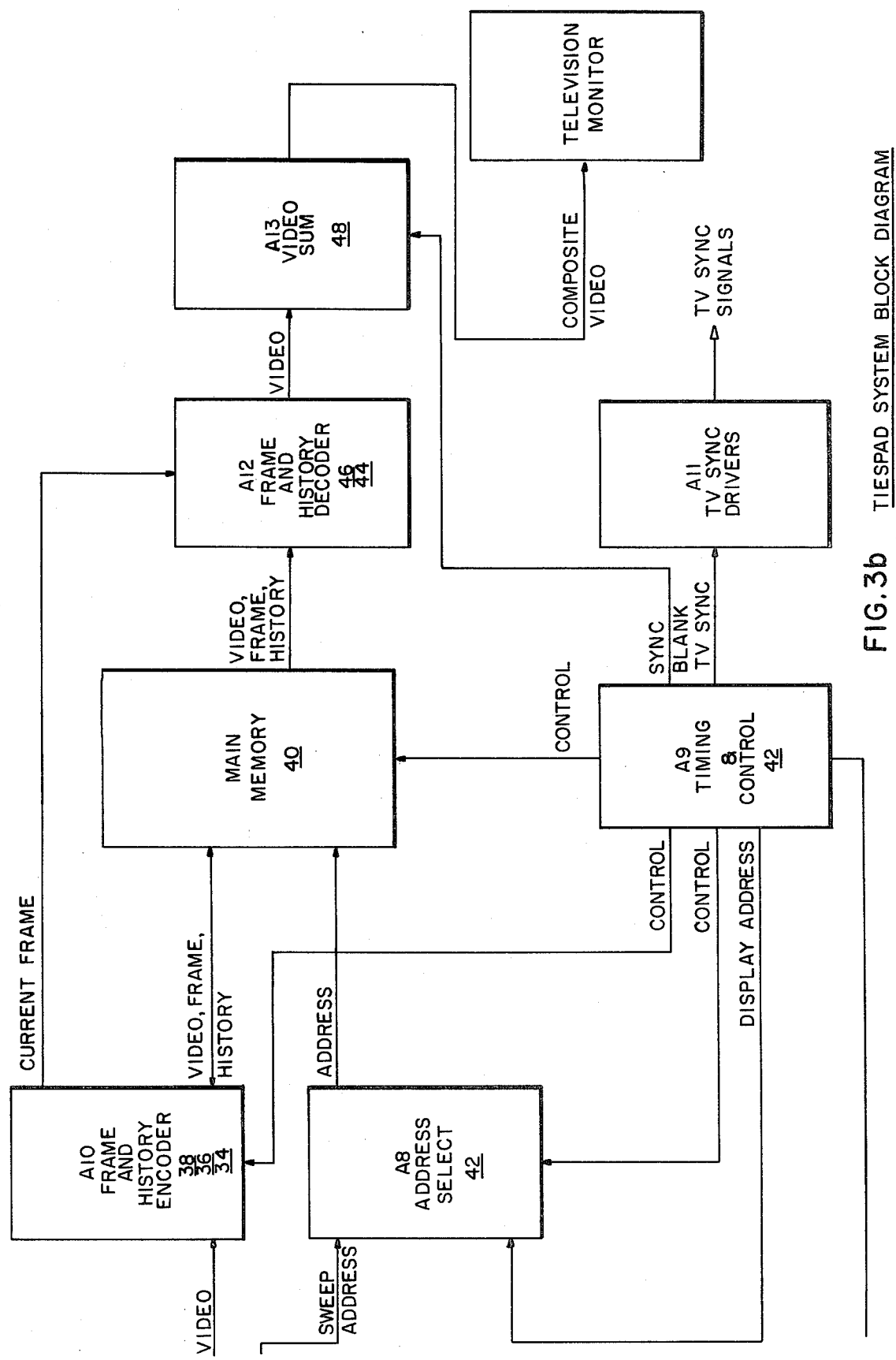
FIG.3b  TIESPAD SYSTEM BLOCK DIAGRAM

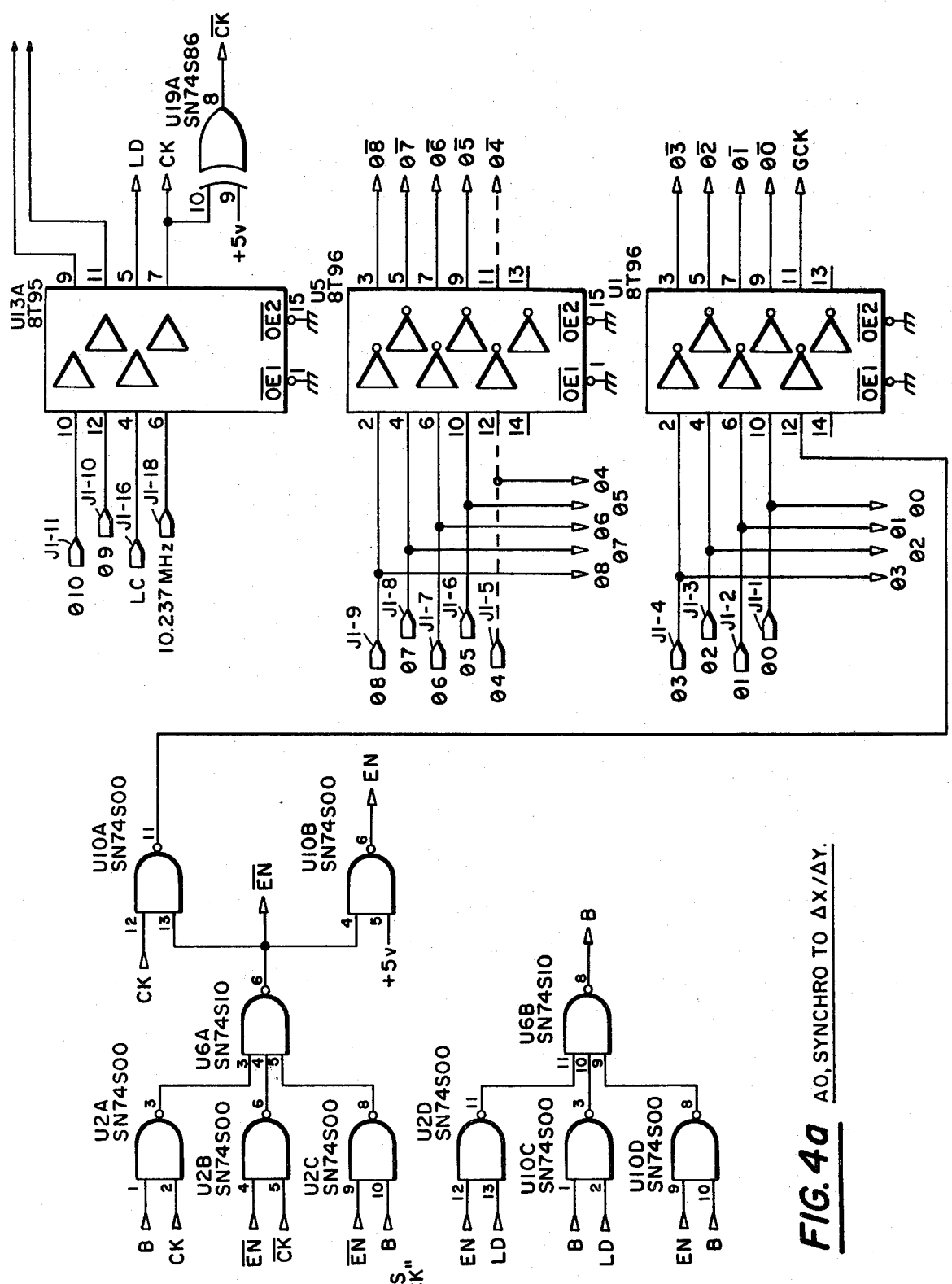
FIG. 4a  A0, SYNCHRO TO ΔX/ΔY.

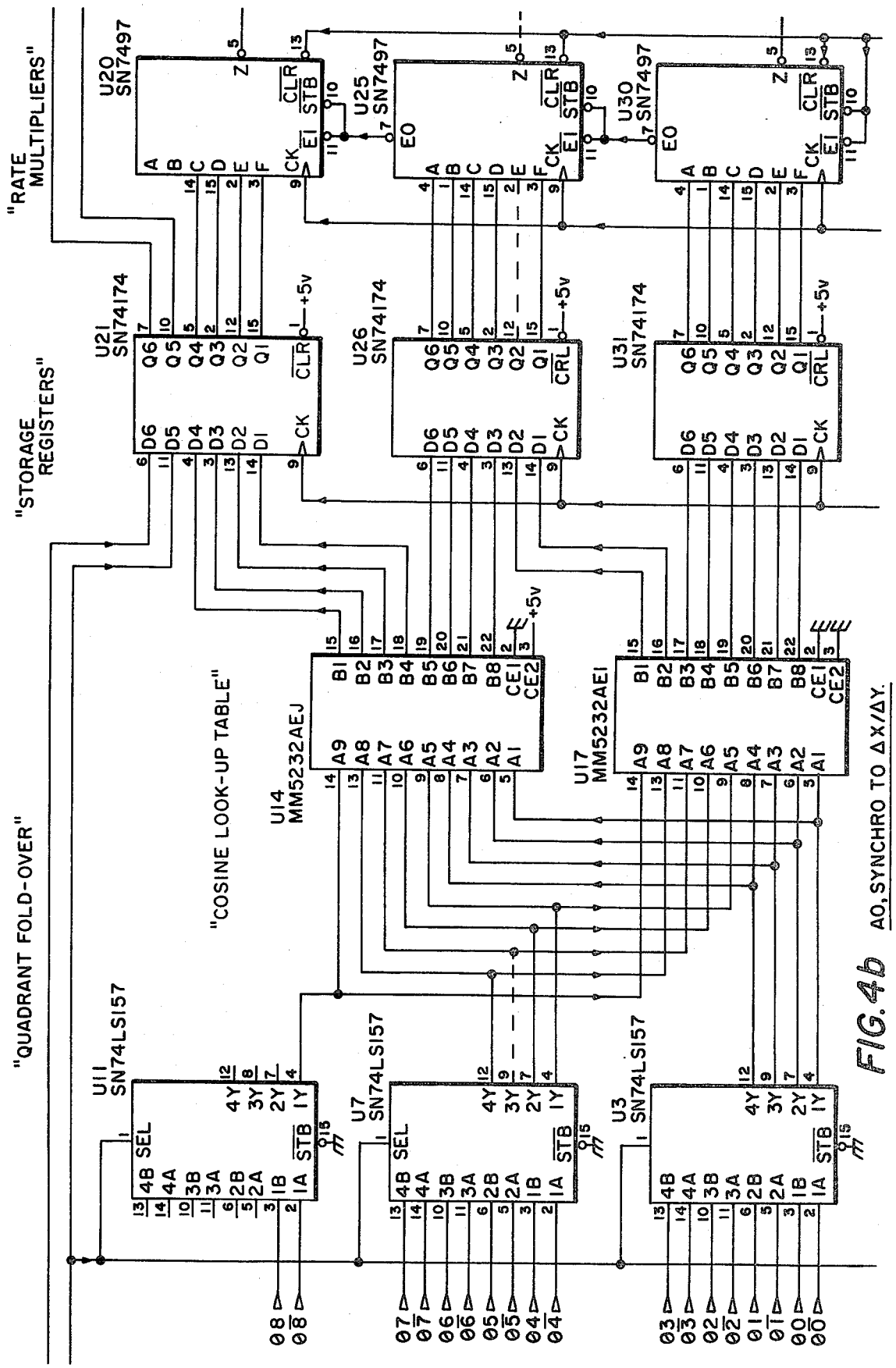
FIG.4b  A0, SYNCHRO TO ΔX/ΔY.

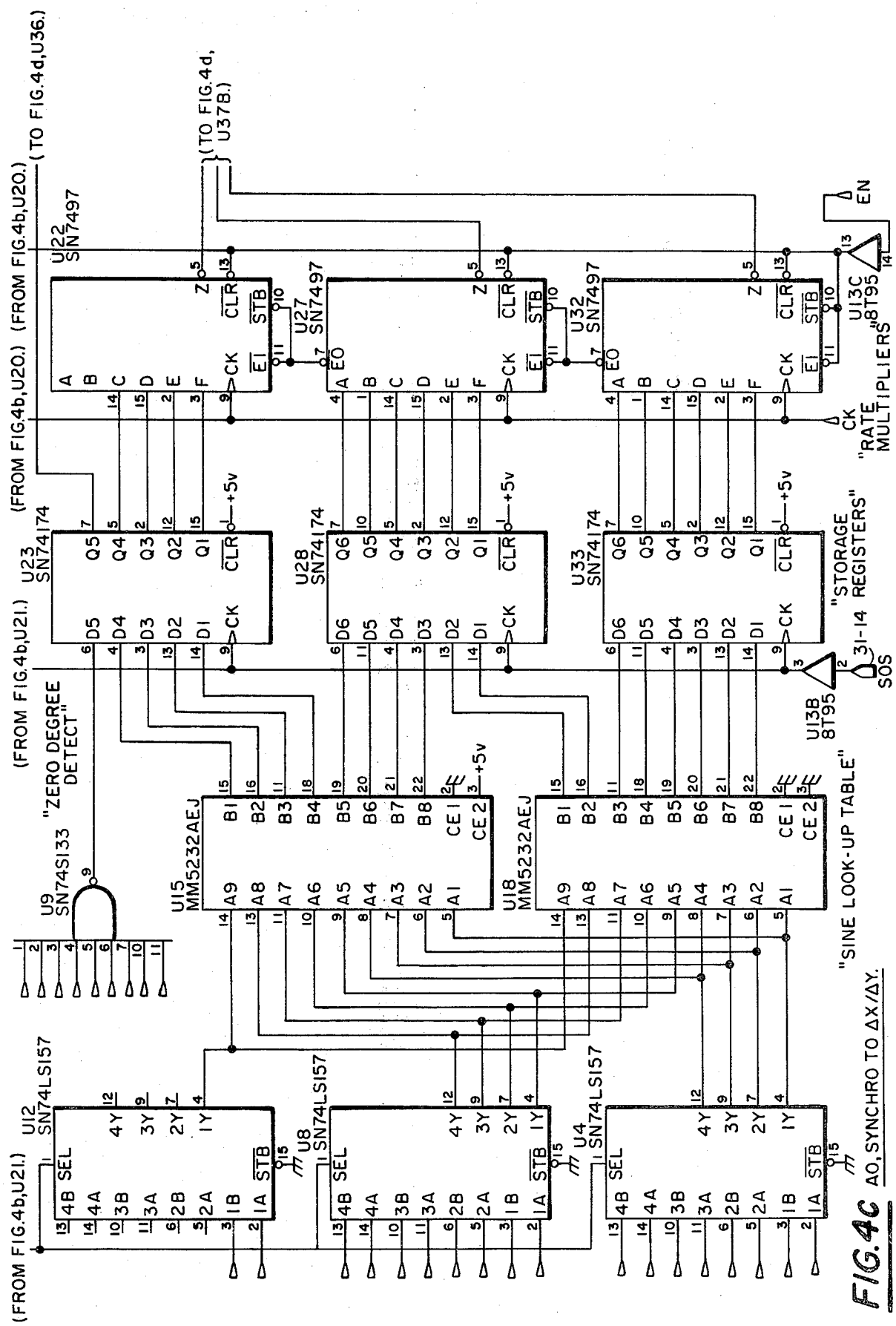

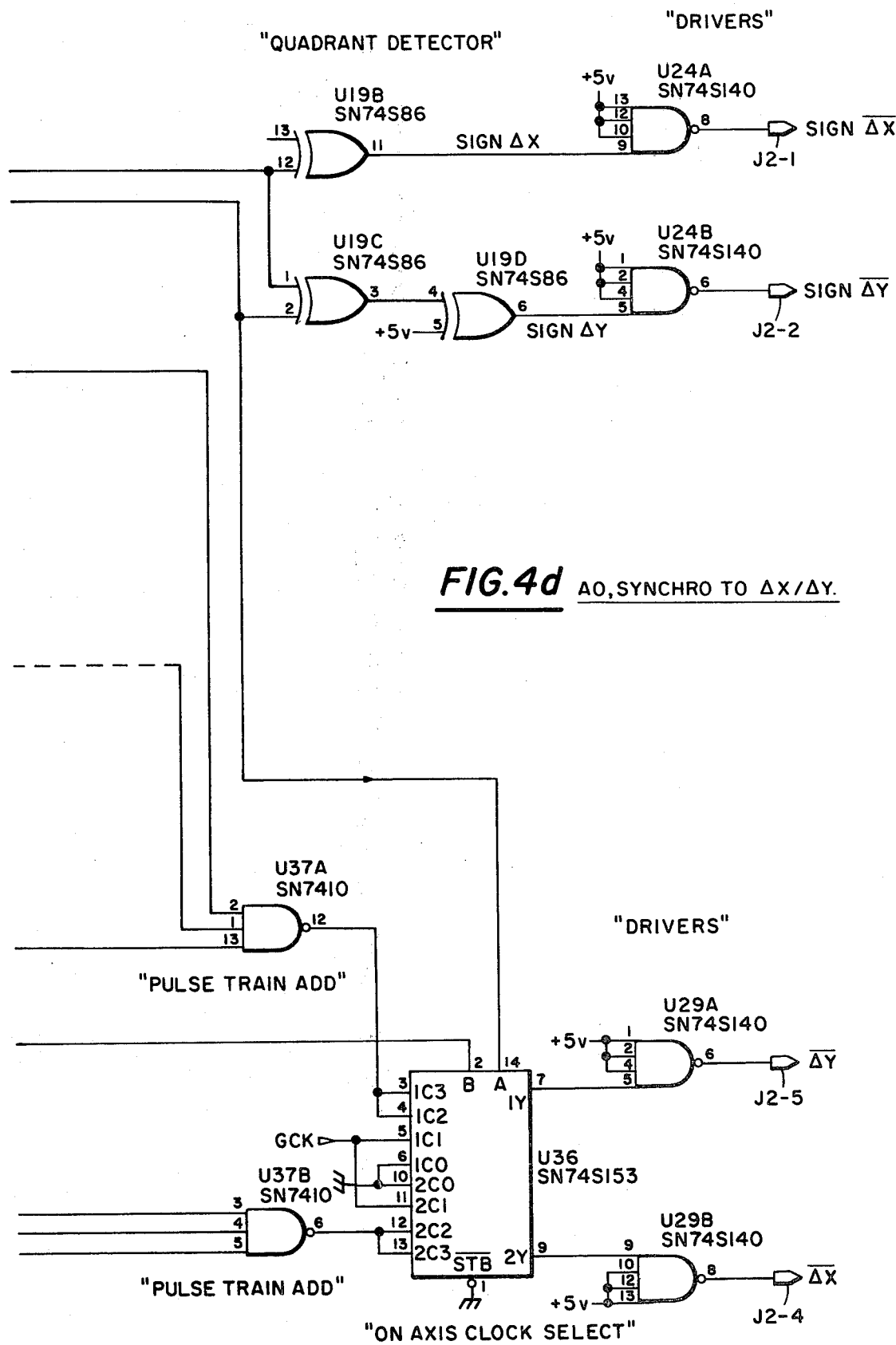
FIG.4d  AO, SYNCHRO TO ΔX/ΔY.

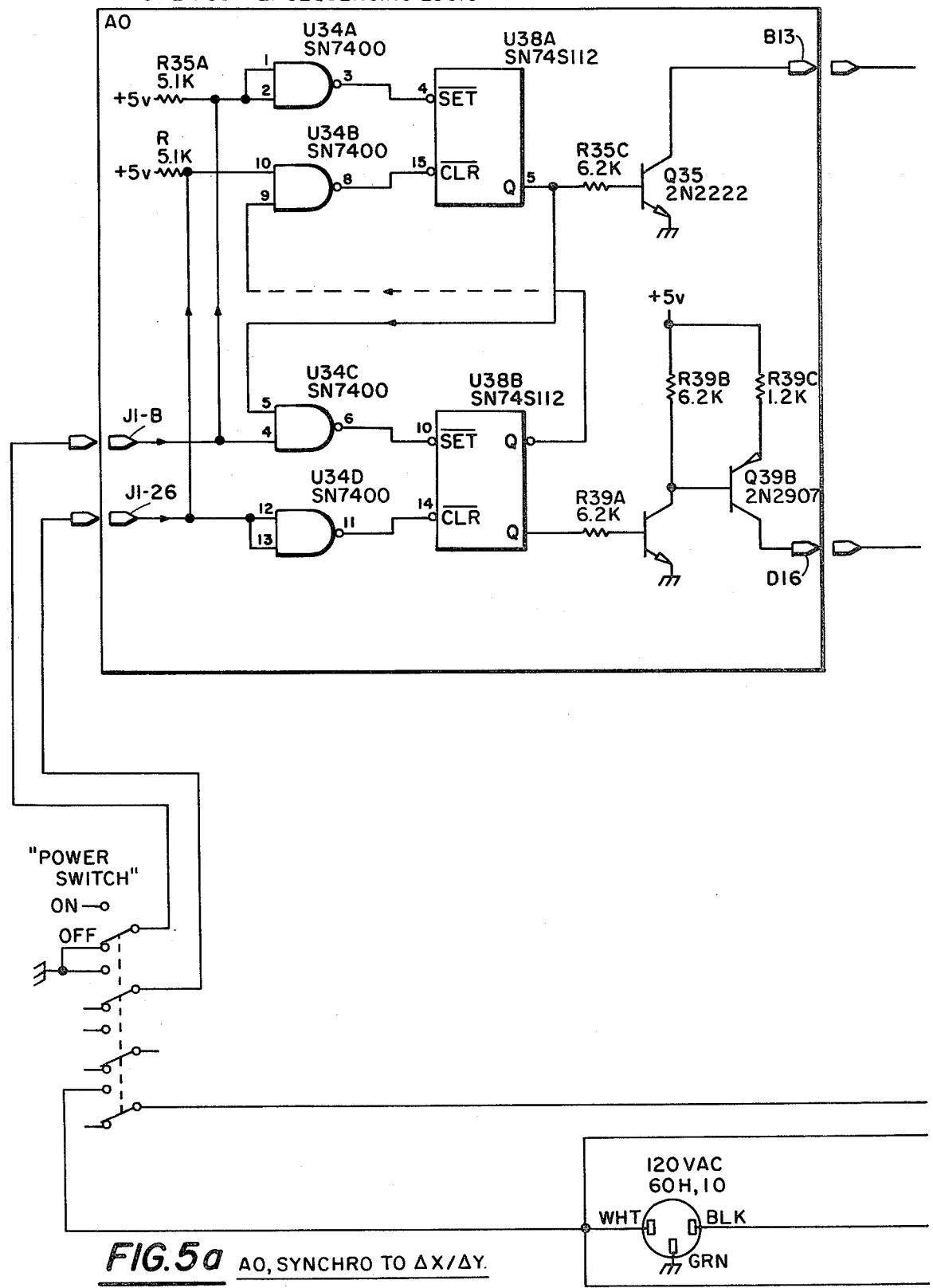
FIG.5a  AO, SYNCHRO TO ΔX/ΔY.

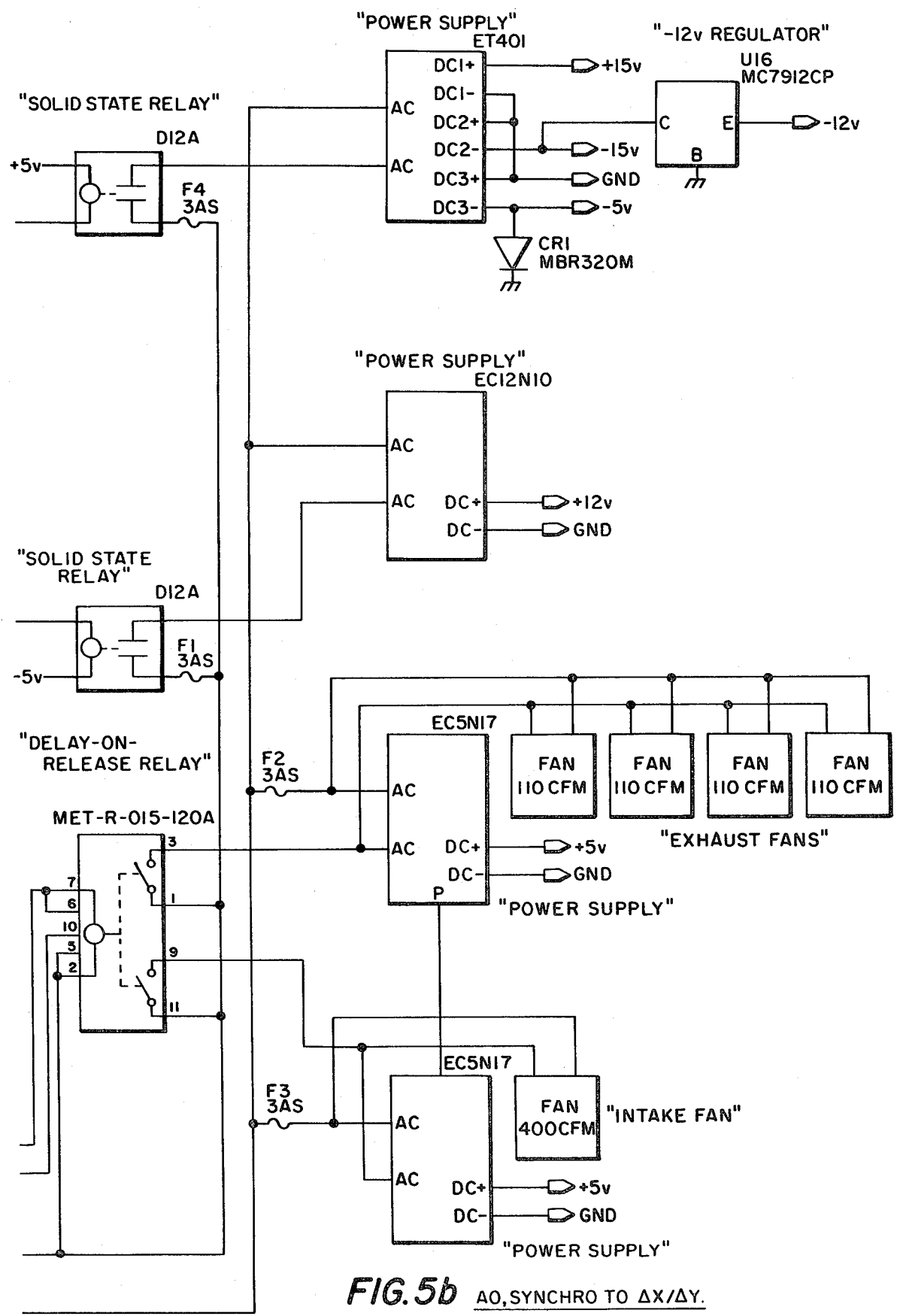
FIG. 5b  AO, SYNCHRO TO ΔX/ΔY.

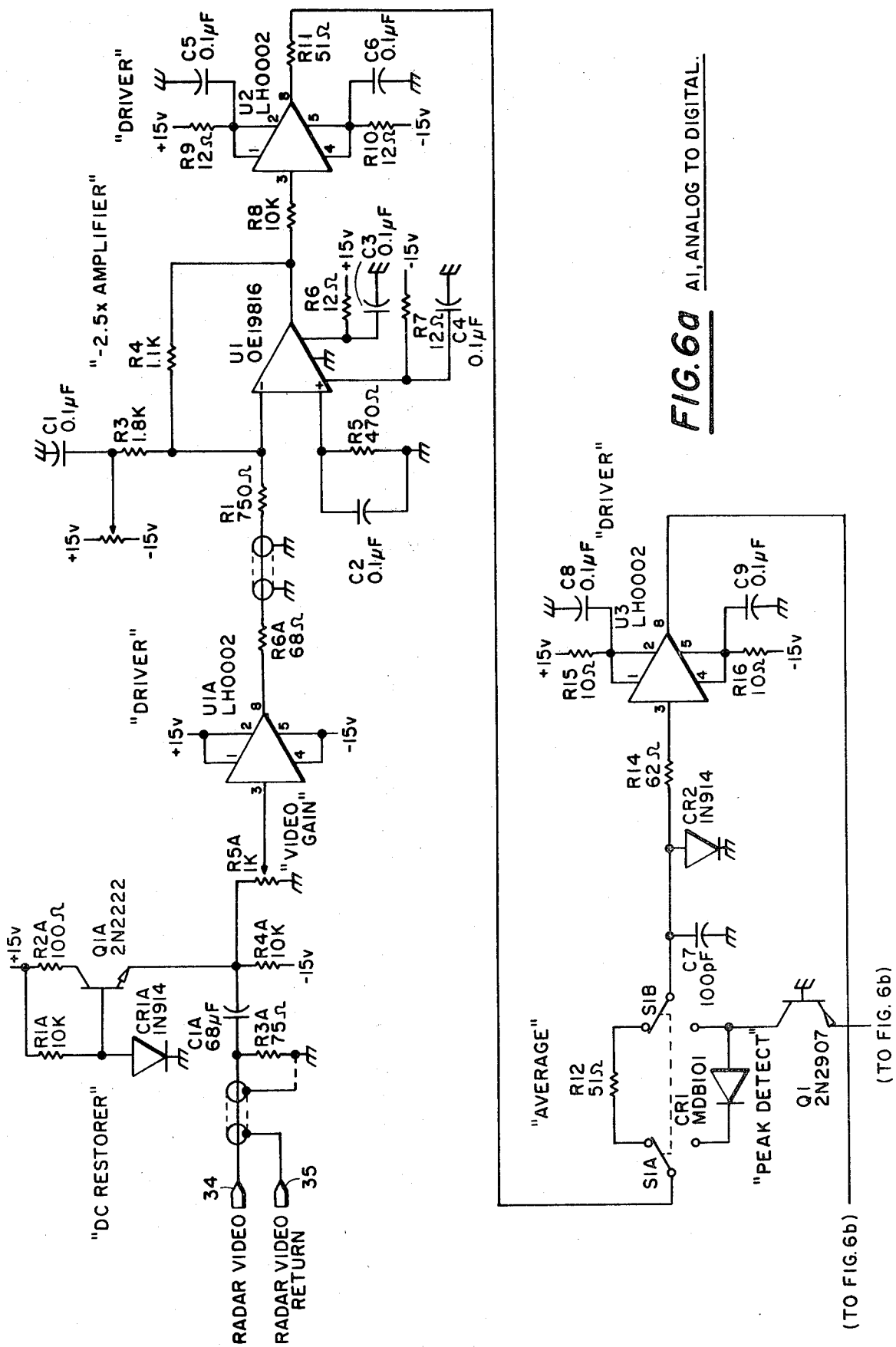
FIG. 6a  A1, ANALOG TO DIGITAL.

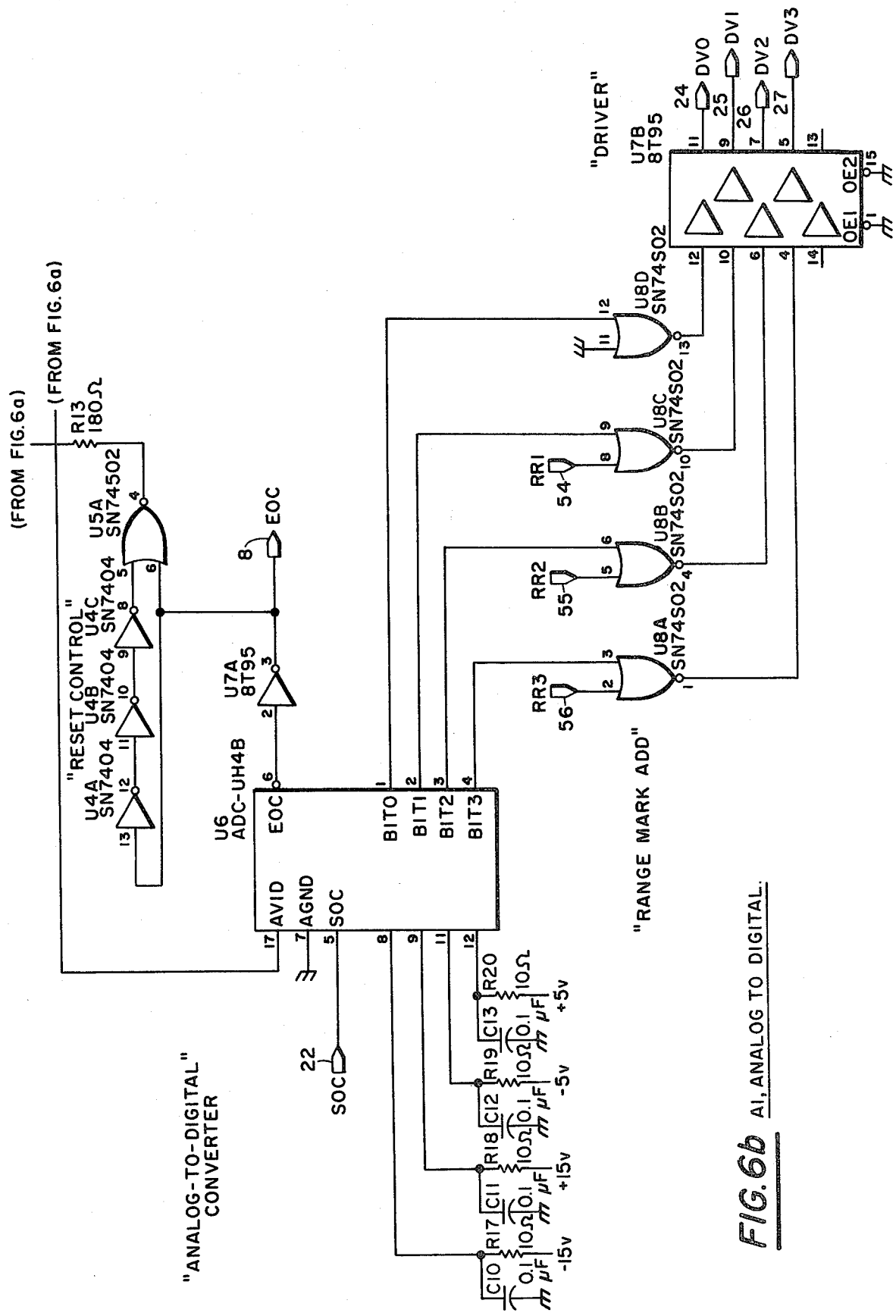

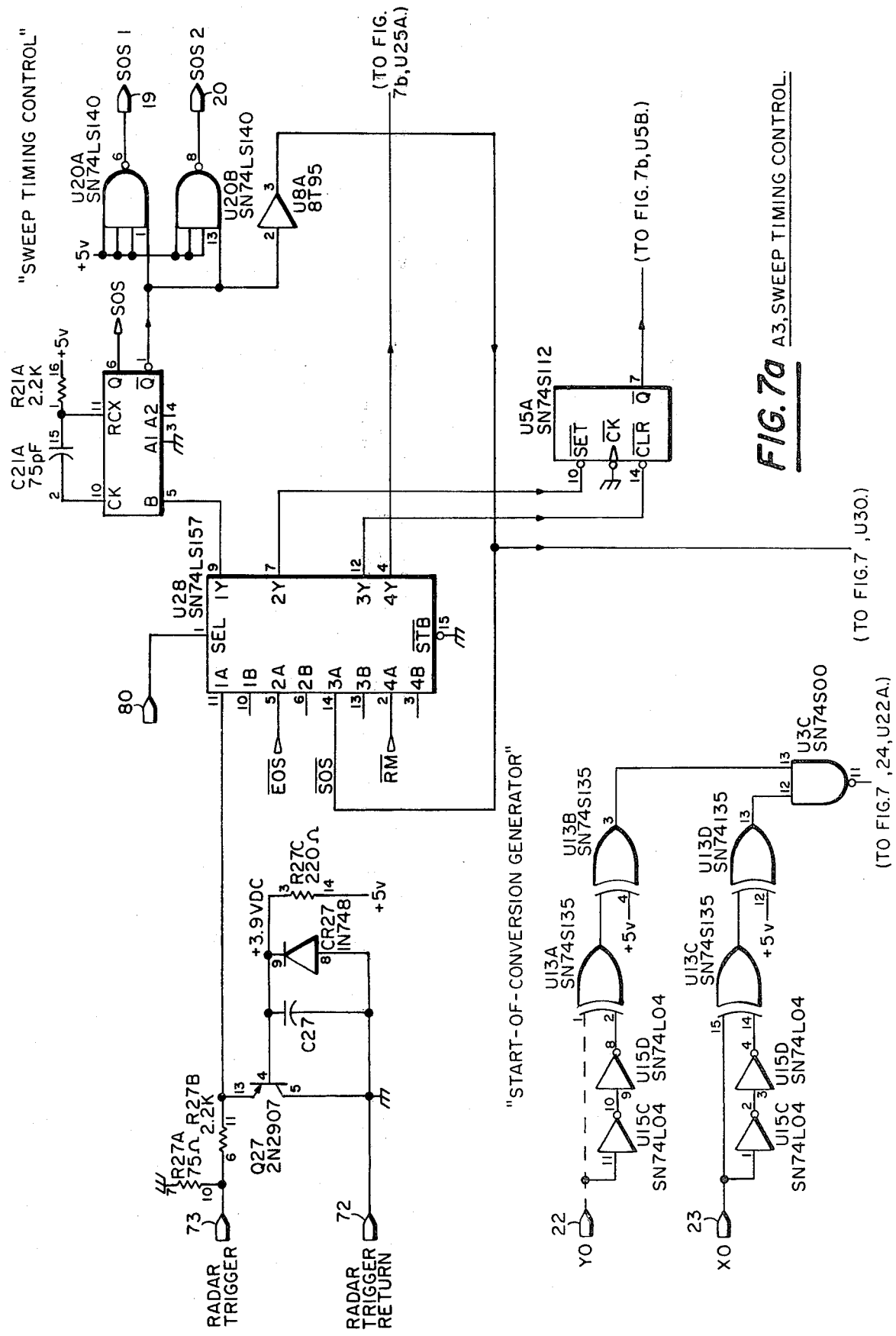
FIG. 7a A3, SWEEP TIMING CONTROL.

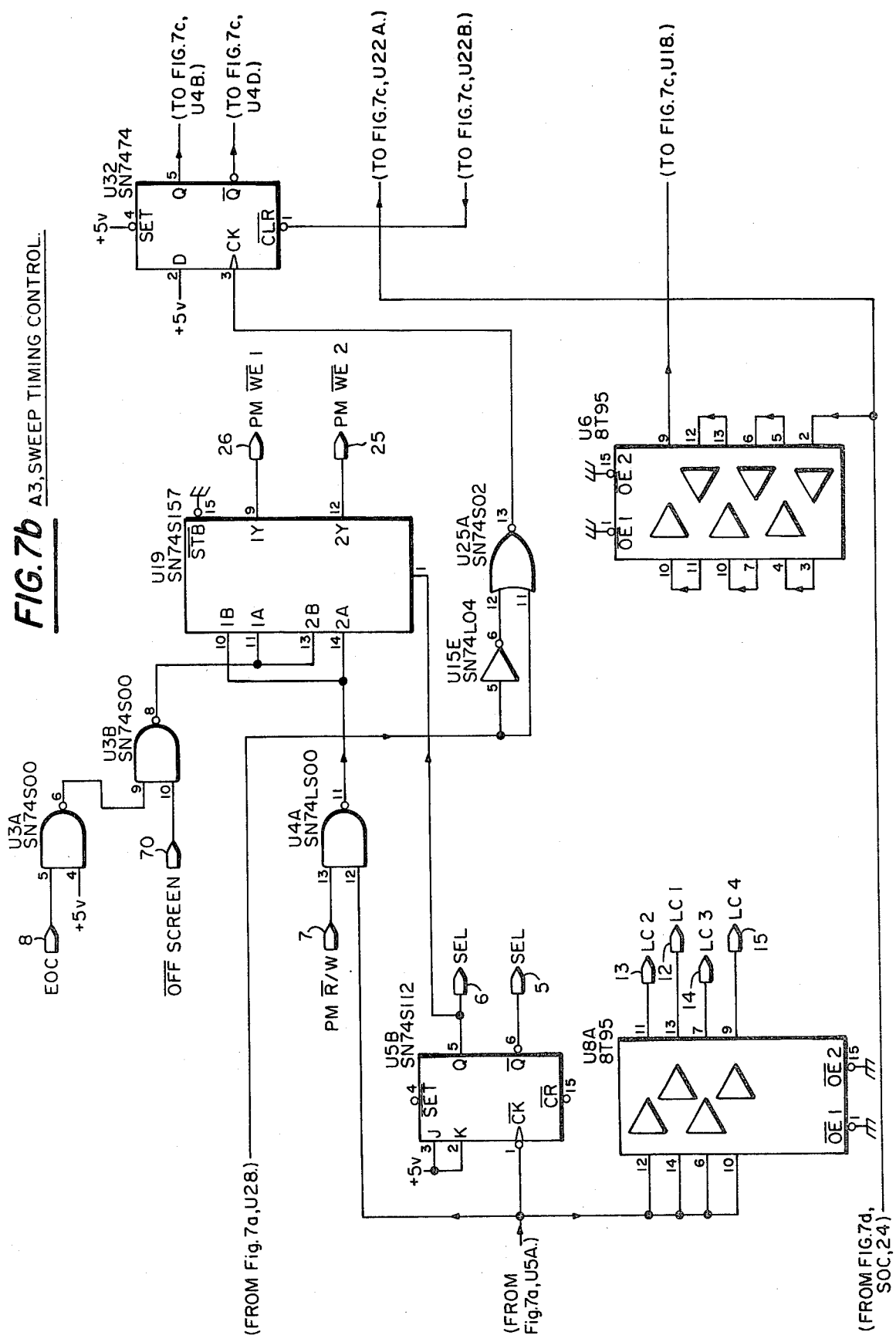
FIG.7b A3, SWEEP TIMING CONTROL.

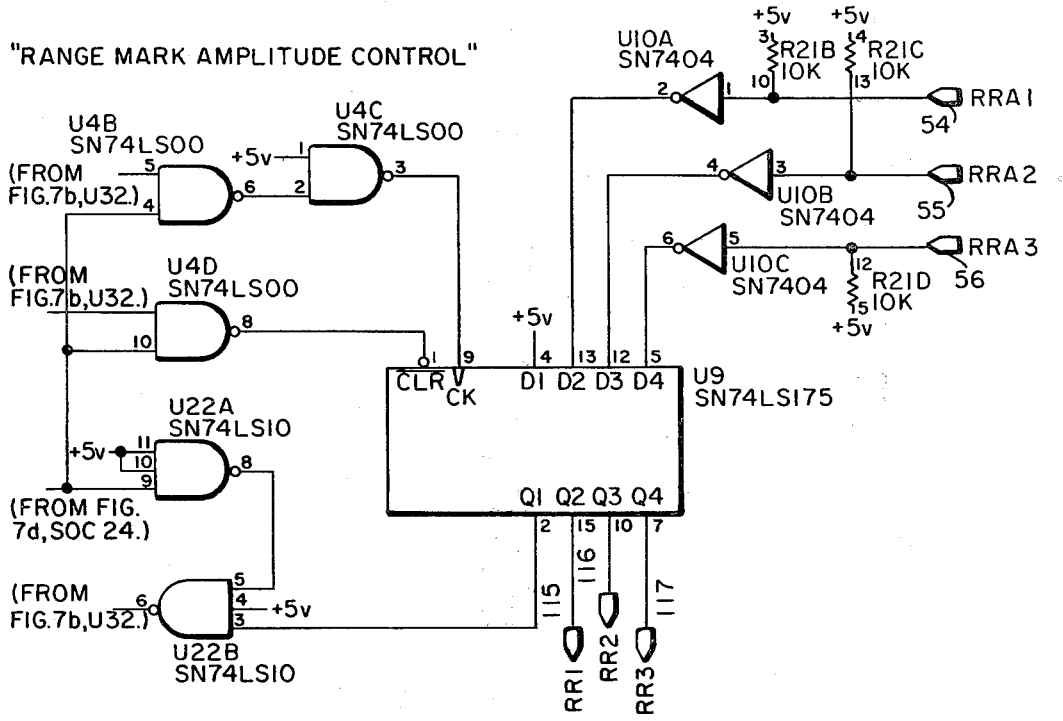
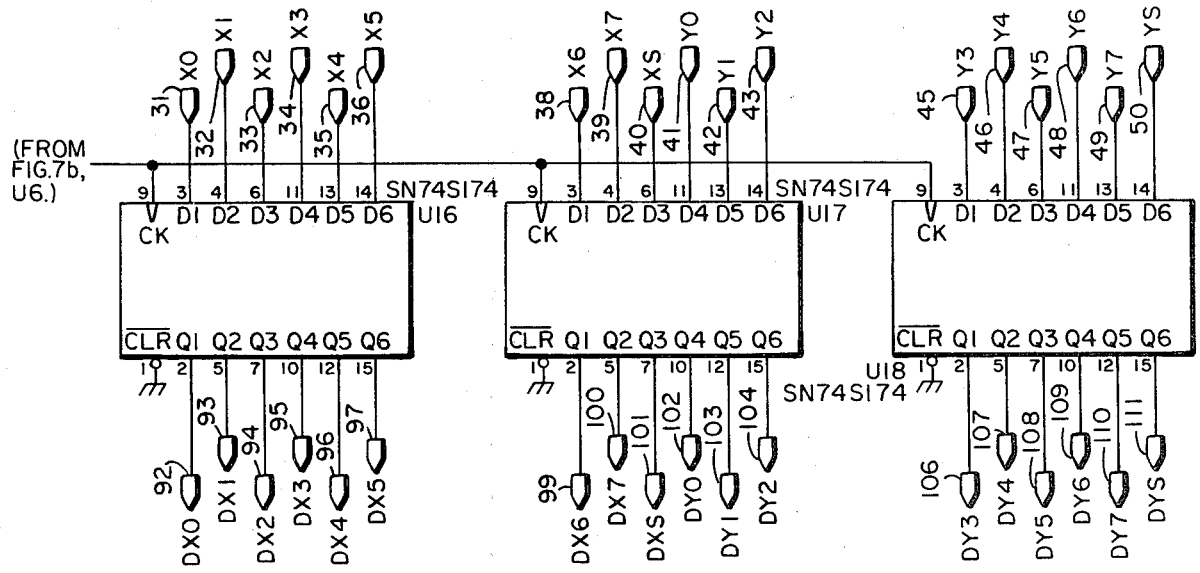
FIG.7c A3, SWEEP TIMING CONTROL.

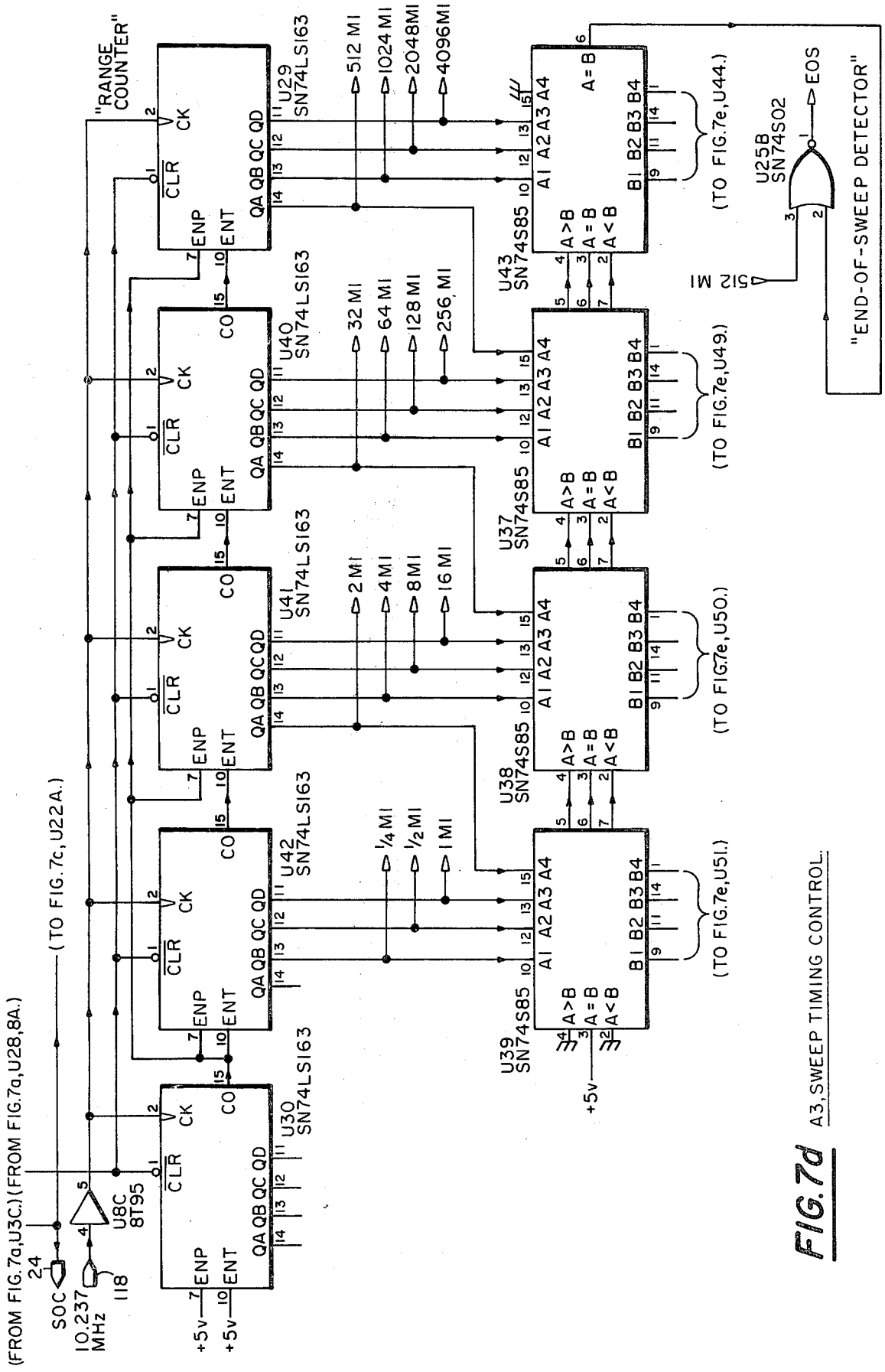

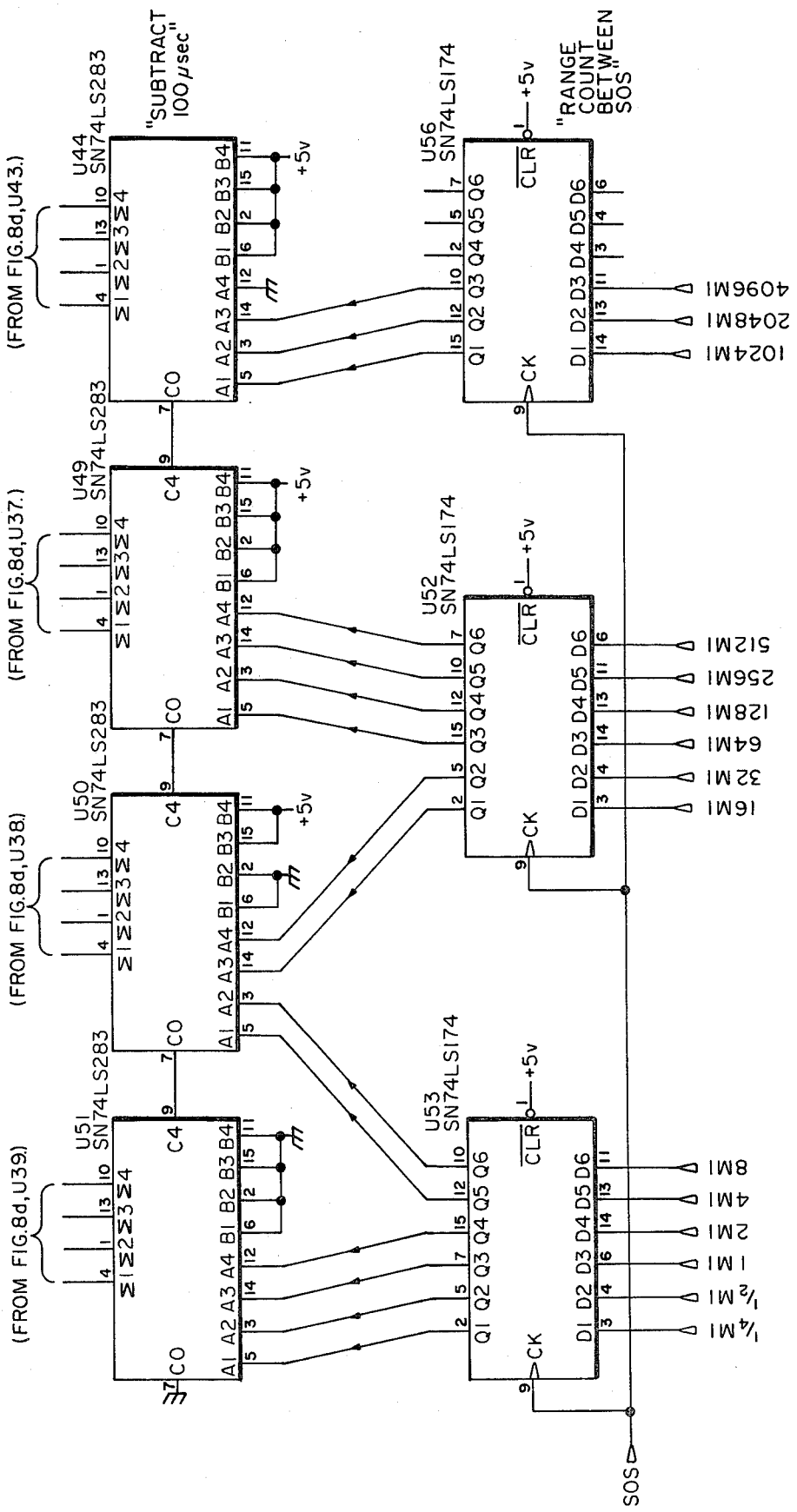
FIG.7e A3, SWEEP TIMING CONTROL.

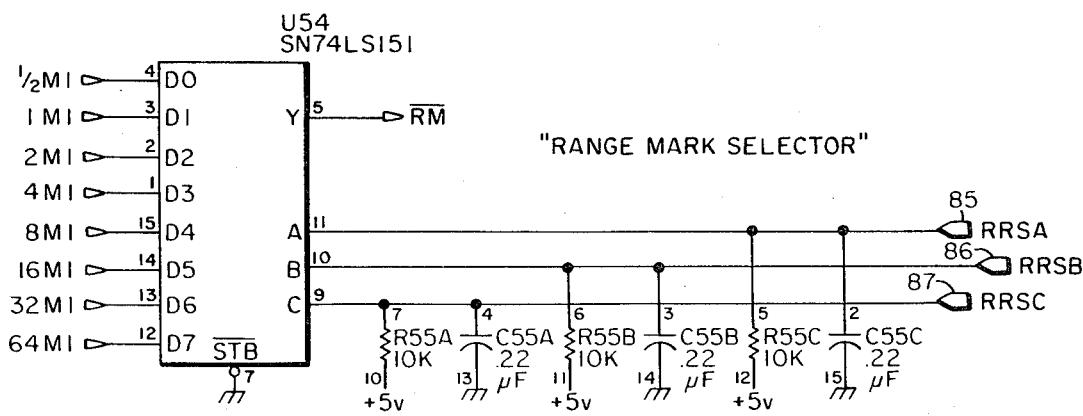
FIG.7f A3, SWEEP TIMING CONTROL.
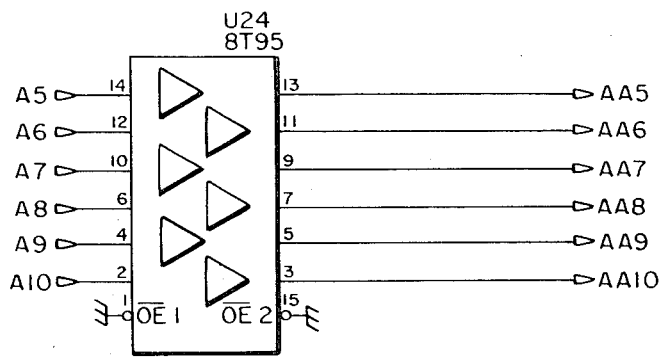
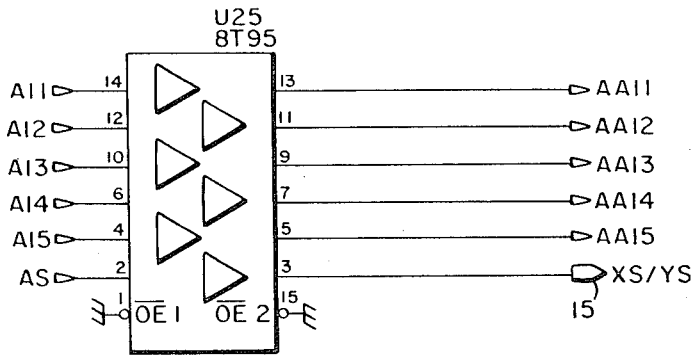
FIG.8d A4/A5, X/Y ADDRESS GENERATOR.

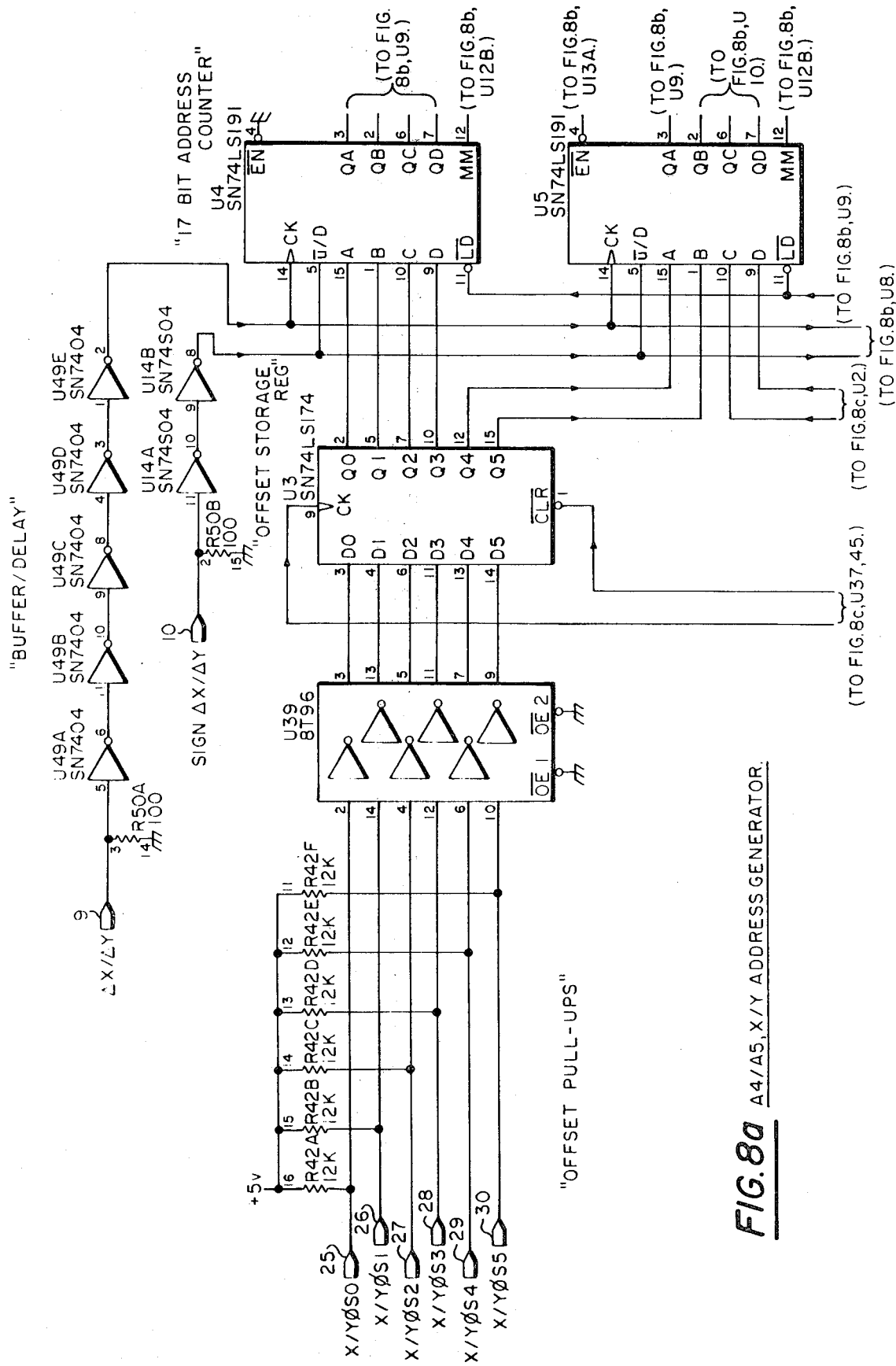
FIG. 8a  A4/A5, X/Y ADDRESS GENERATOR

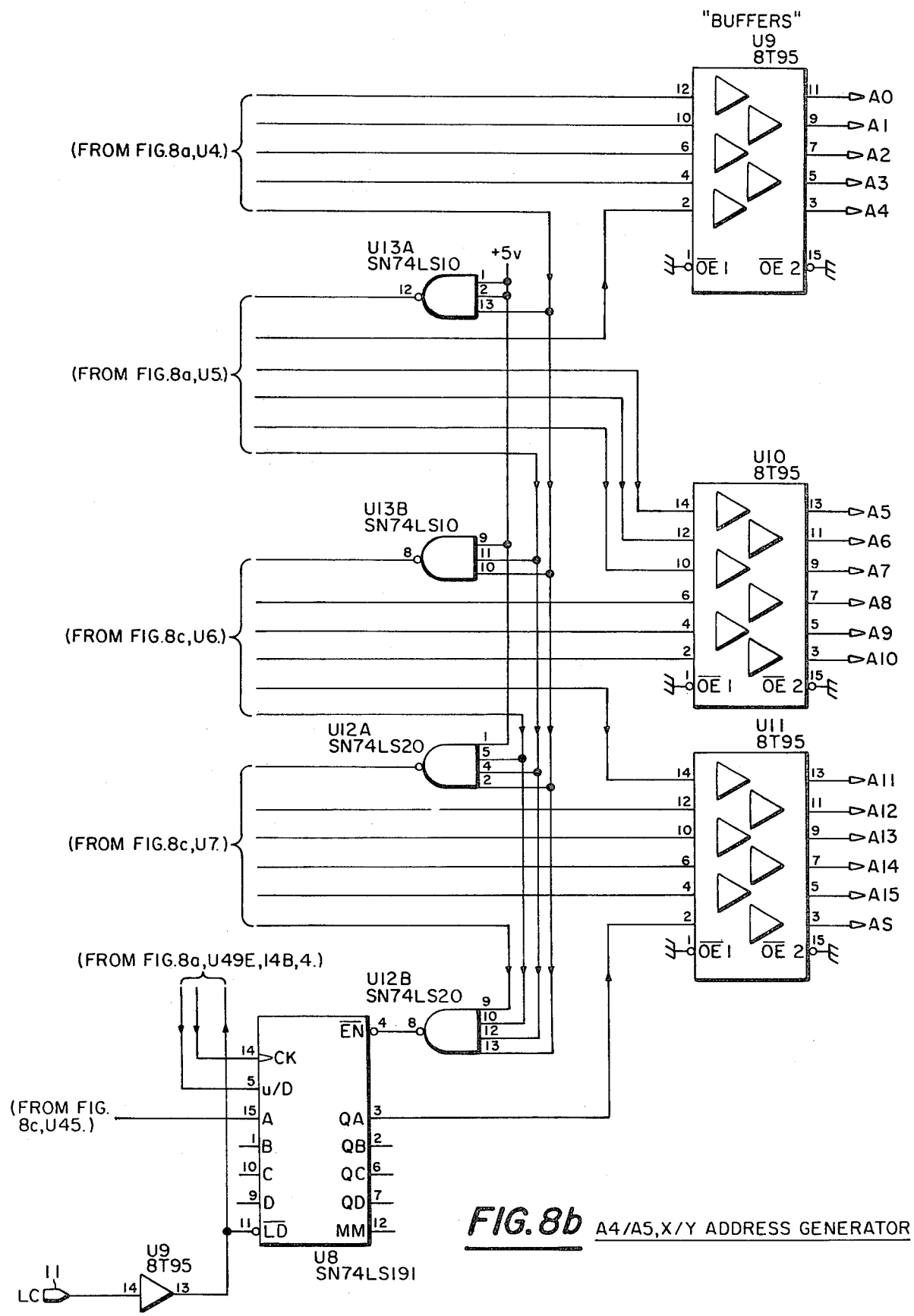
FIG.8b  A4/A5, X/Y ADDRESS GENERATOR

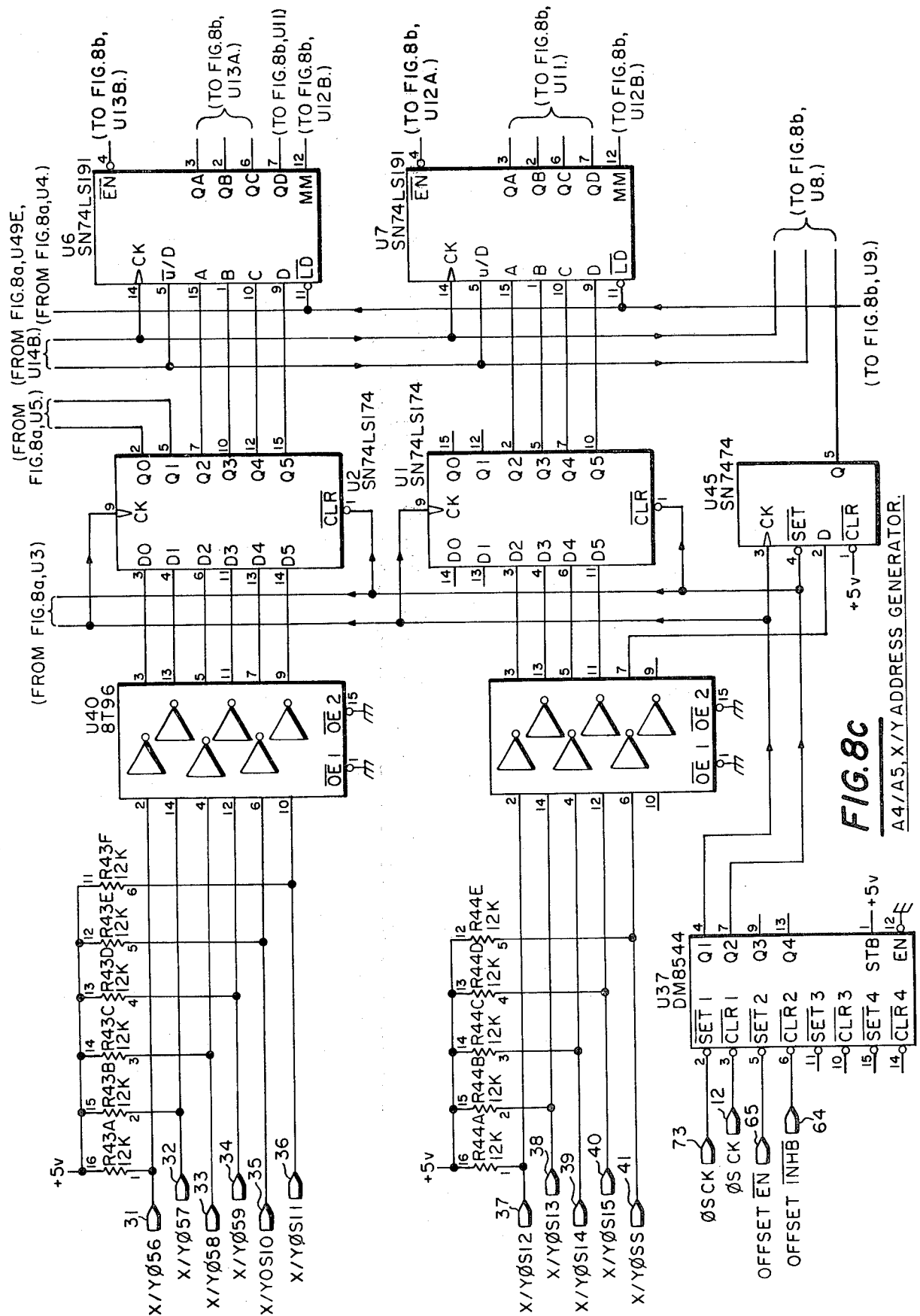
FIG.8c  A4/A5, X/Y ADDRESS GENERATOR.

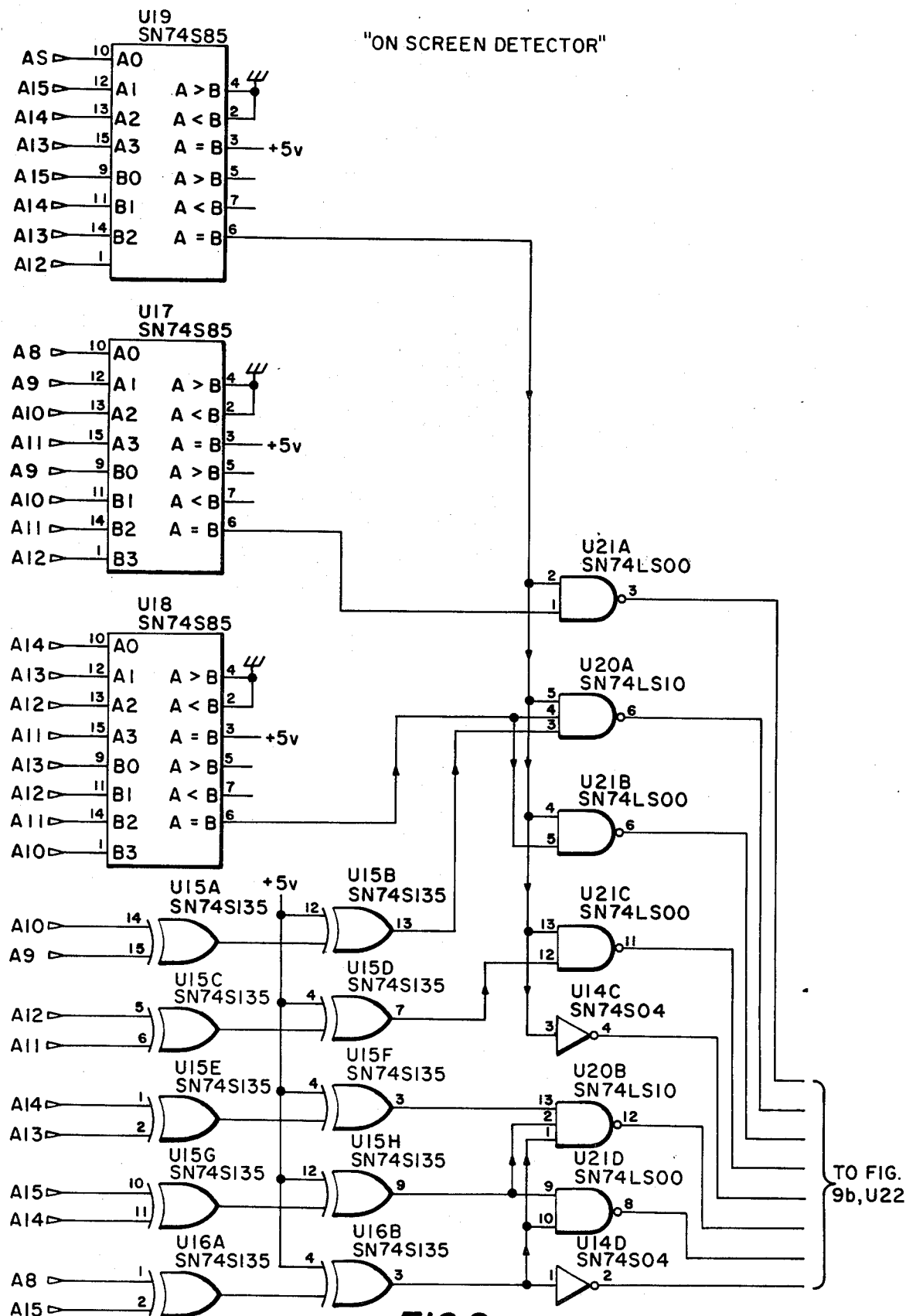
FIG.9a A4/A5, X/Y ADDRESS GENERATOR.

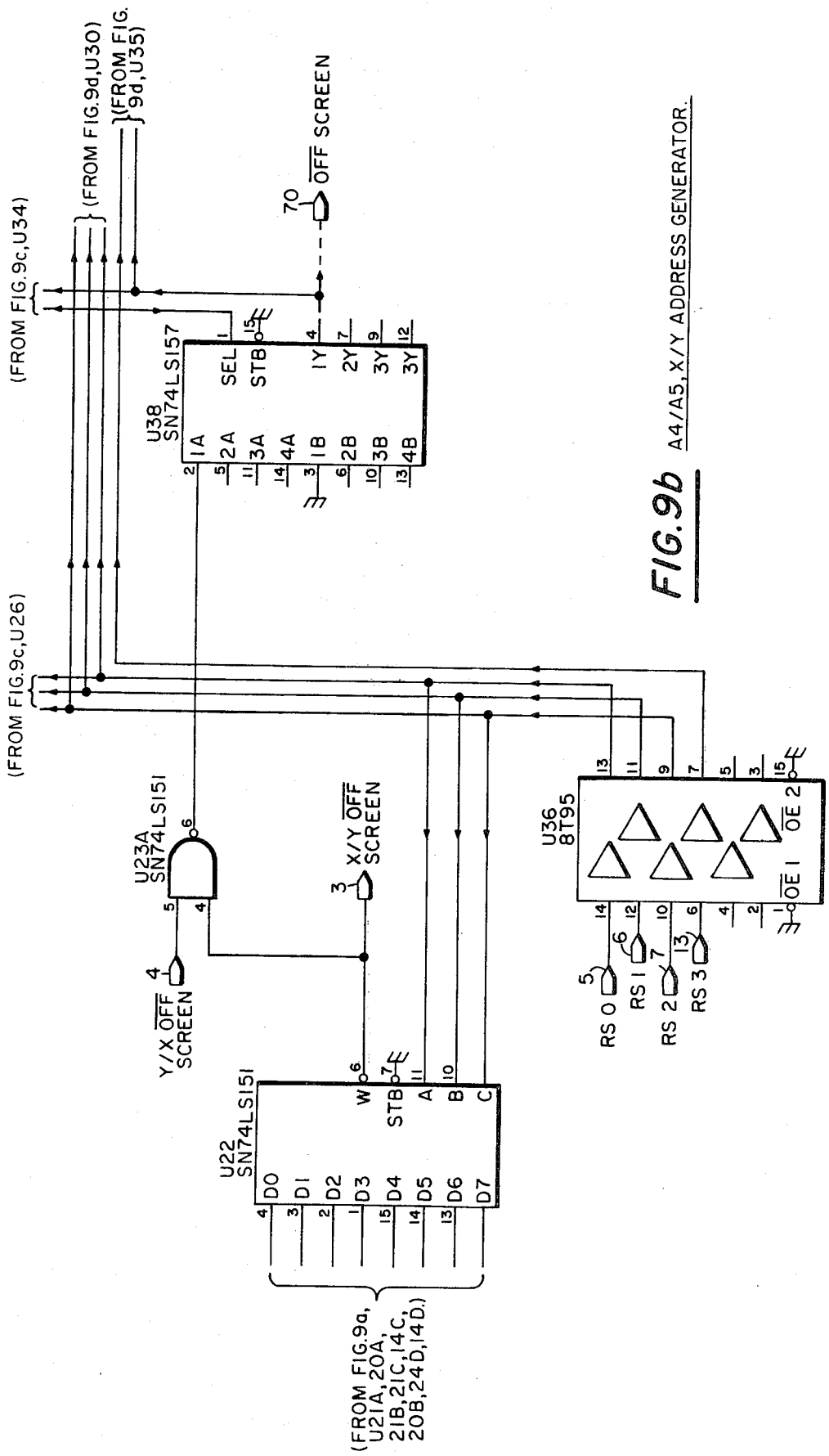

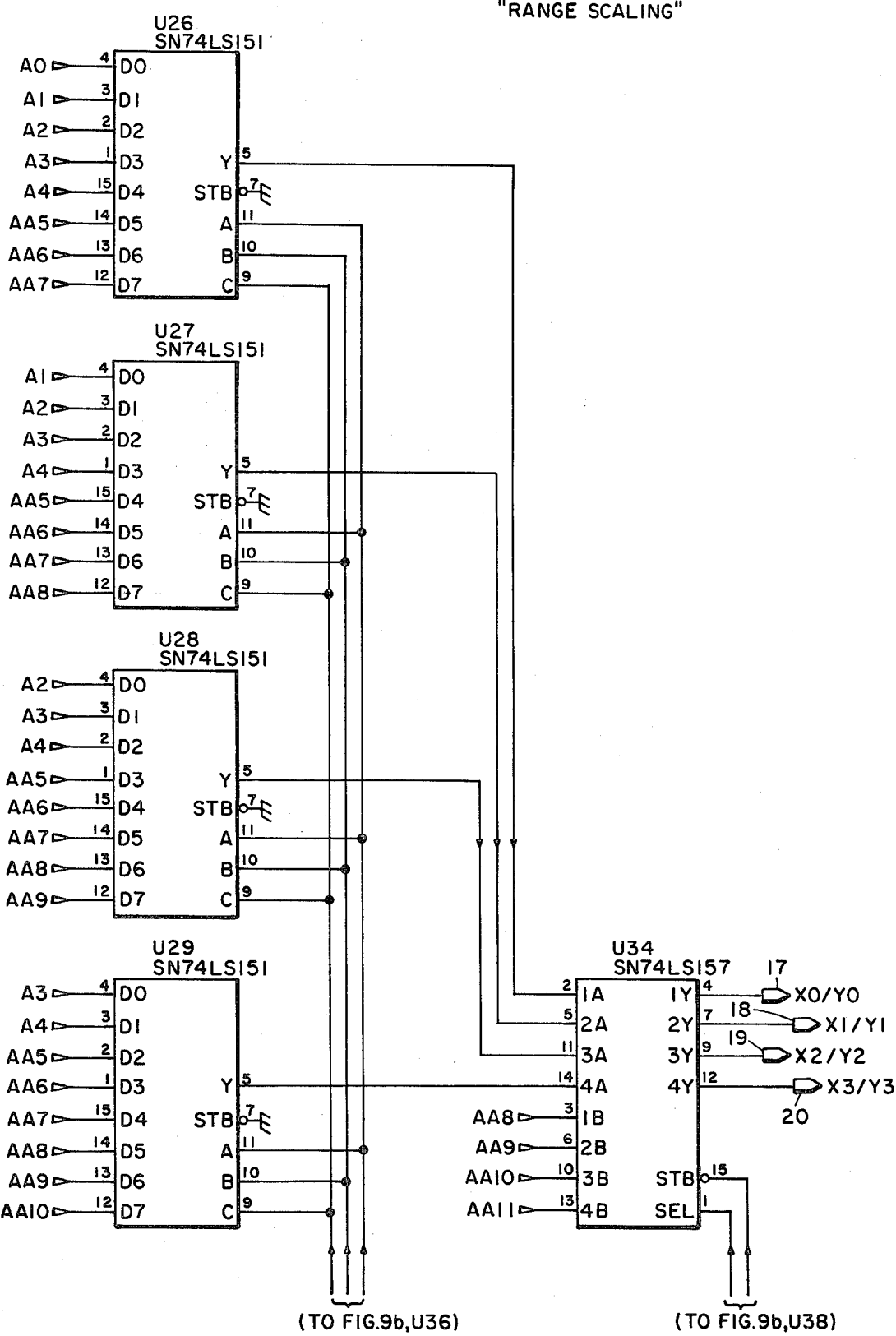
FIG.9c  A4/A5, X/Y ADDRESS GENERATOR.

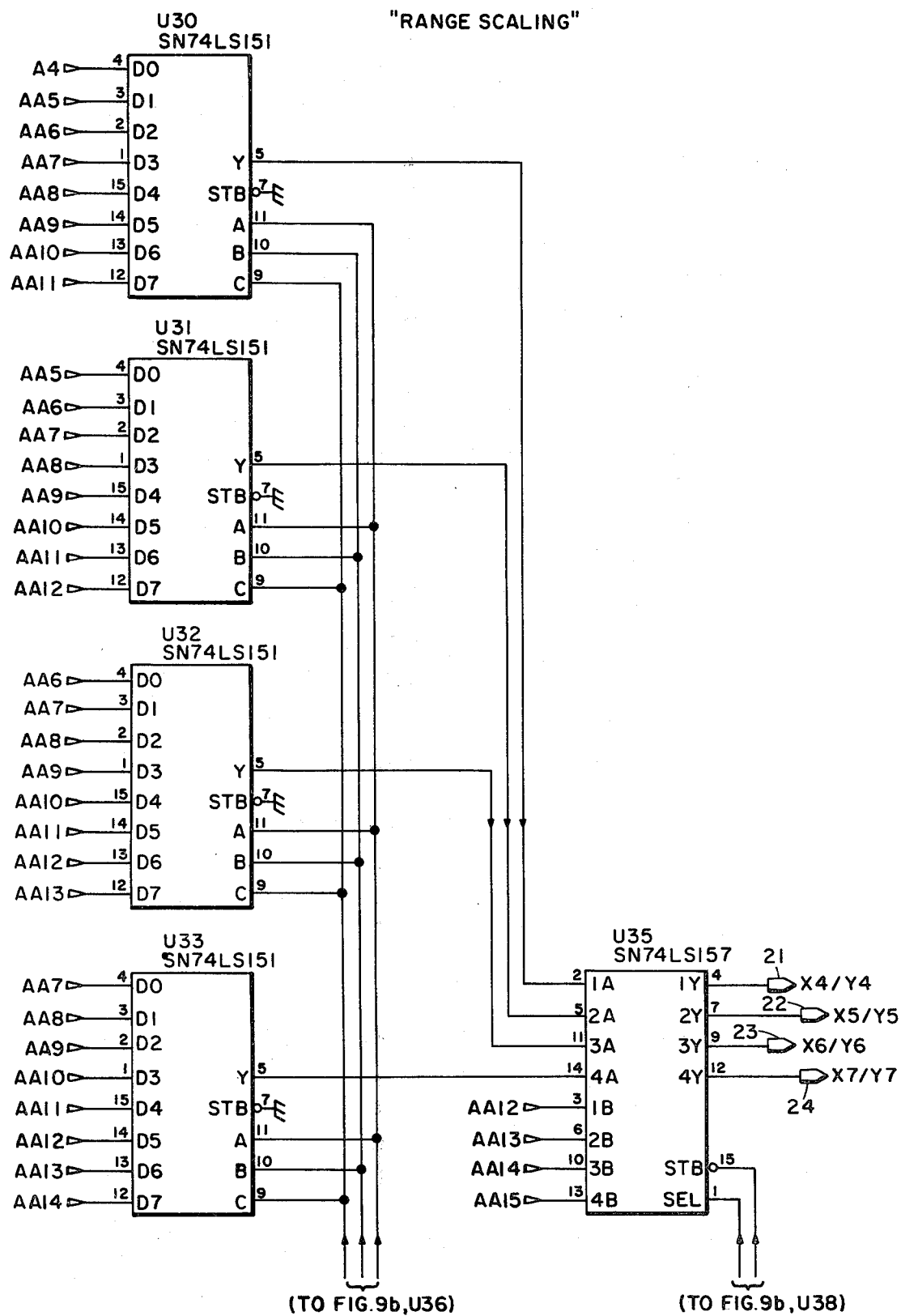
FIG.9d A4/A5, XY ADDRESS GENERATOR.

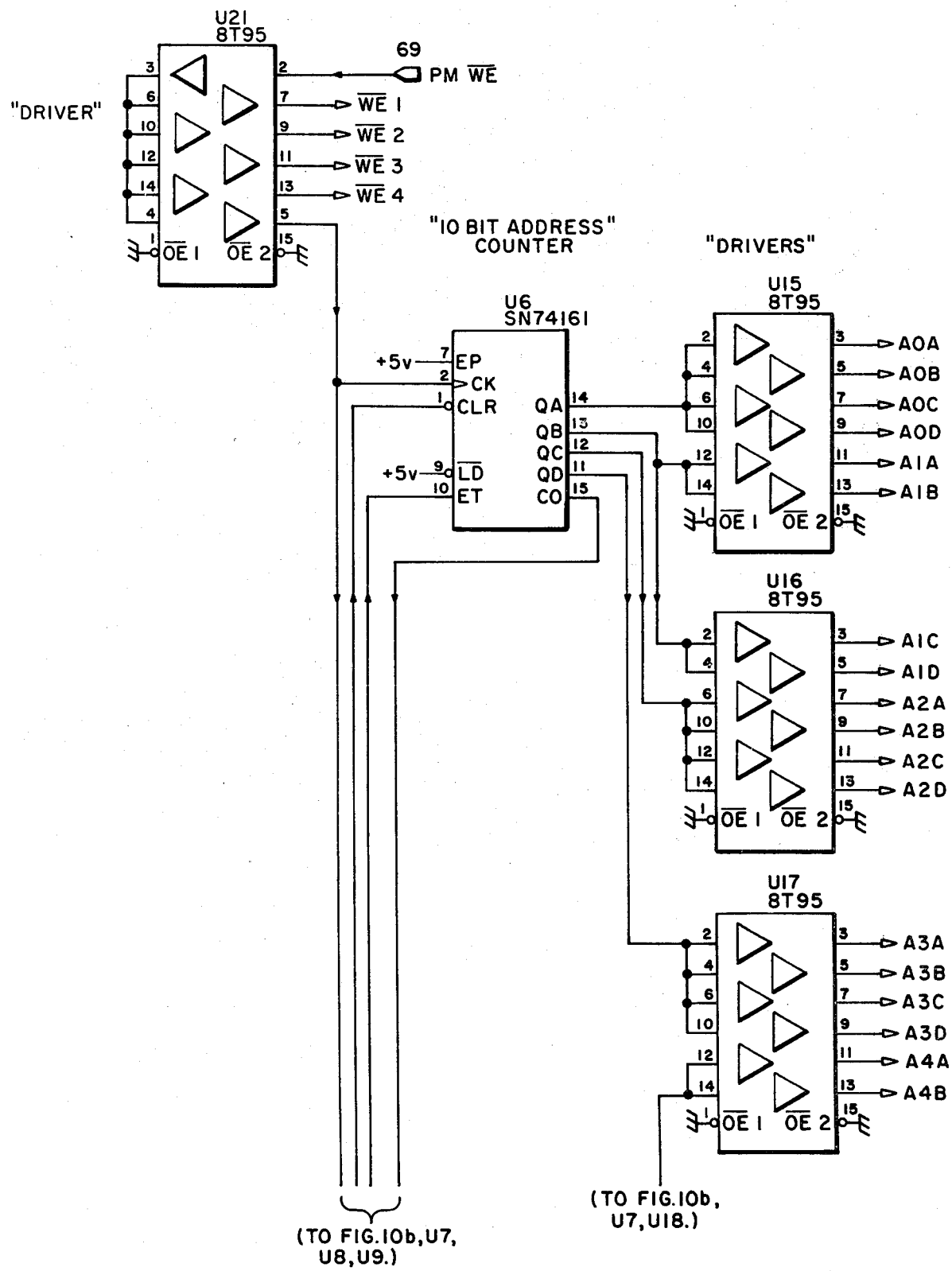
FIG.10a  A6/A7, PREMEMORY A/B.

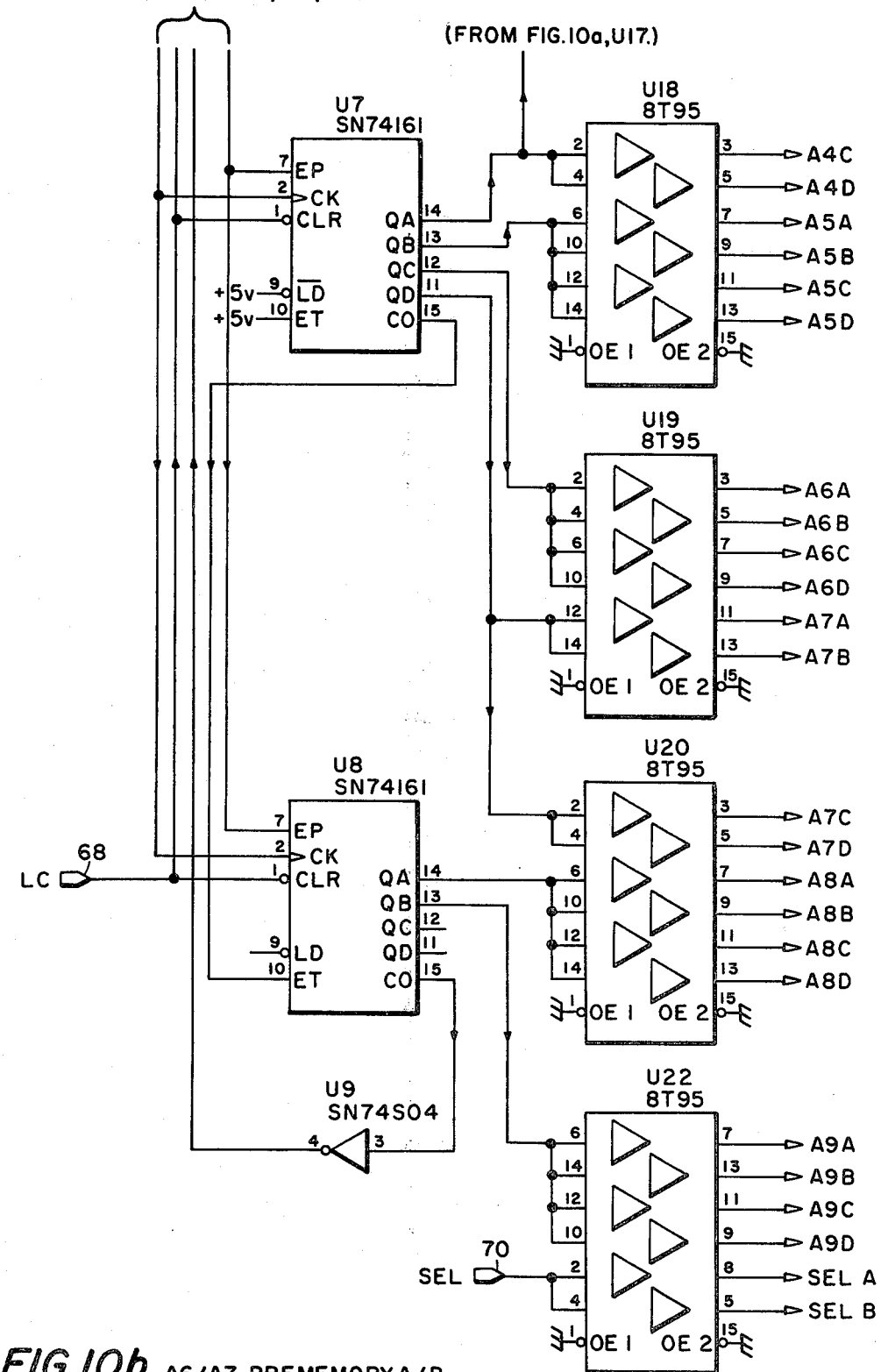
FIG.10b  A6/A7, PREMEMORY A/B.

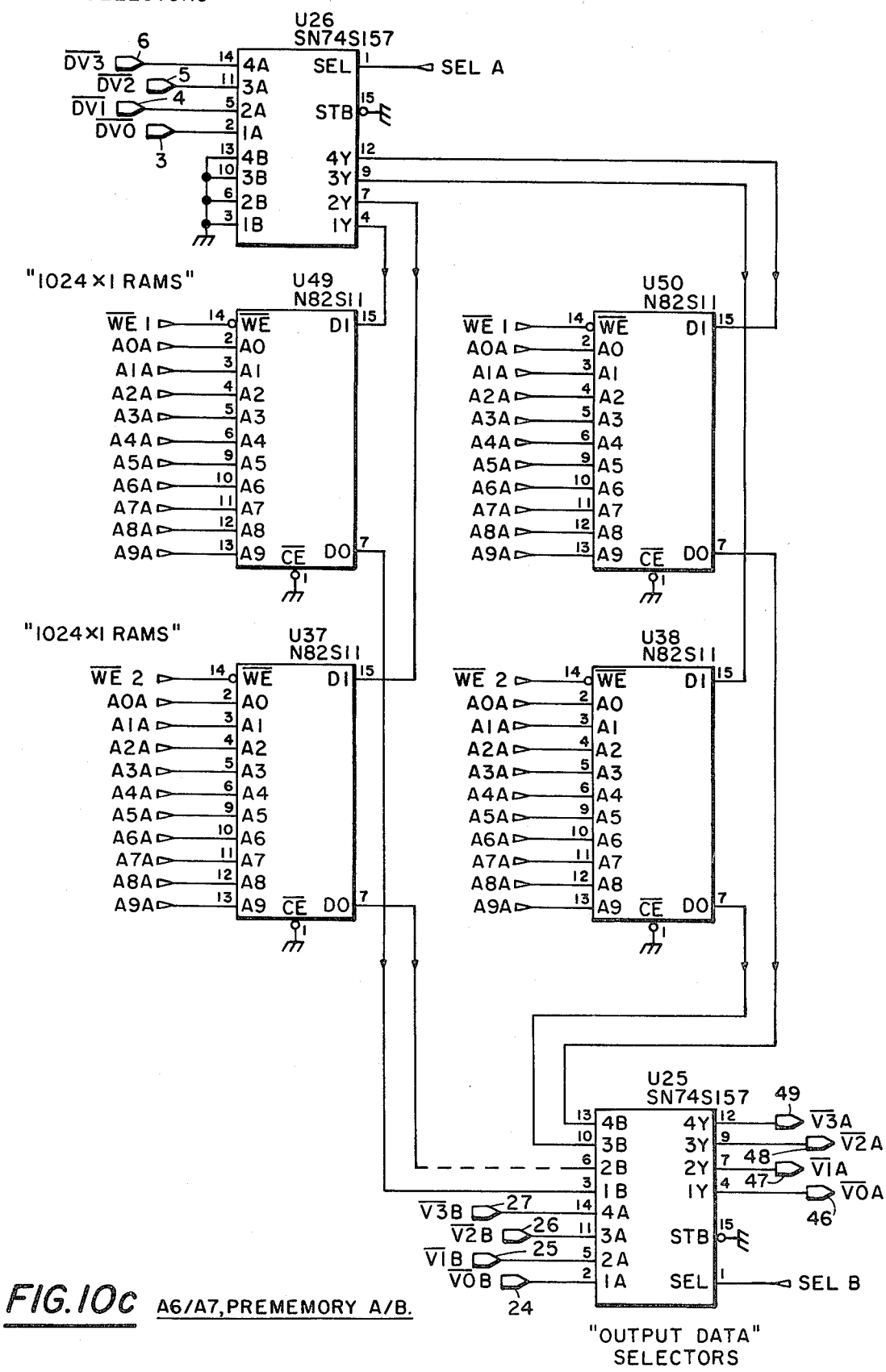
FIG.10c  A6/A7, PREMEMORY A/B.

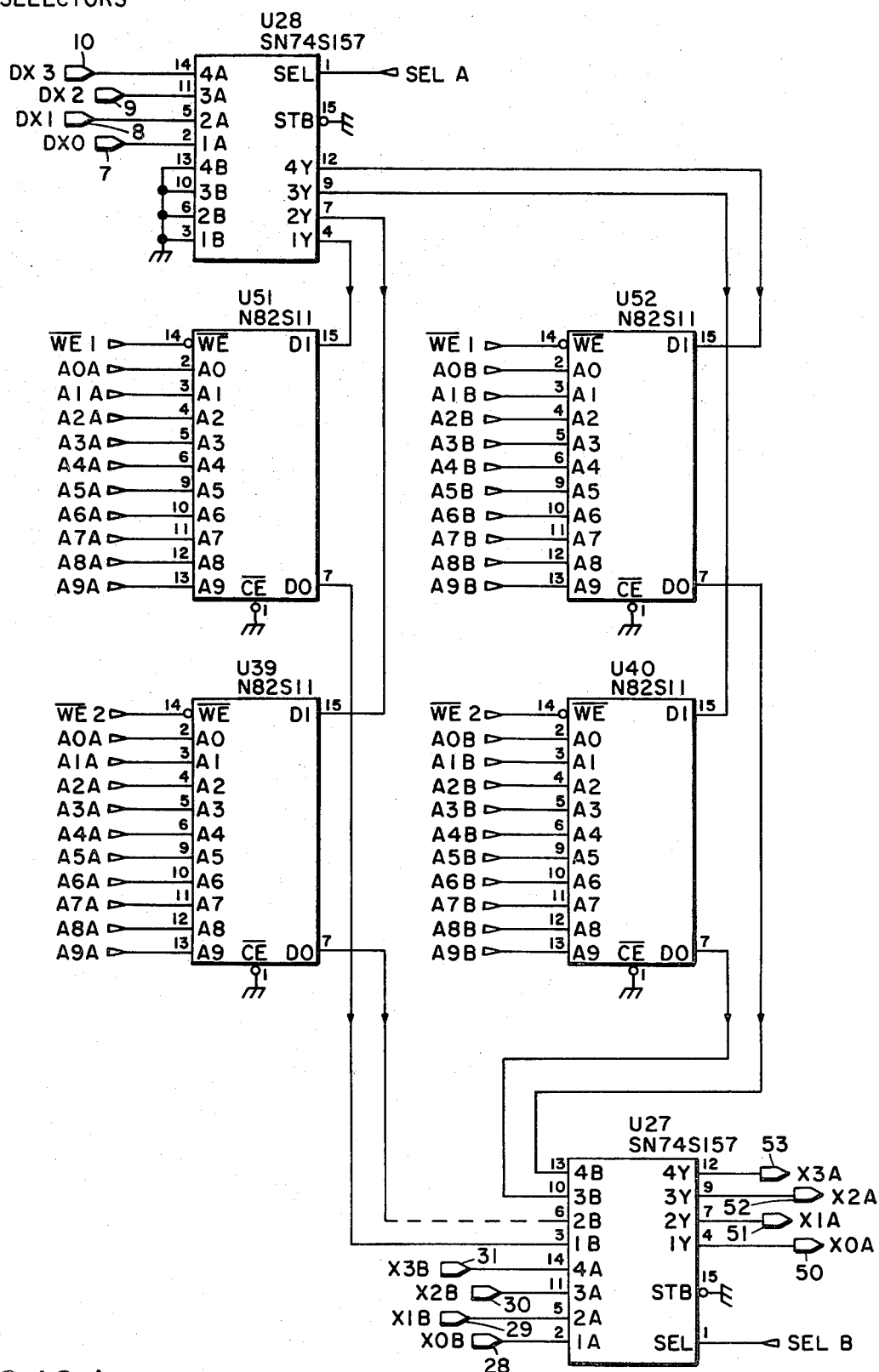
FIG.10d A6/A7, PREMEMORY A/B.

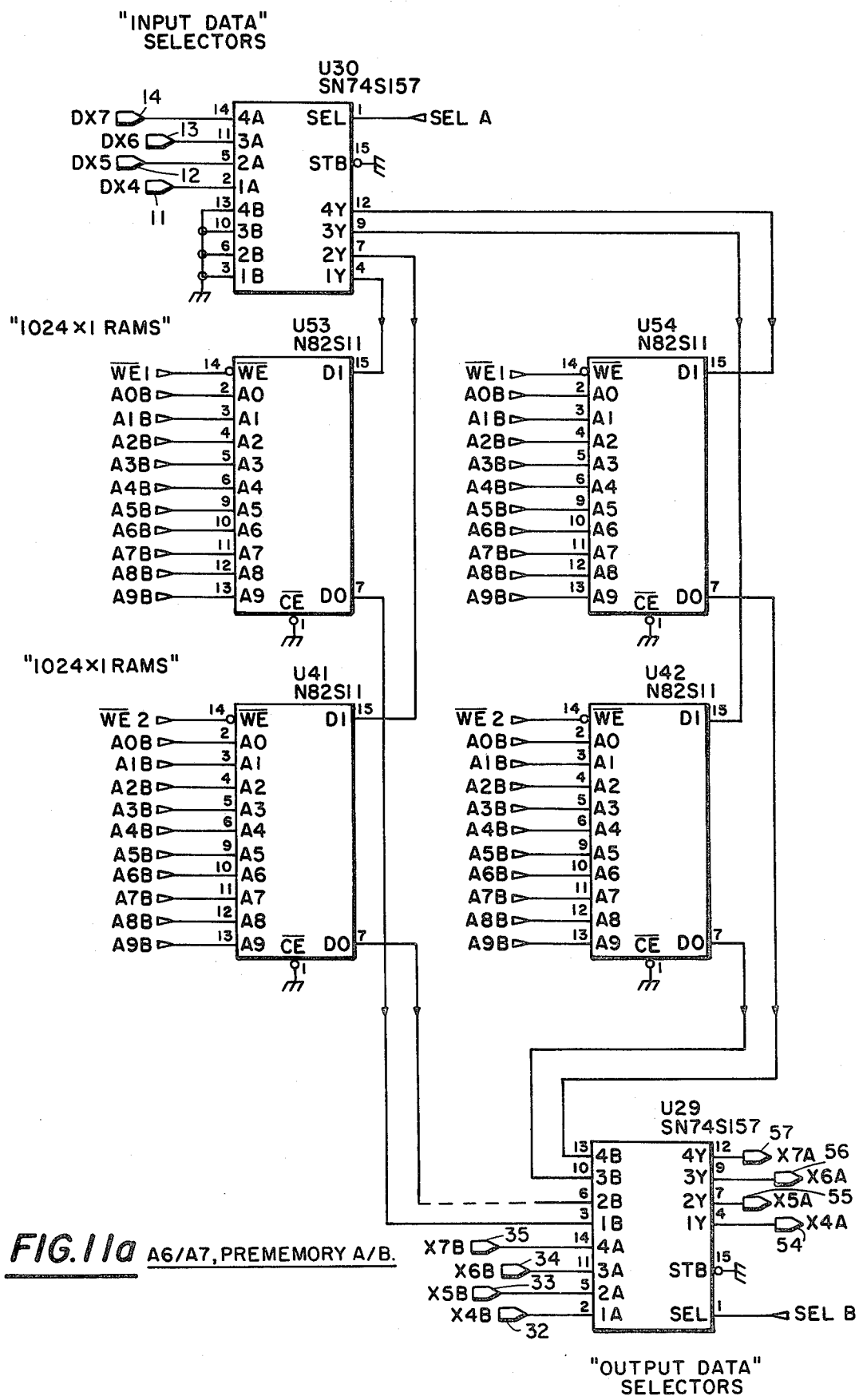
FIG.11a  A6/A7, PREMEMORY A/B.

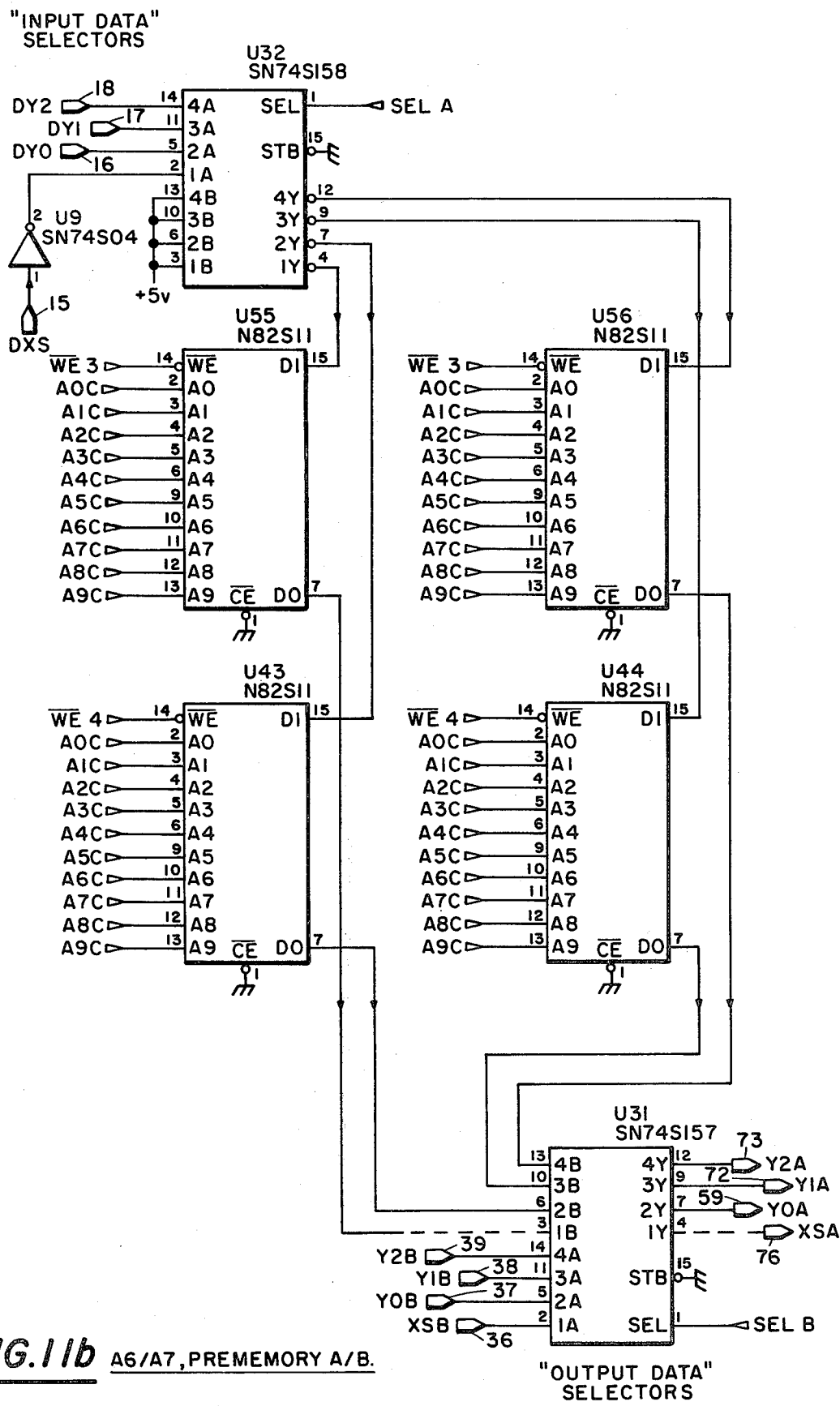
FIG.11b  A6/A7, PREMEMORY A/B.

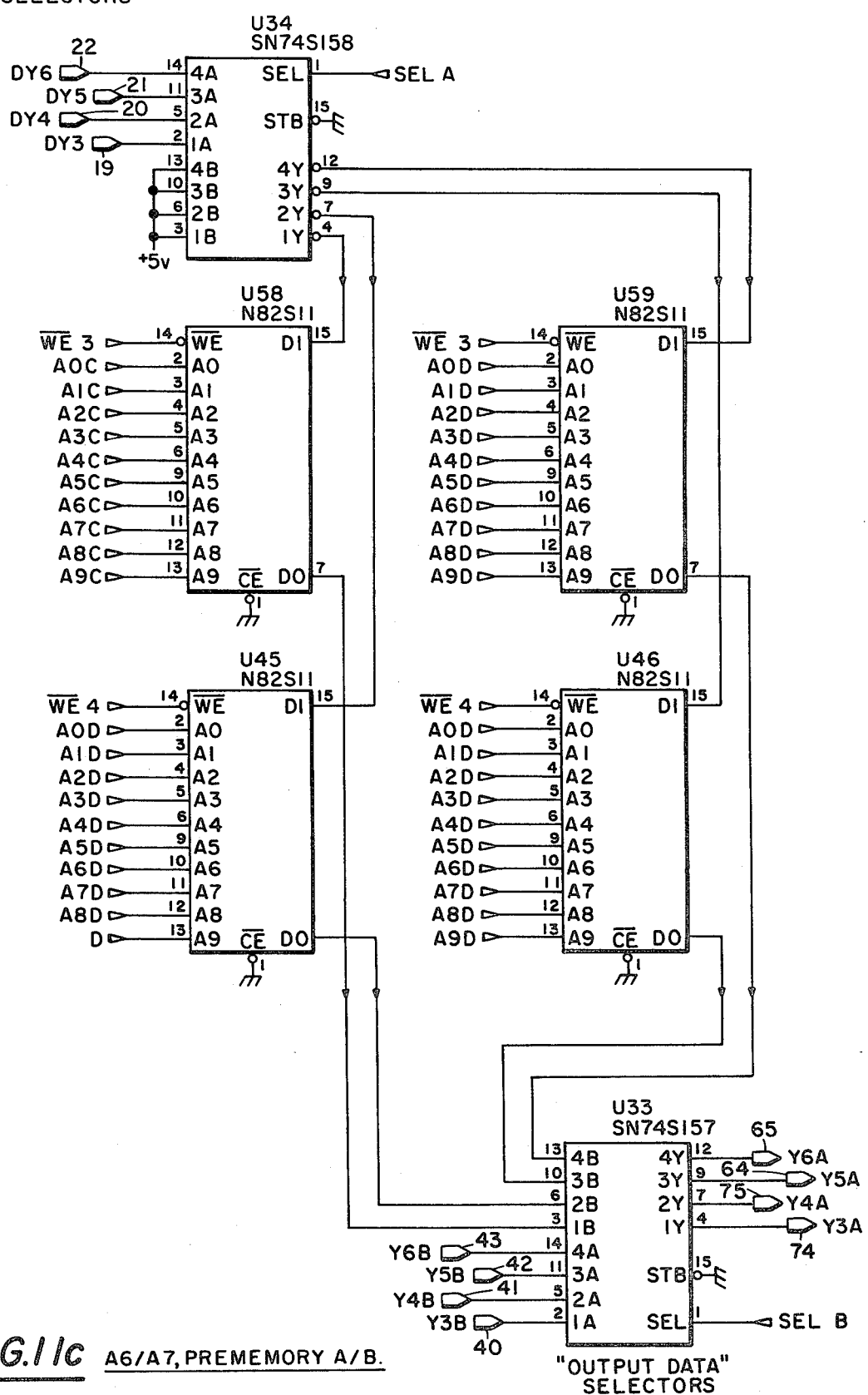

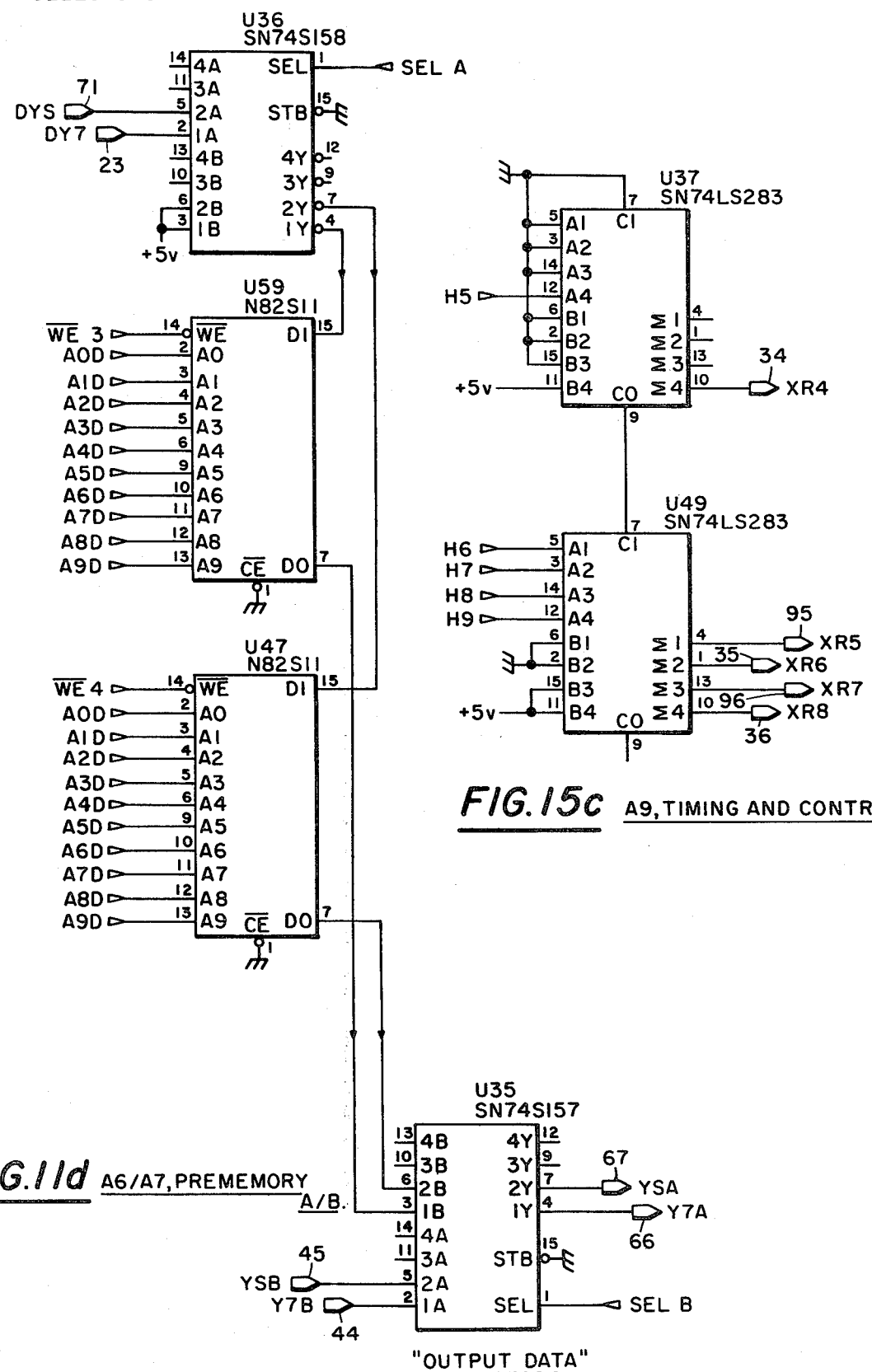

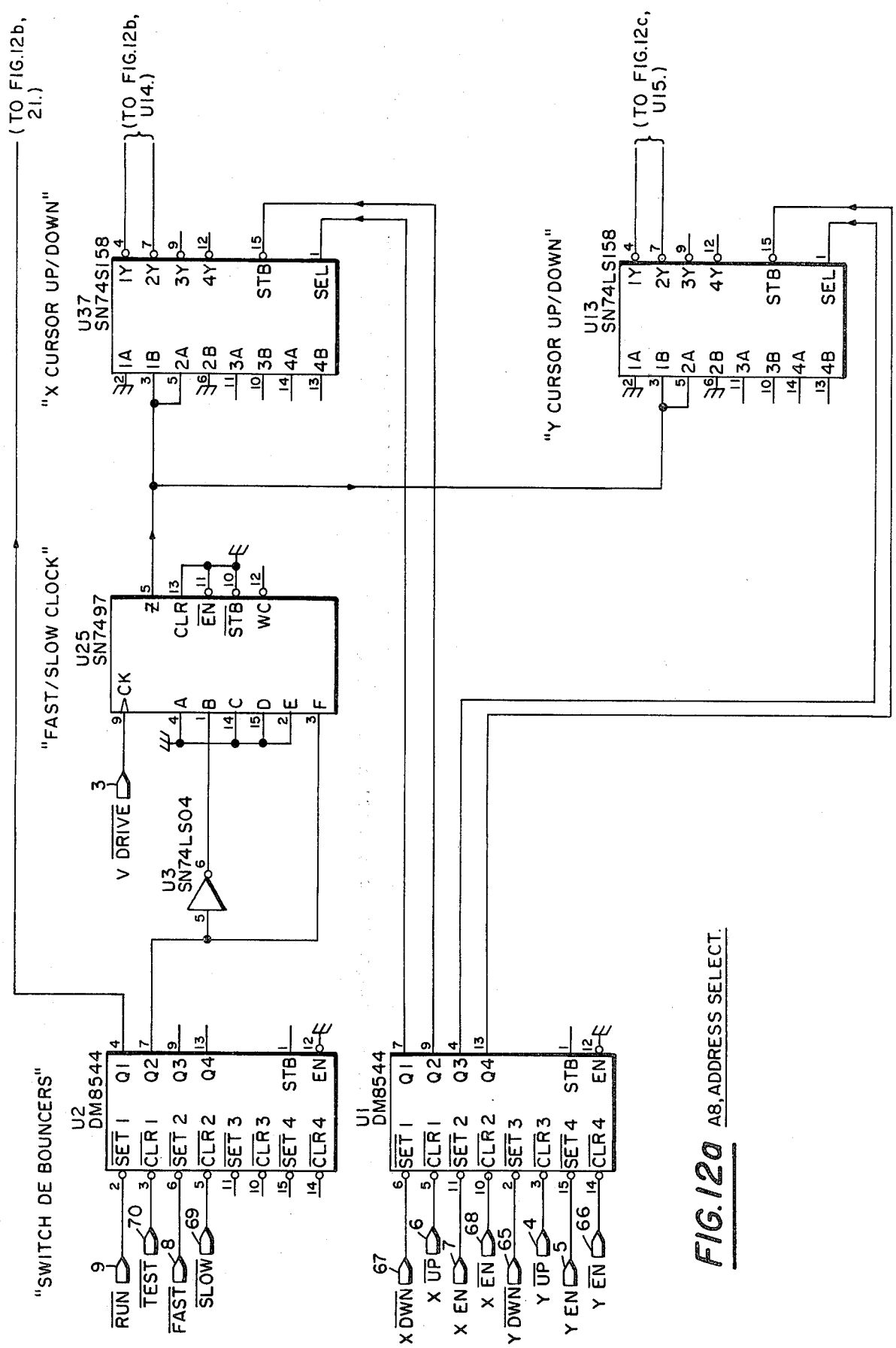

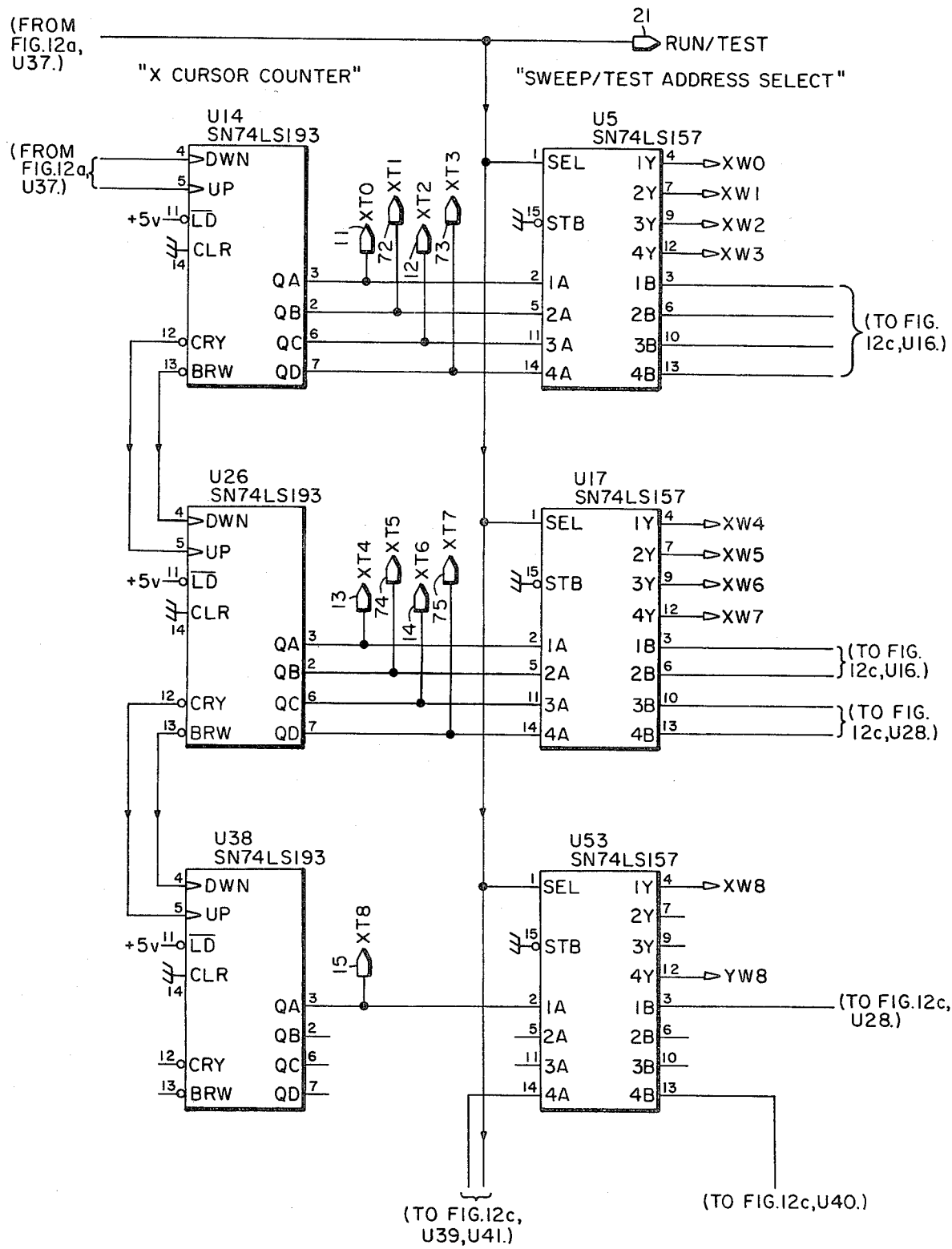
FIG.12b  A8, ADDRESS SELECT.

FIG.12c

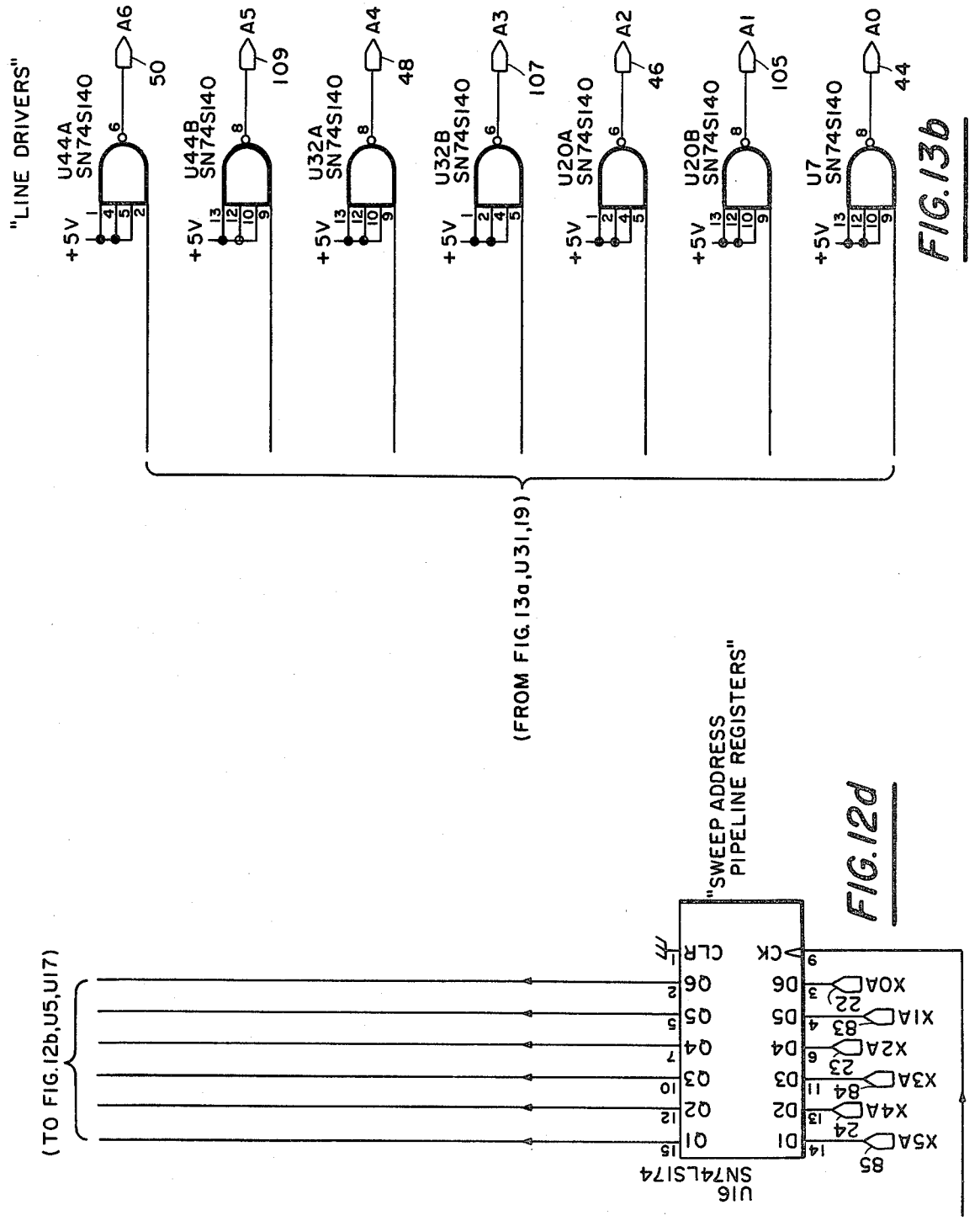

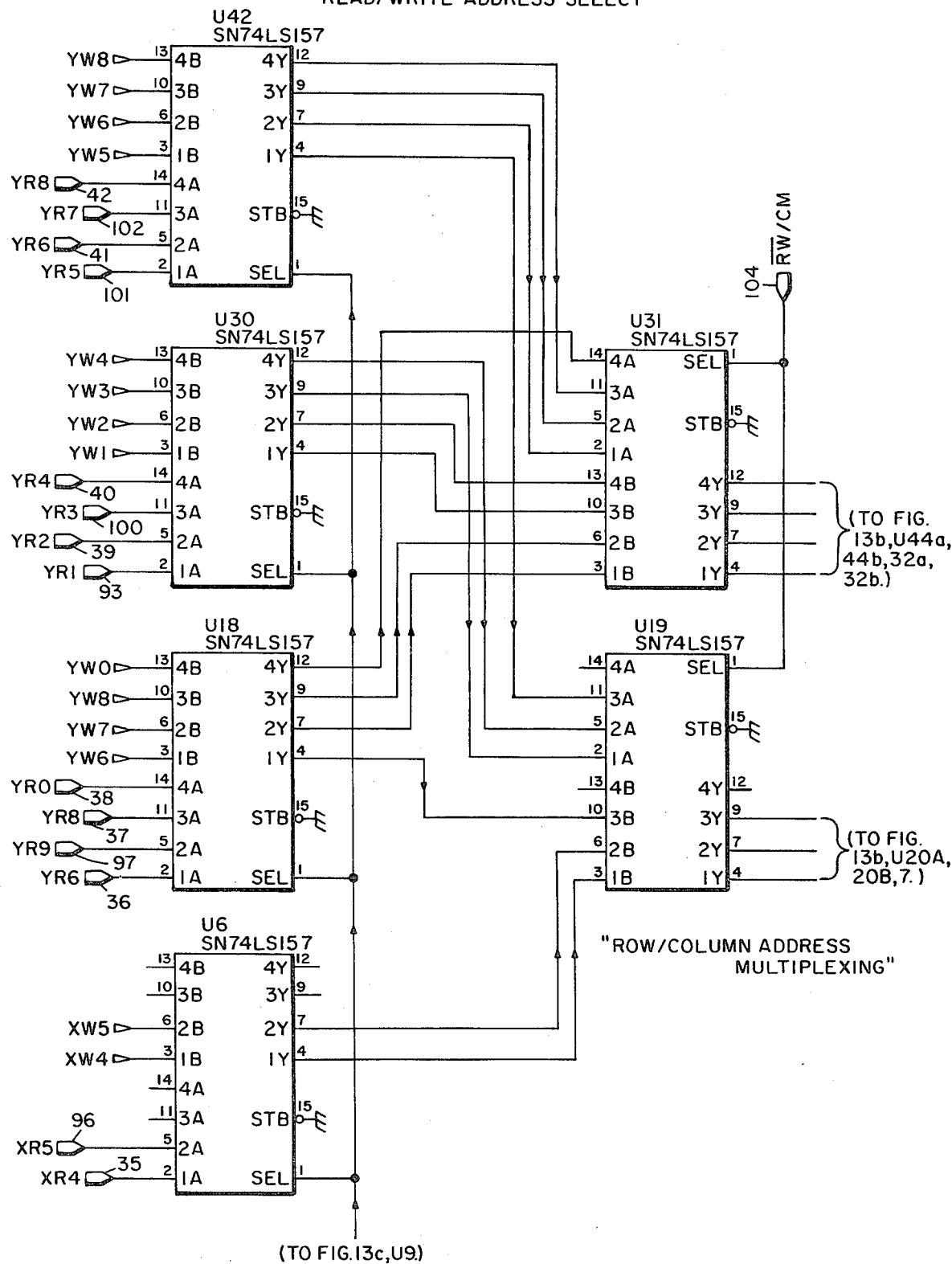
FIG.13a  A8, ADDRESS SELECT.

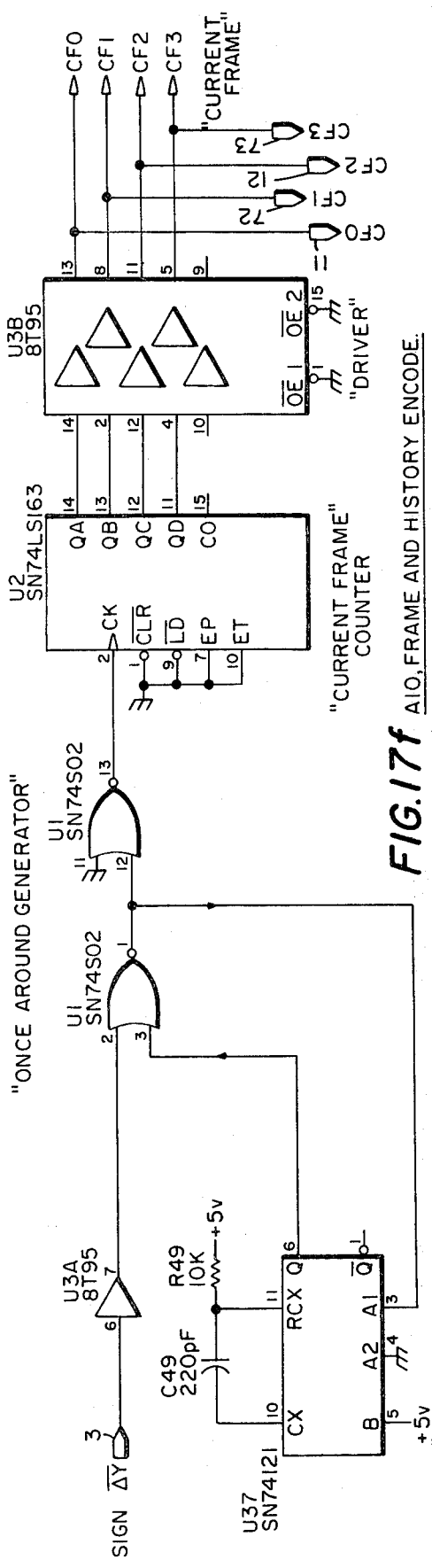
FIG. 17f A10, FRAME AND HISTORY ENCODE.
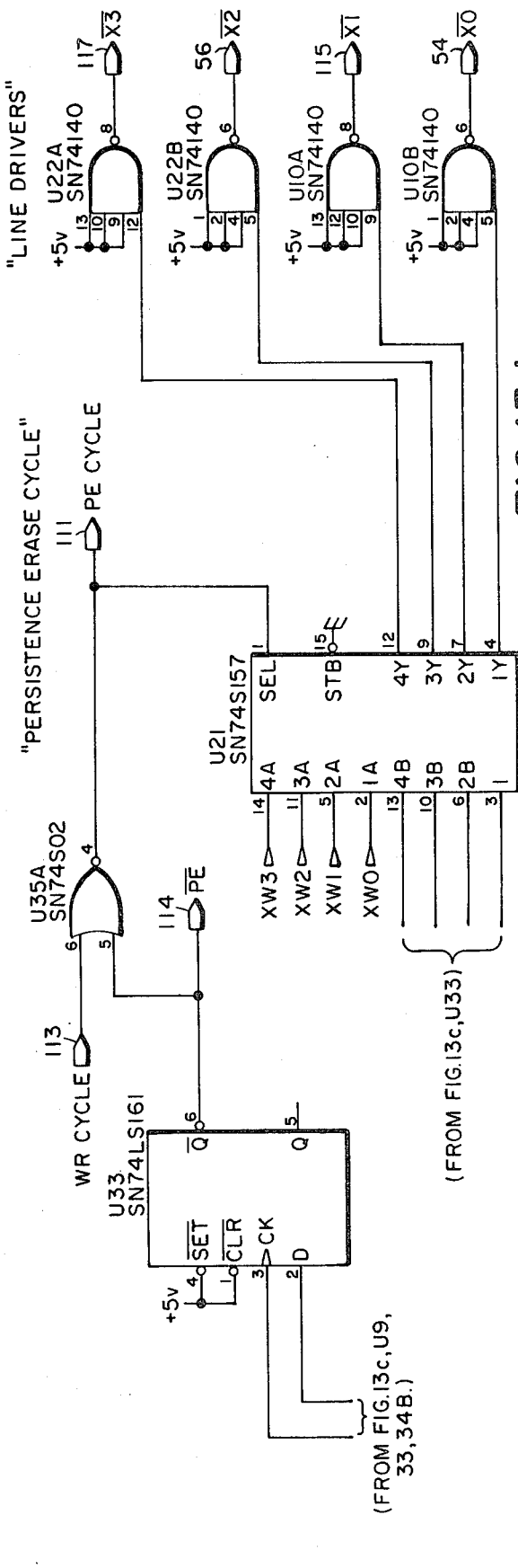
FIG. 13d A8, ADDRESS SELECT.

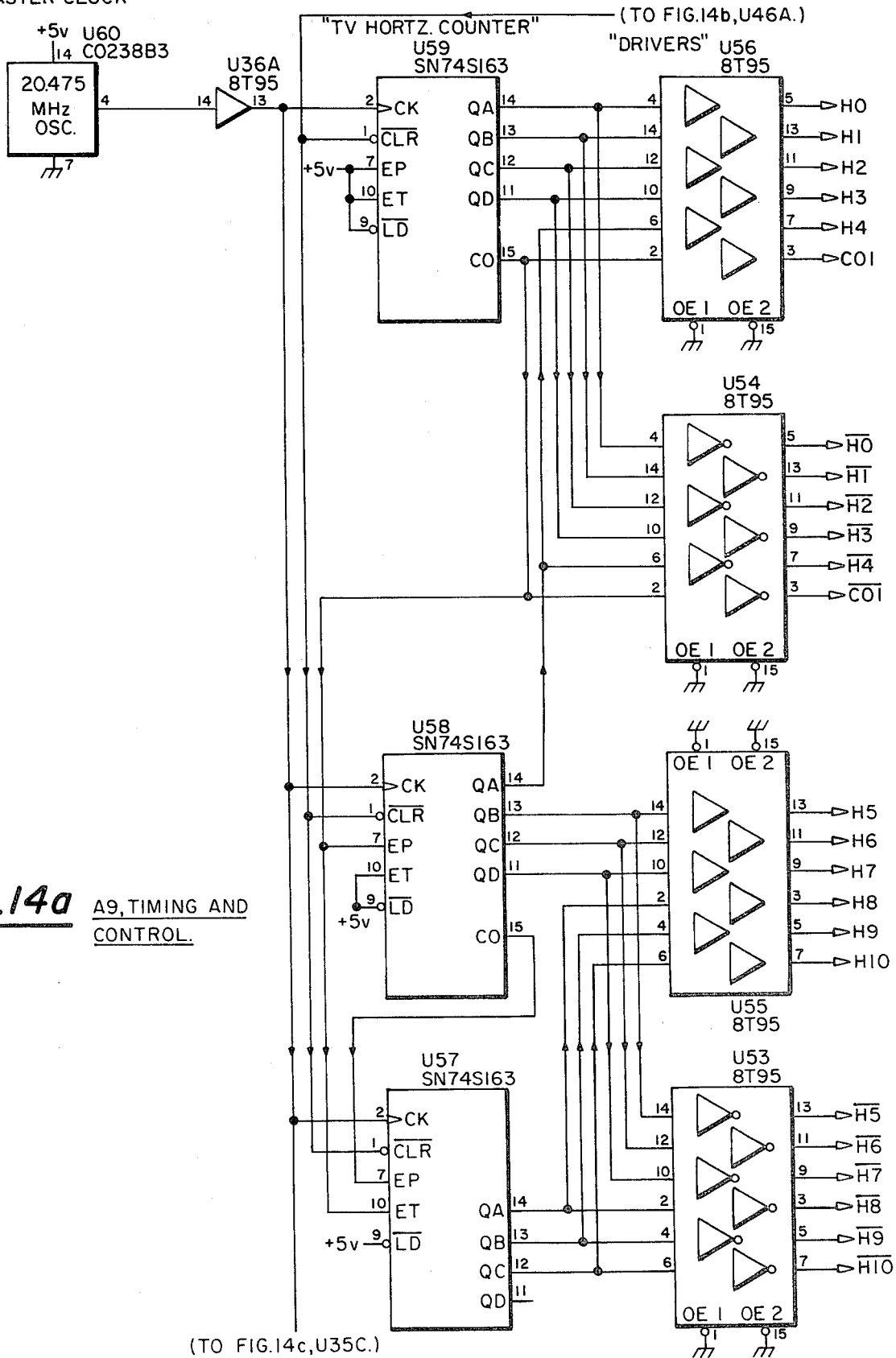
FIG.14a  A9, TIMING AND CONTROL.

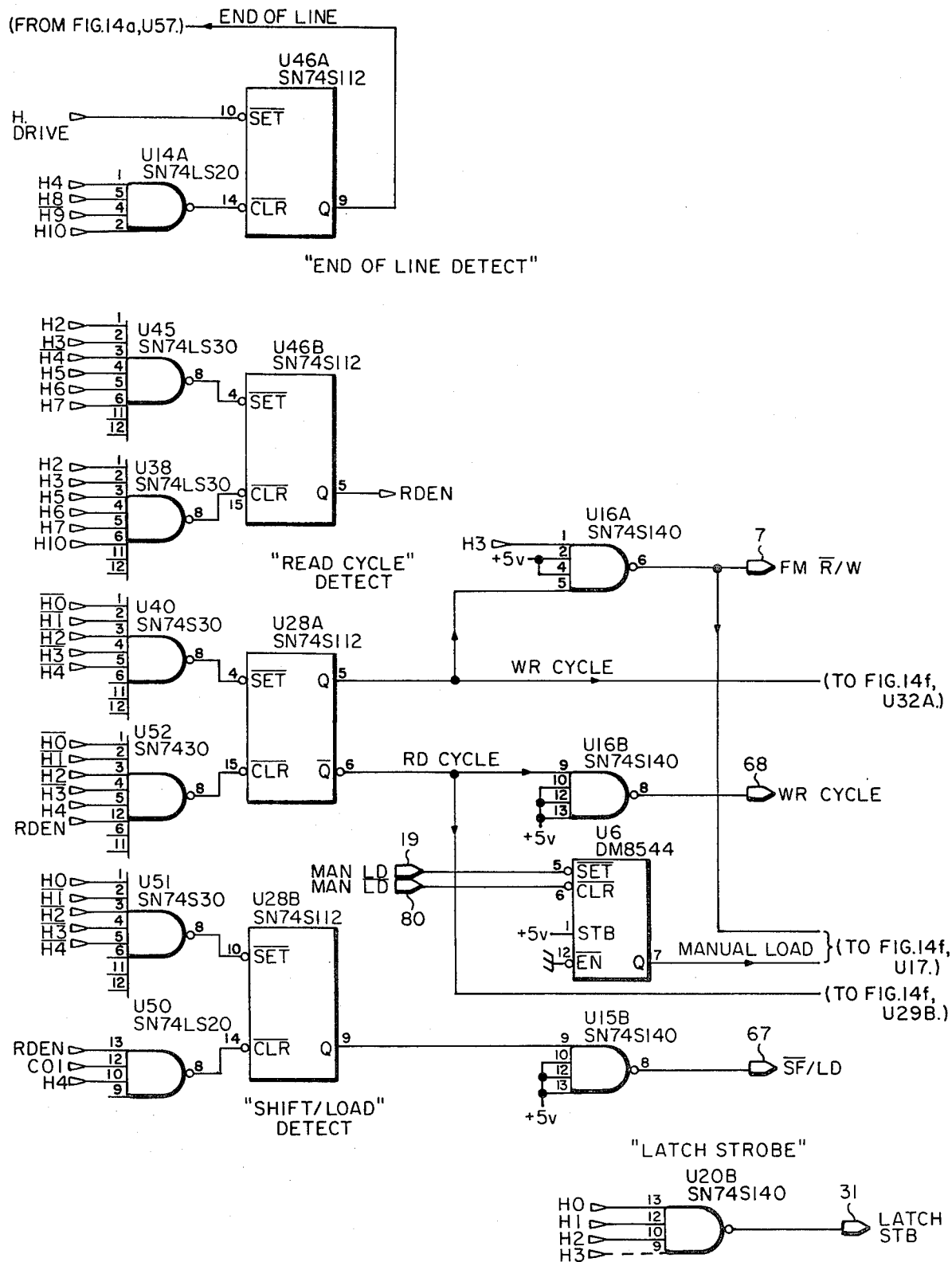
FIG.14b  A9, TIMING AND CONTROL.

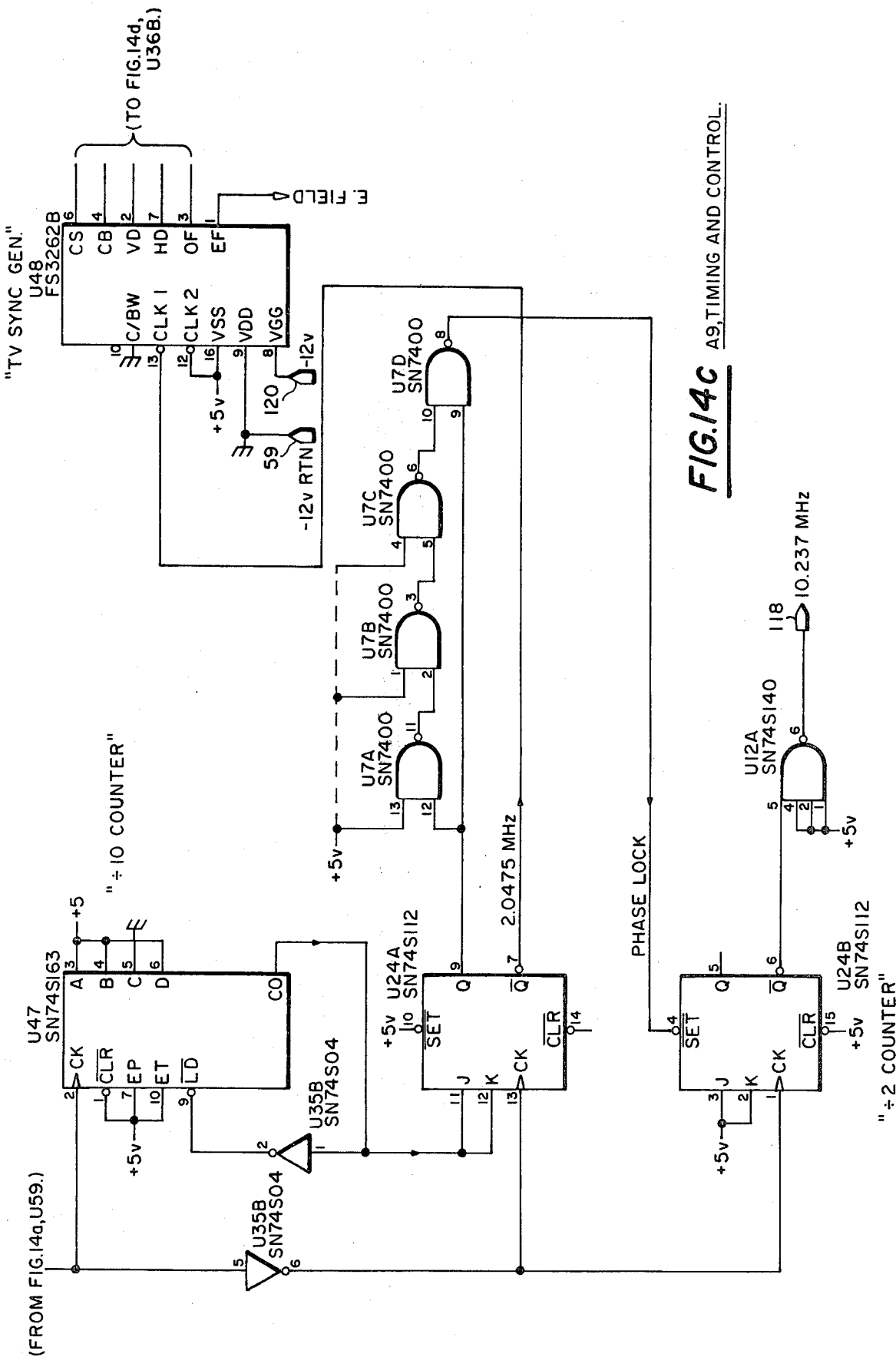

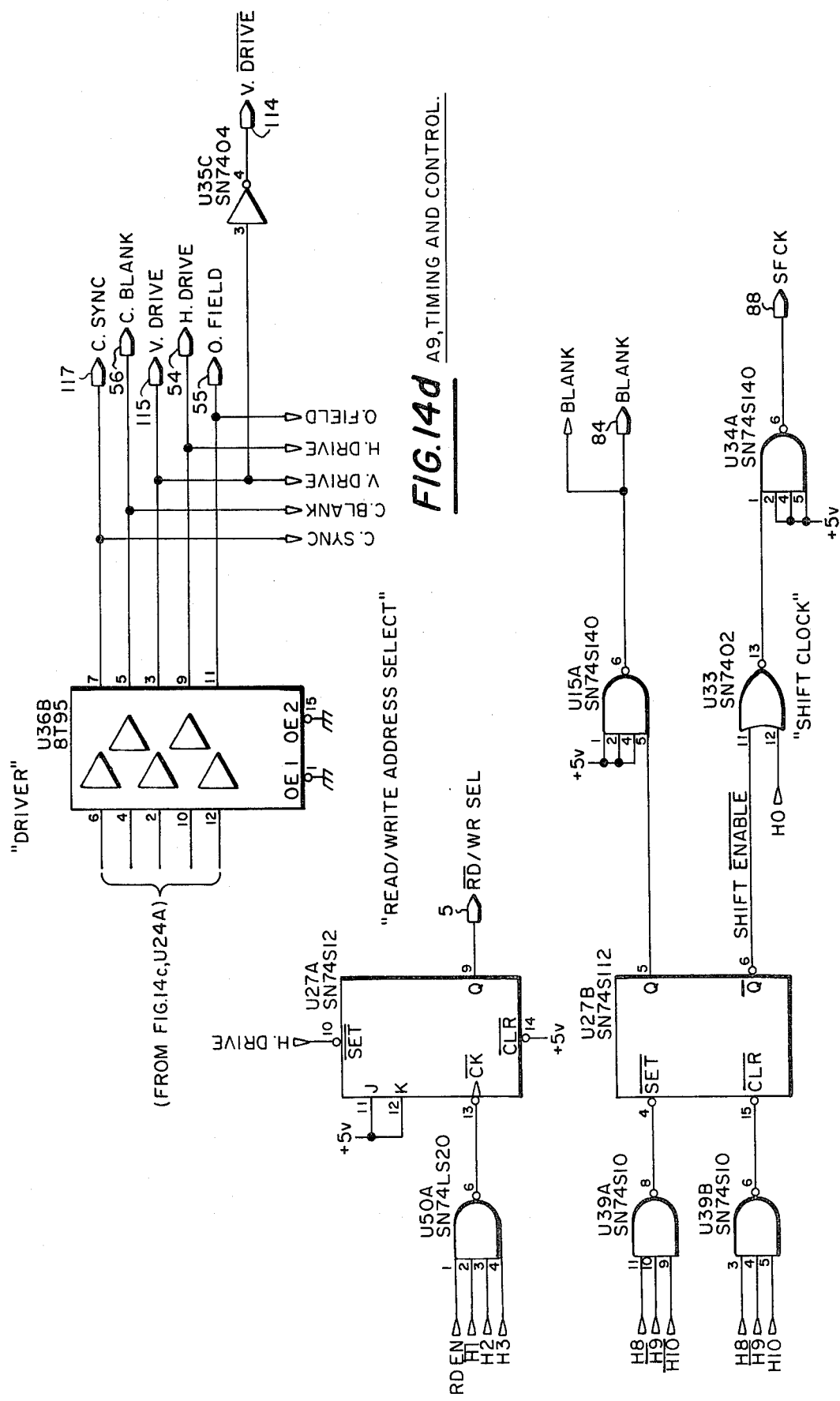

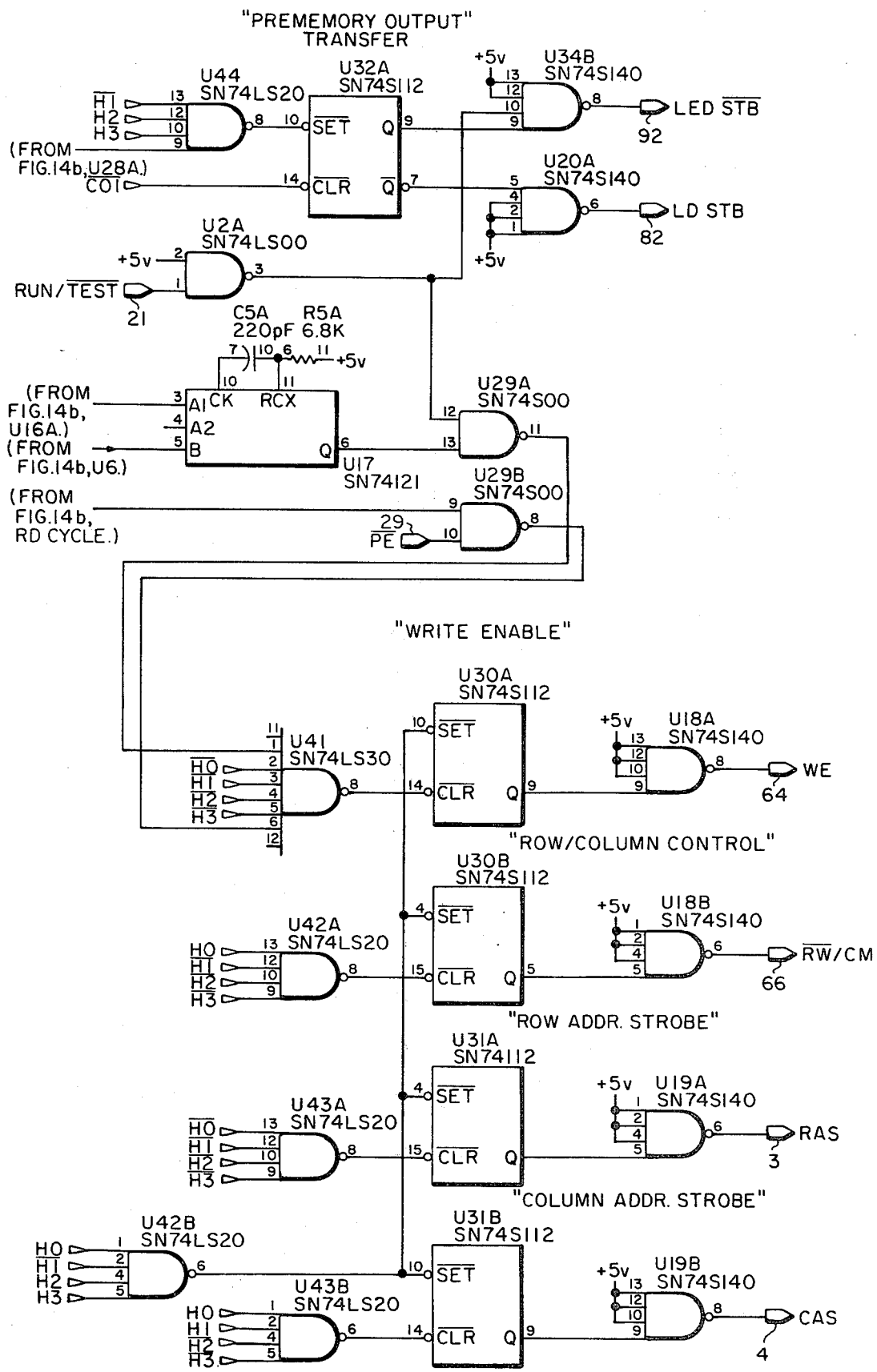
FIG.14f A9, TIMING AND CONTROL.

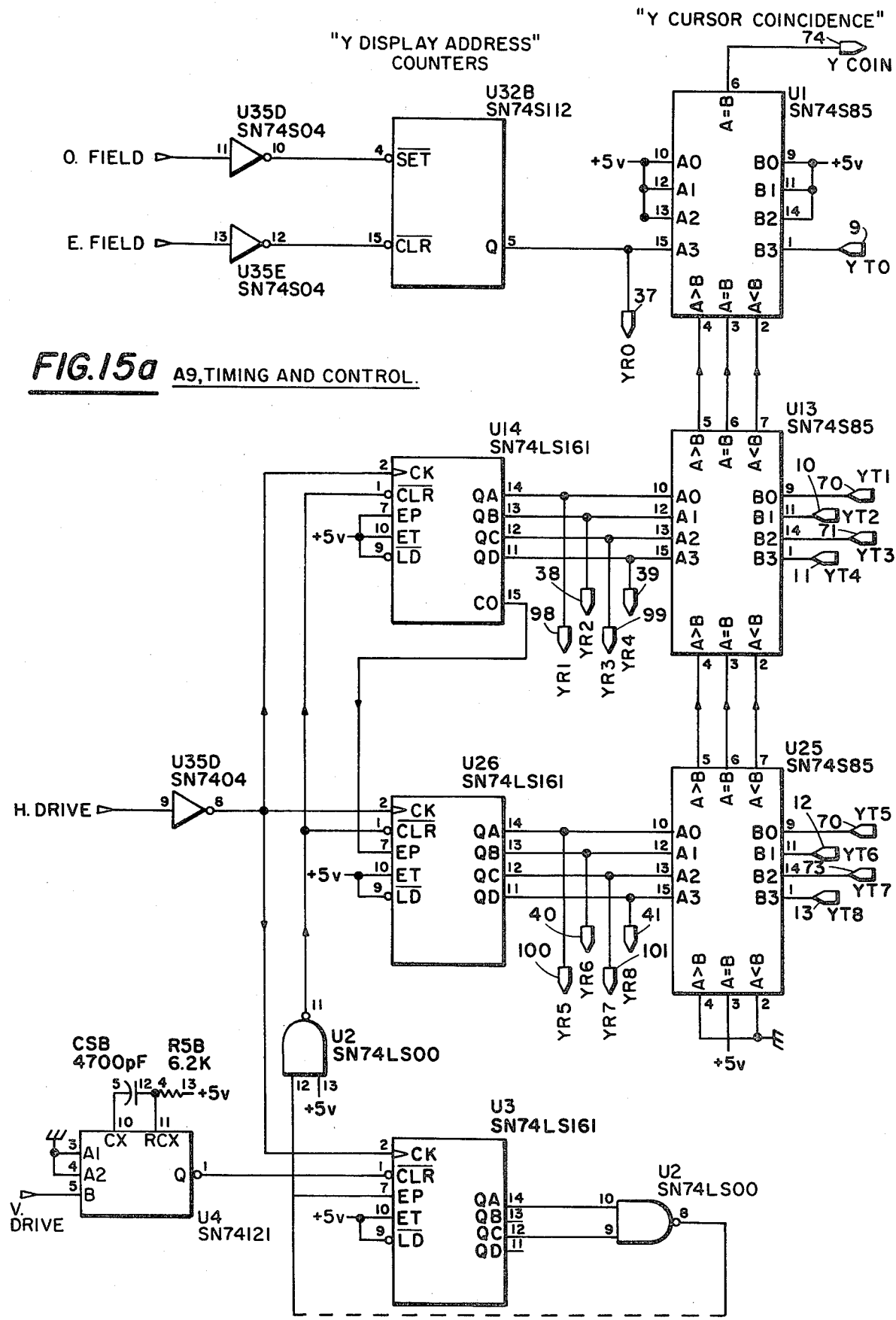
FIG.15a A9, TIMING AND CONTROL.

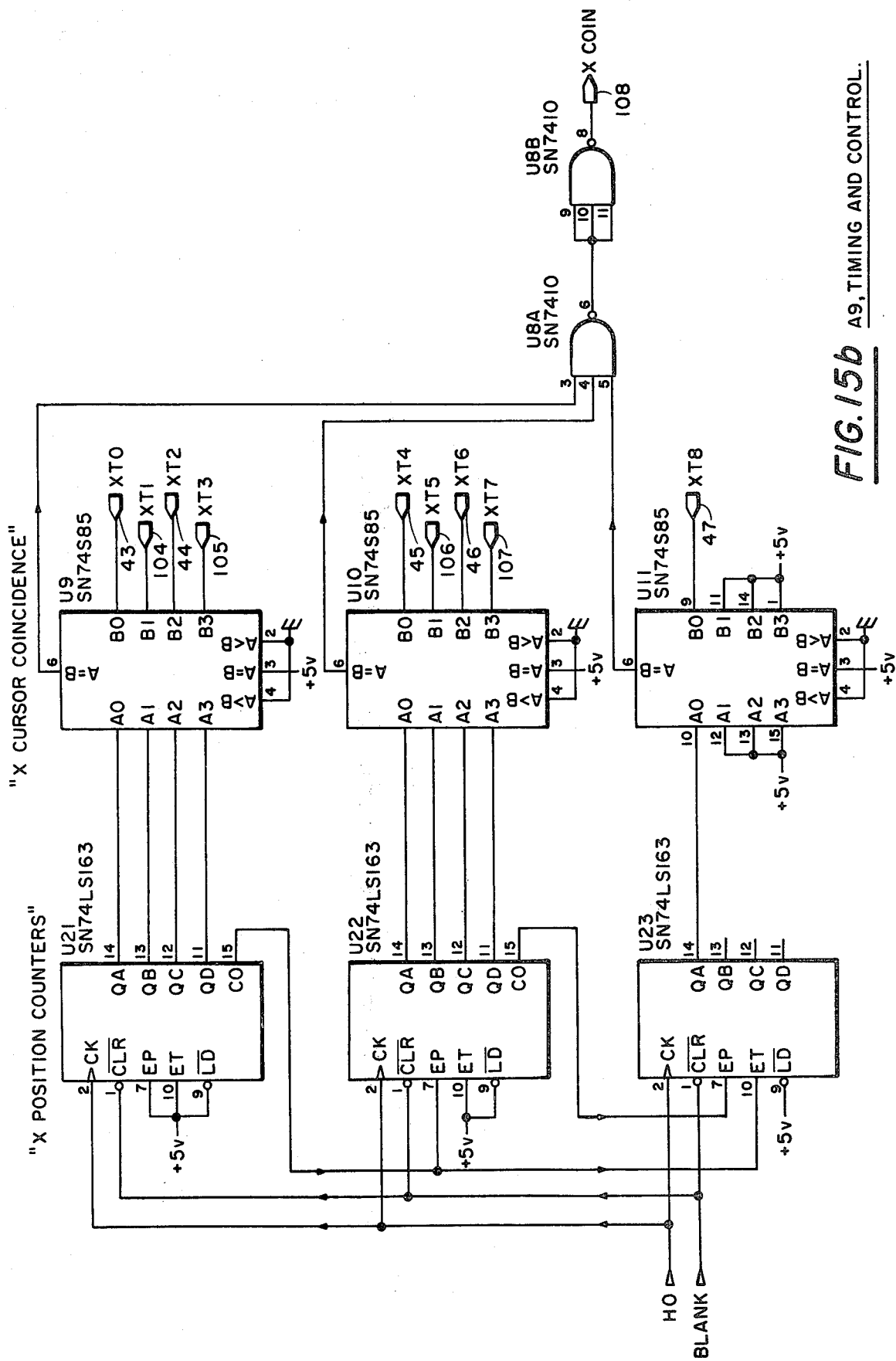
FIG.15b A9, TIMING AND CONTROL.

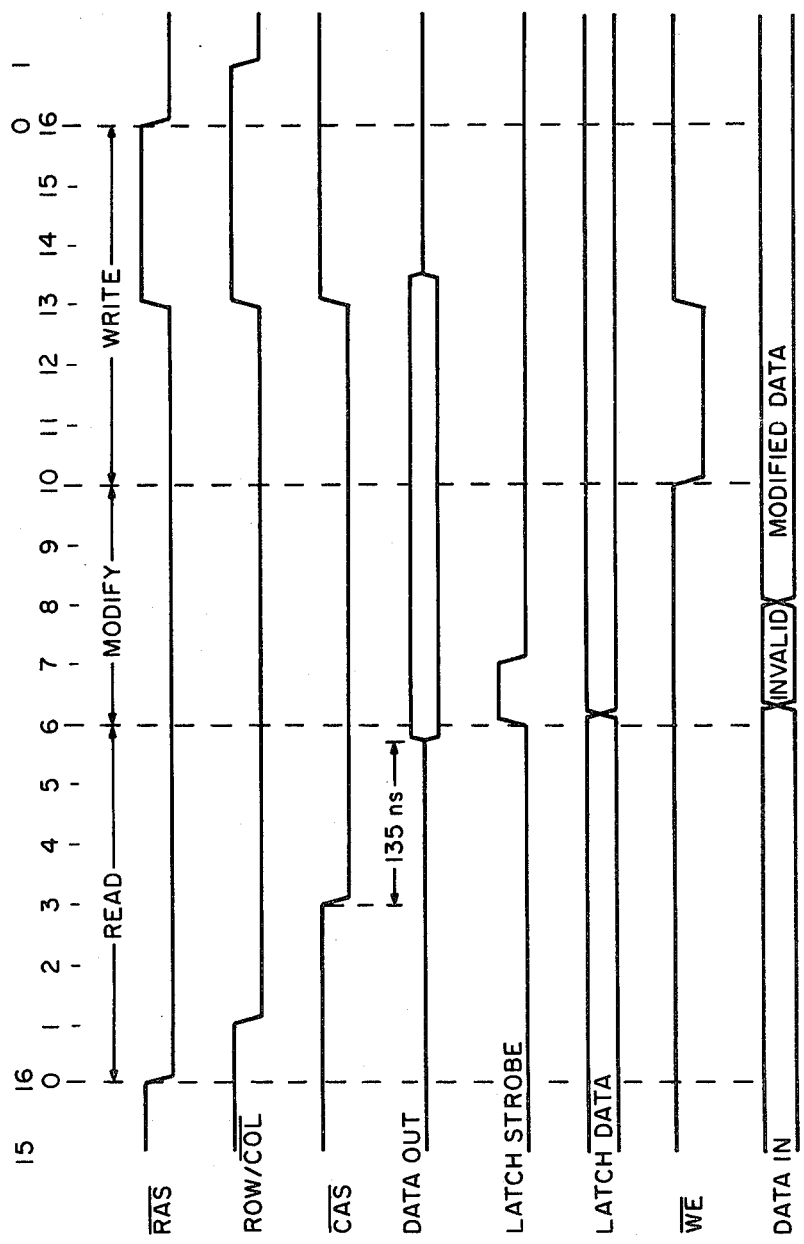
FIG. 16 MEMORY CYCLE TIMING.

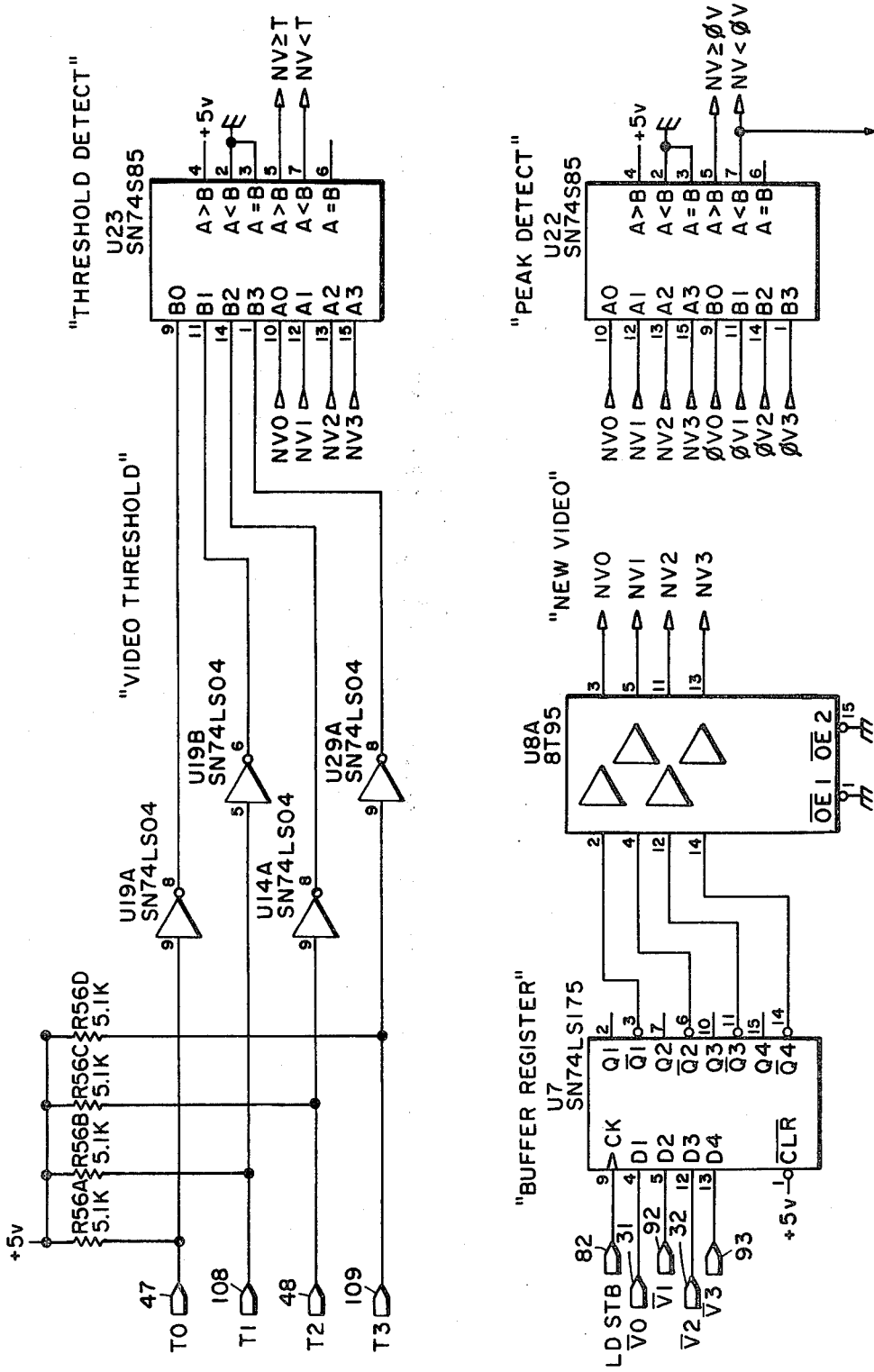

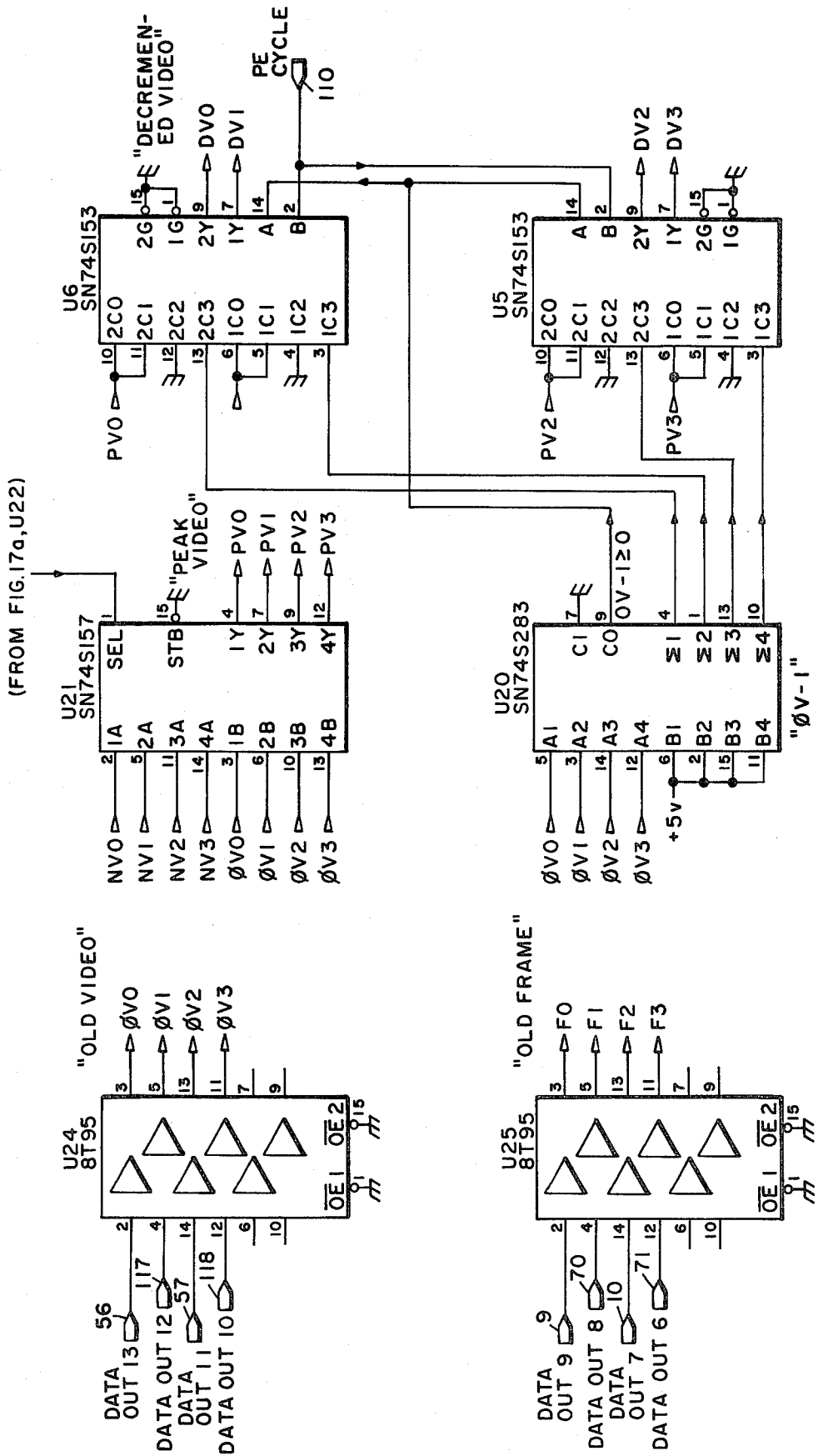
FIG.17b A10, FRAME AND HISTORY ENCODE.

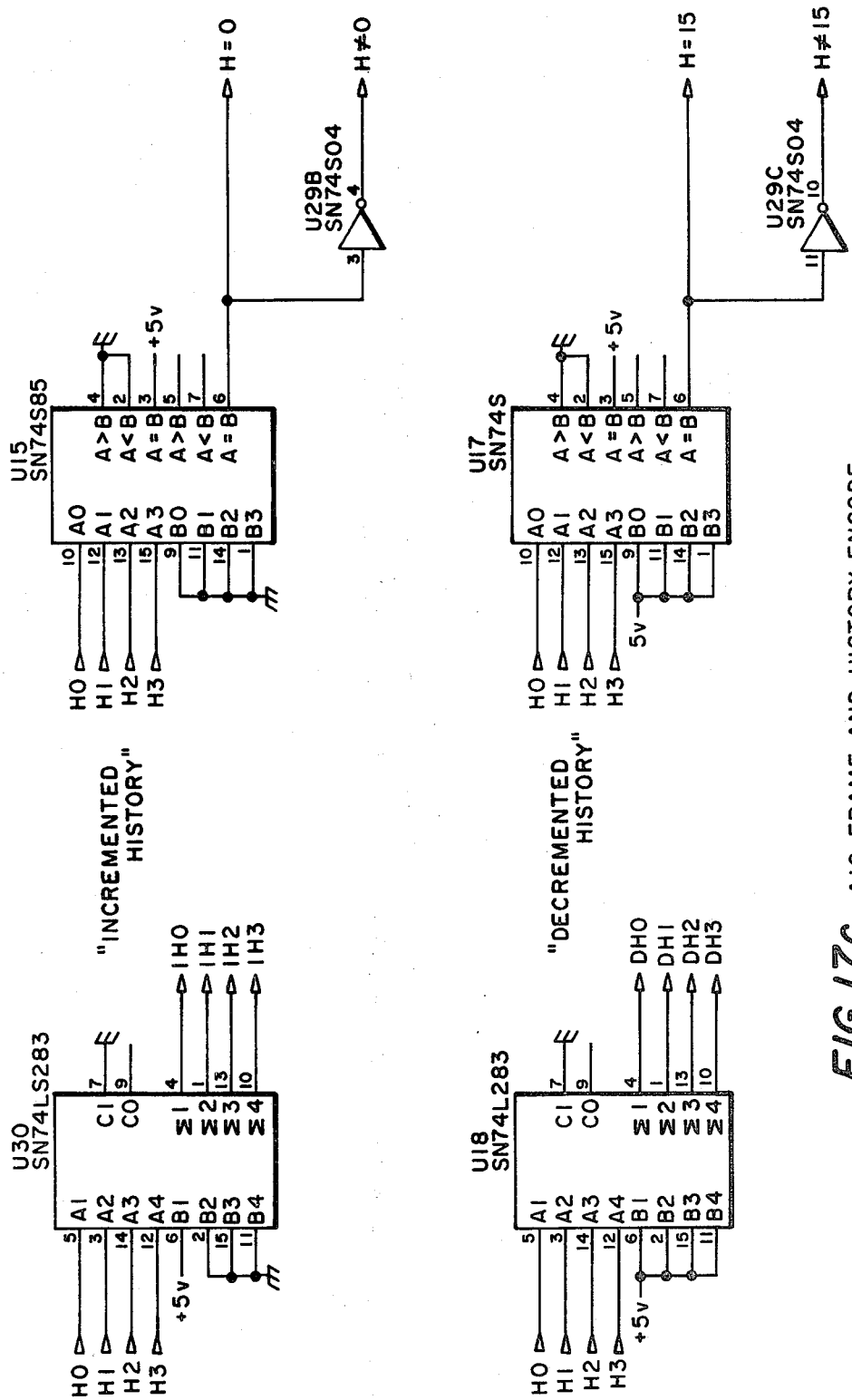
FIG. 17c  A10, FRAME AND HISTORY ENCODE.

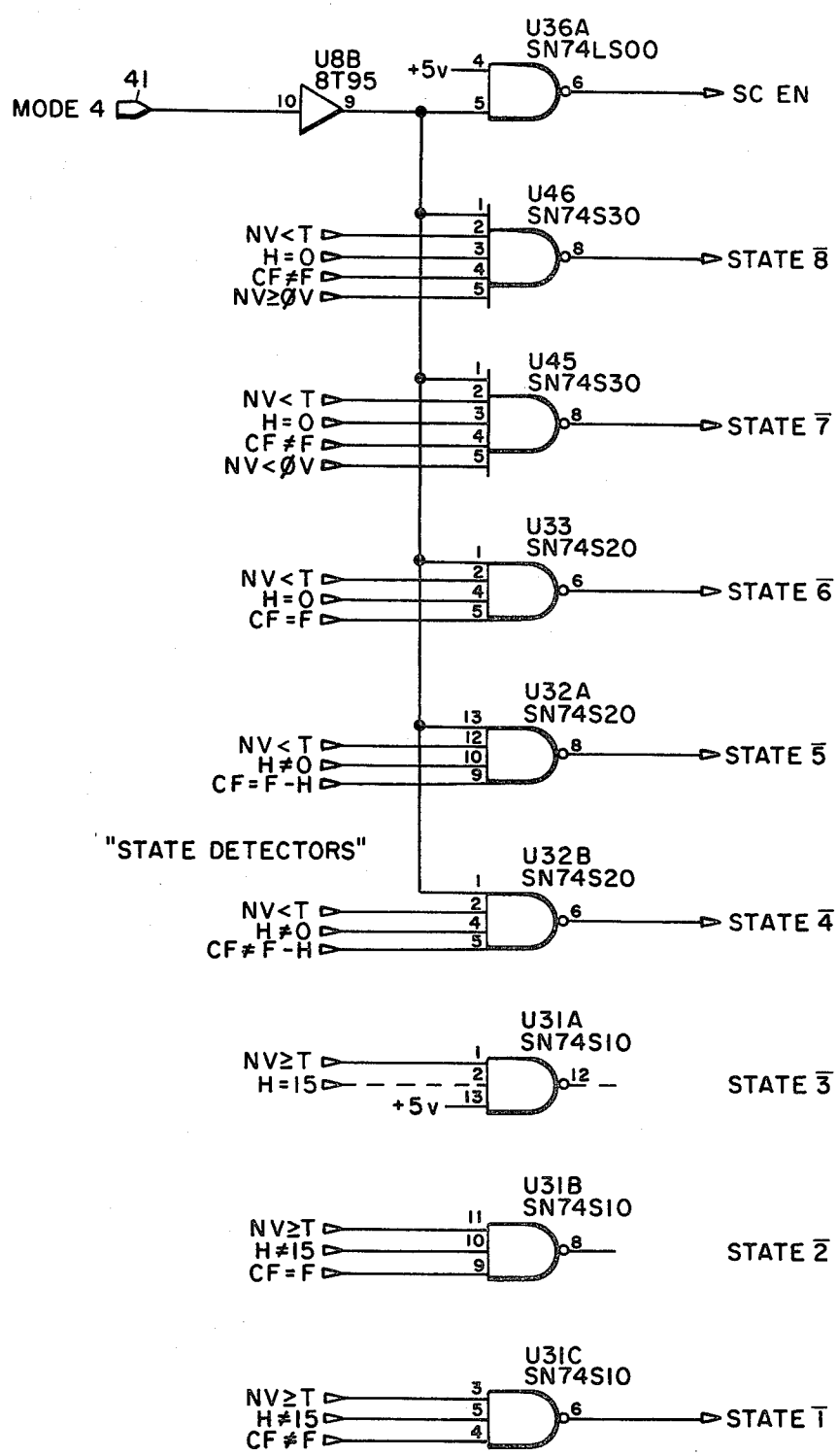
FIG.17d AIO, FRAME AND HISTORY ENCODE.

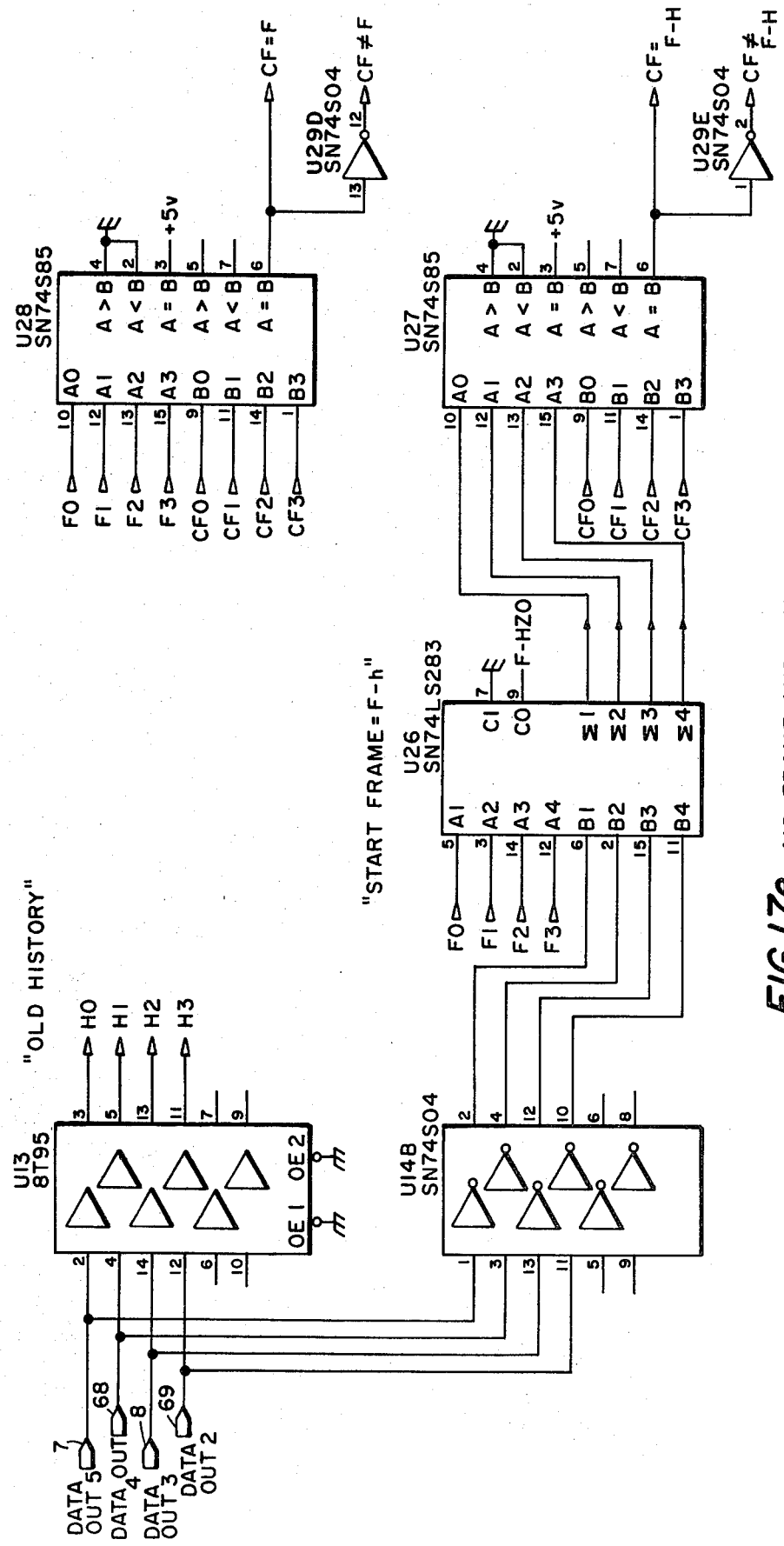
FIG.17e  AIO, FRAME AND HISTORY ENCODE.

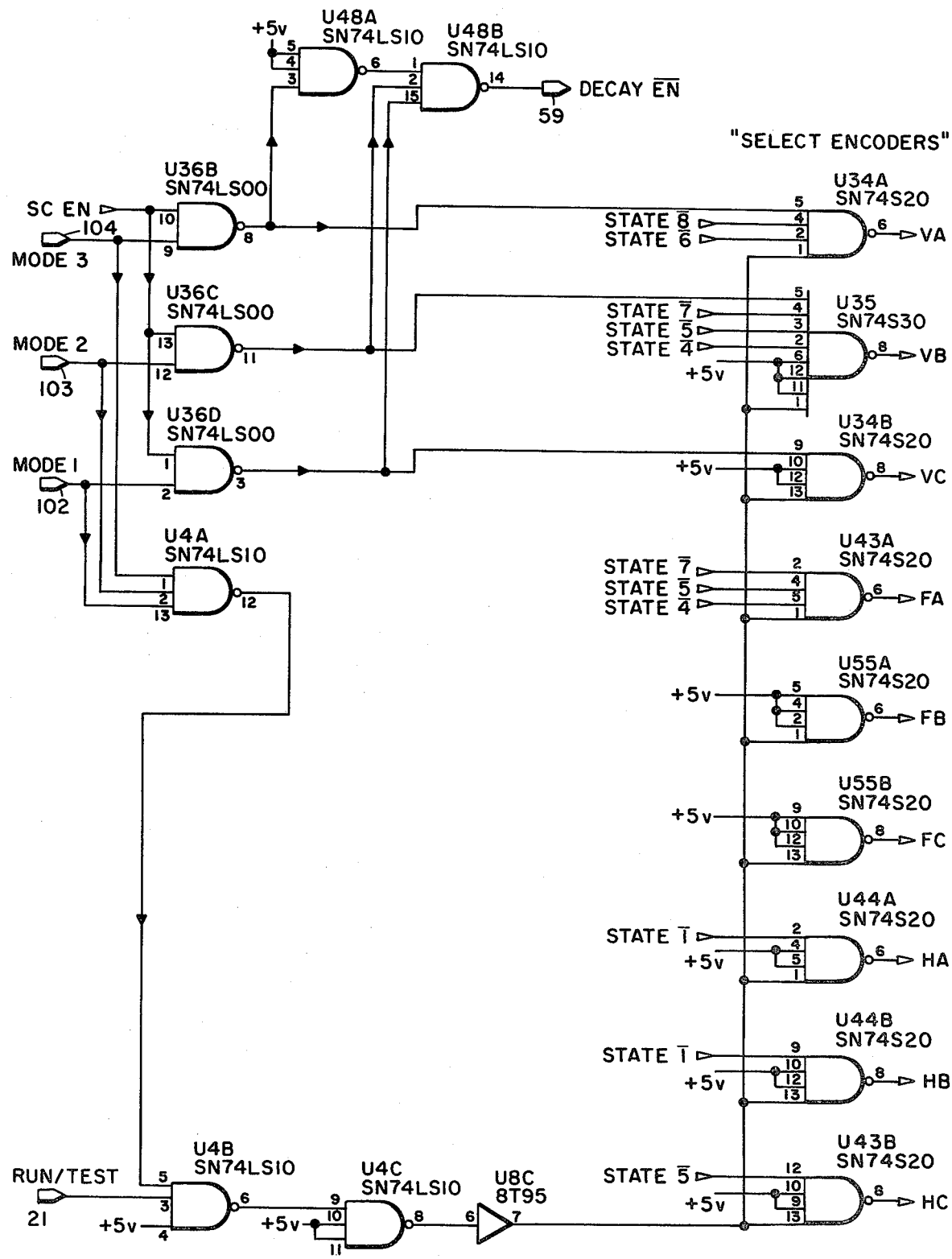
FIG.18a  A10,FRAME AND HISTORY ENCODE.

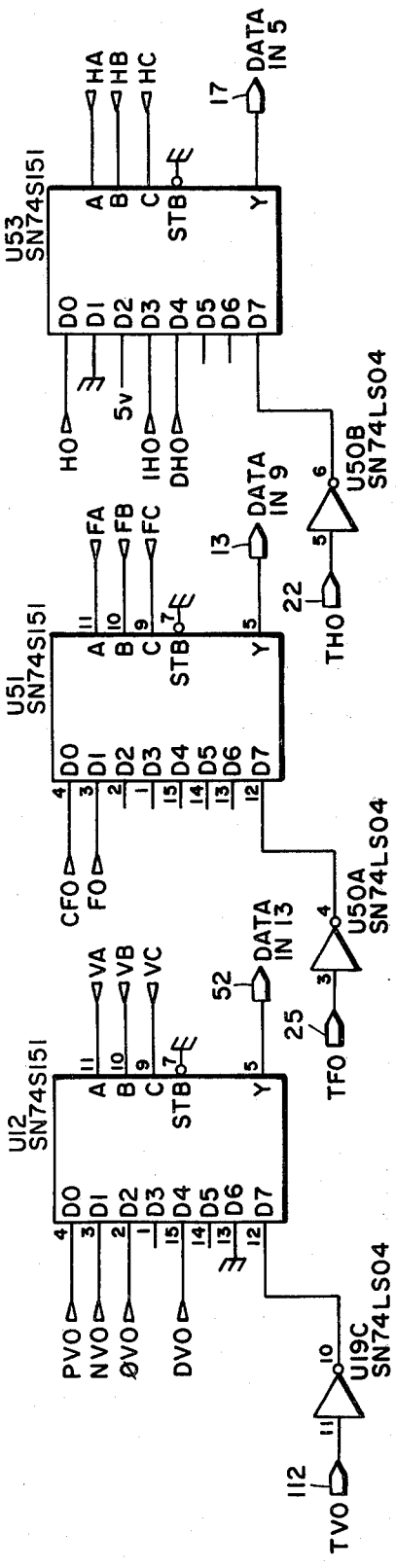
FIG.18b  AIO, FRAME AND HISTORY ENCODE.

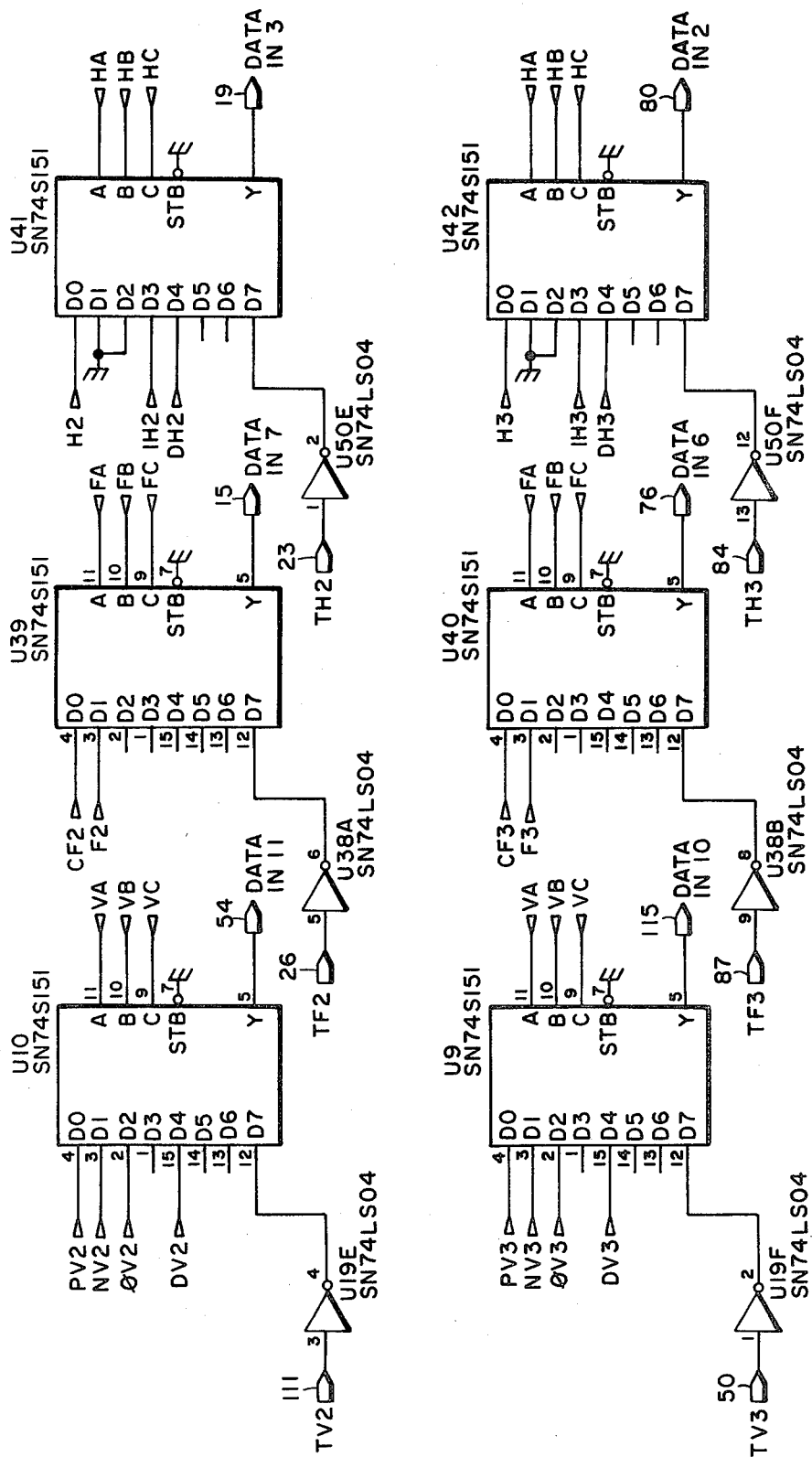

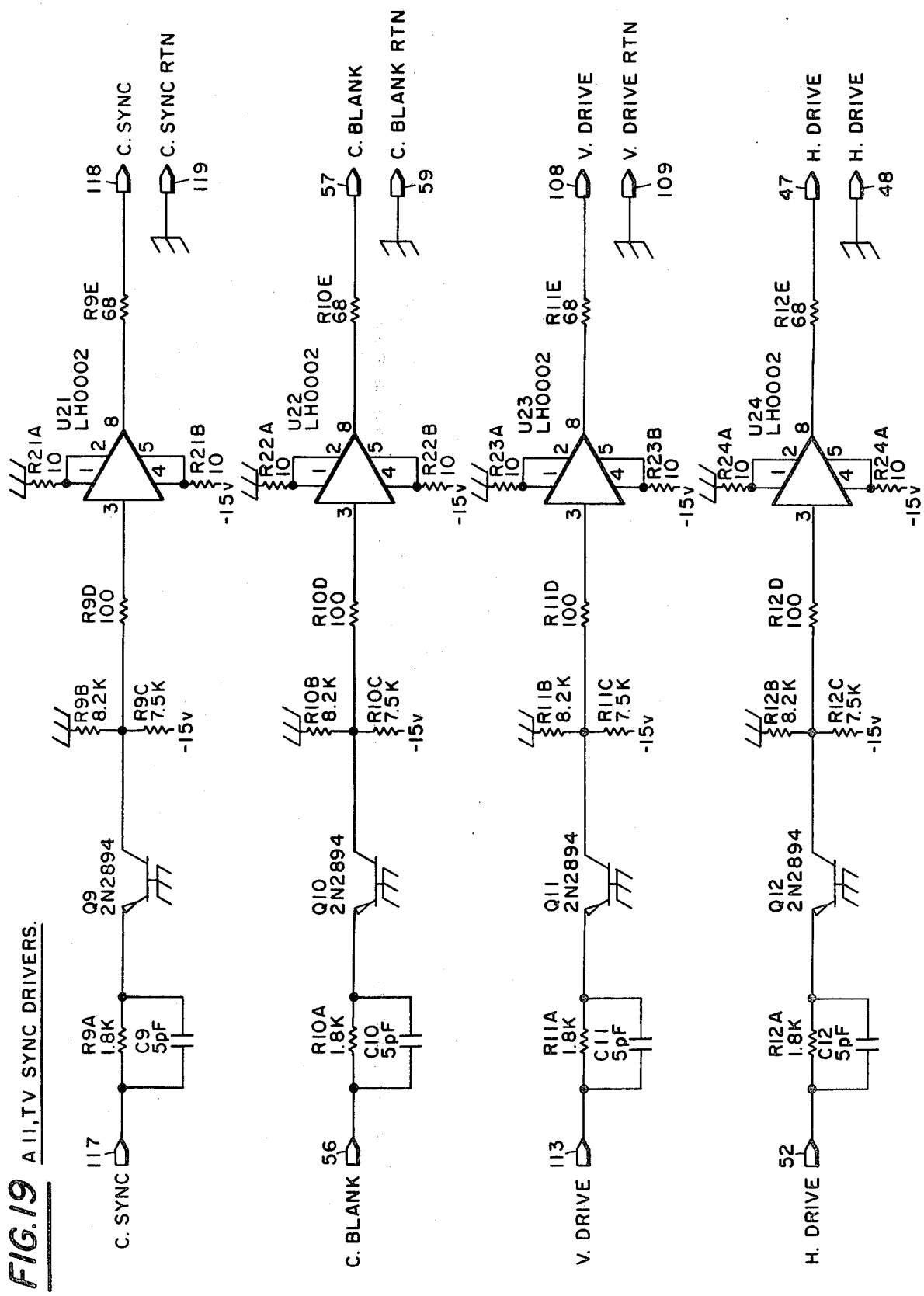
FIG.19 A11, TV SYNC DRIVERS.

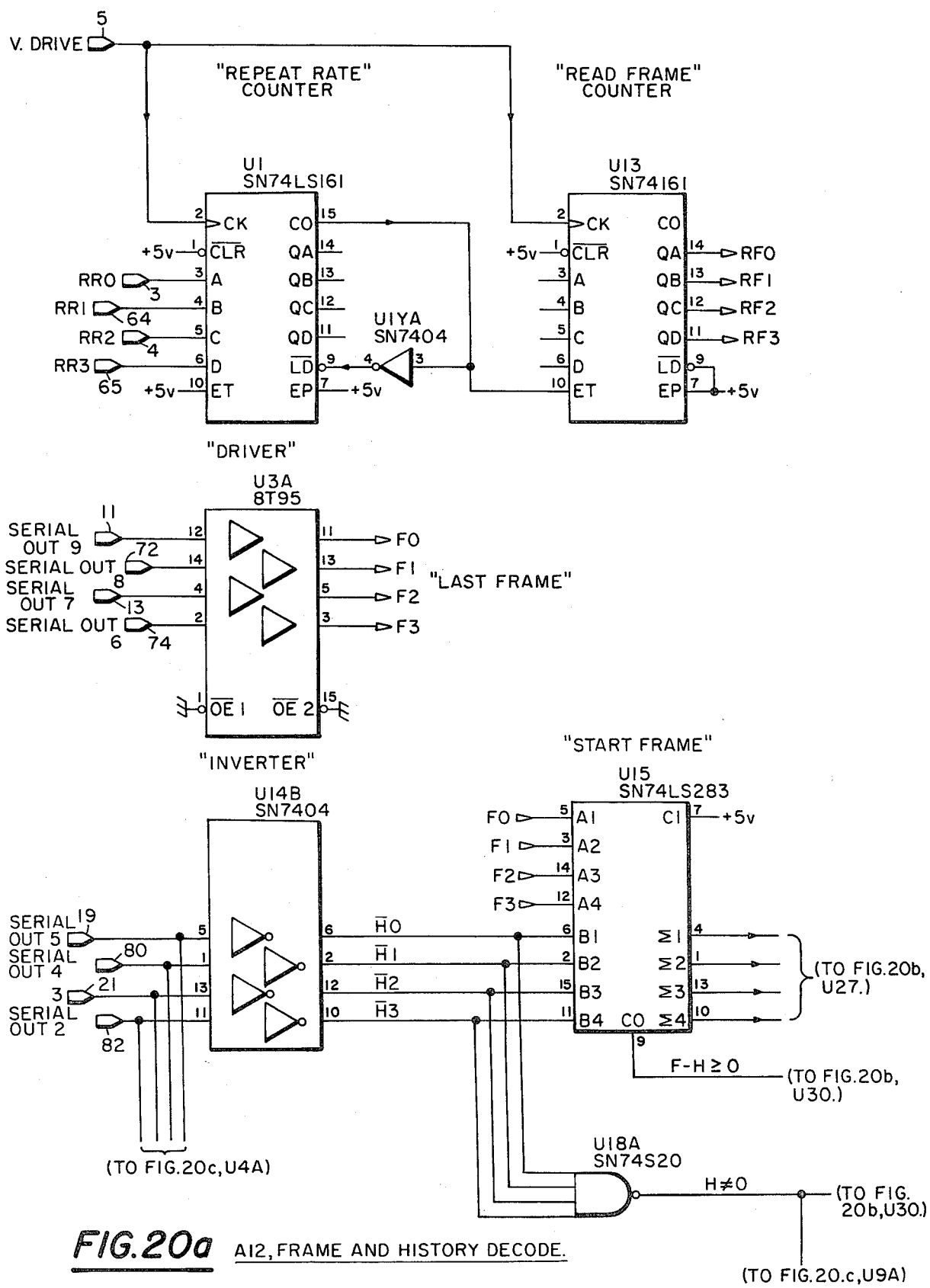
FIG.20a  A12, FRAME AND HISTORY DECODE.

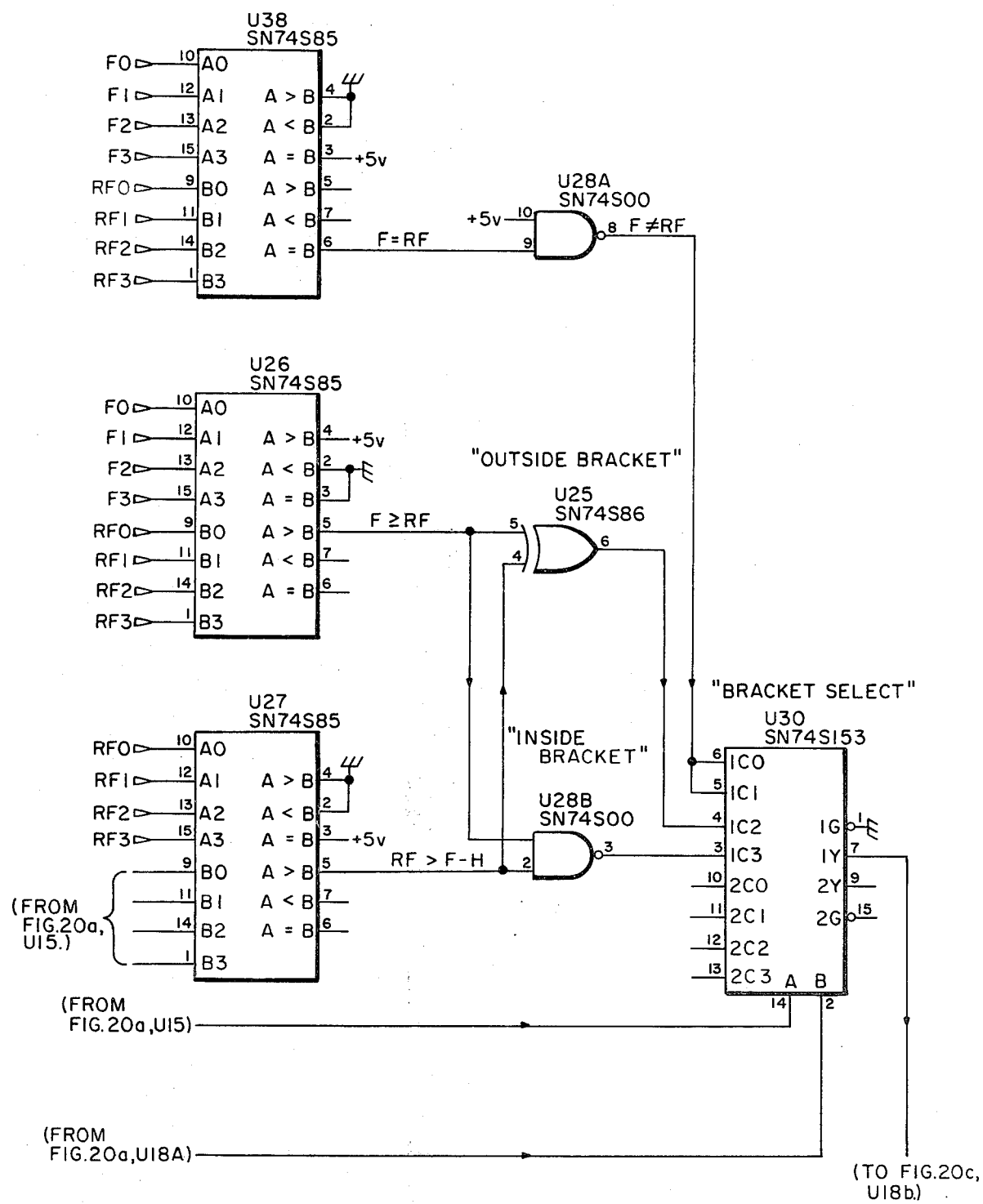
FIG.20b  A12, FRAME AND HISTORY DECODE.

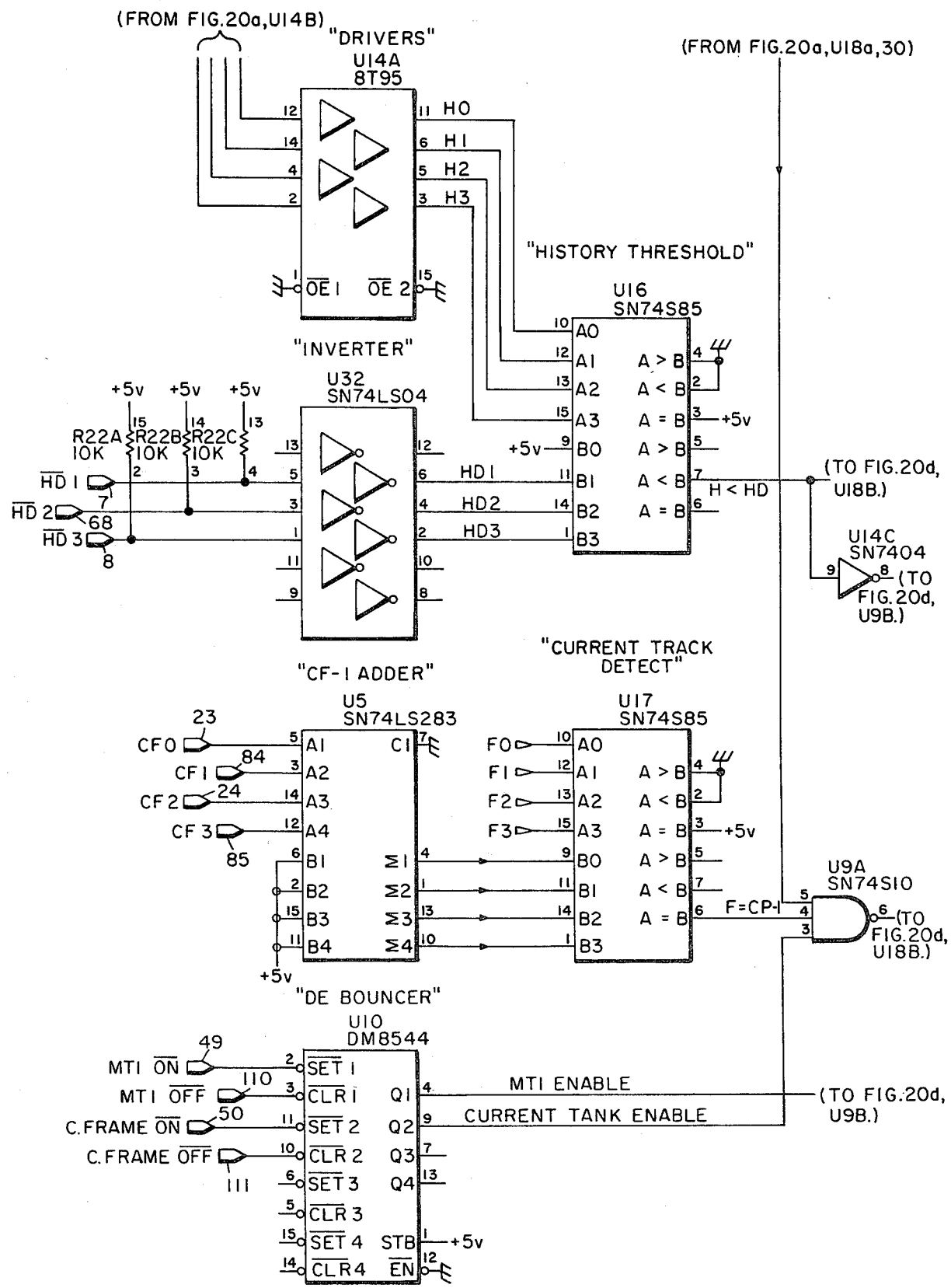
FIG.20c  A12, FRAME AND HISTORY DECODE.

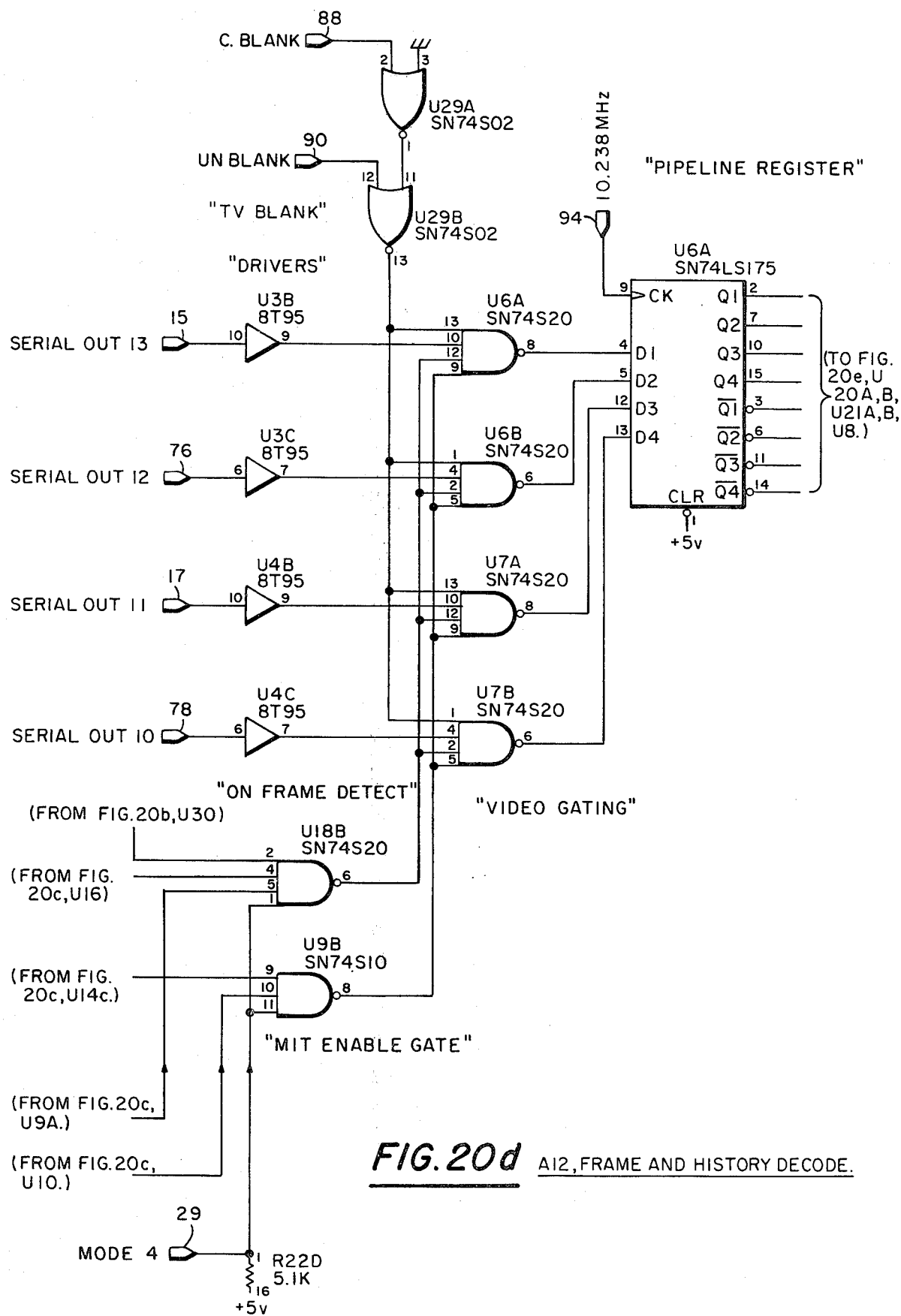
FIG.20d  A12, FRAME AND HISTORY DECODE.

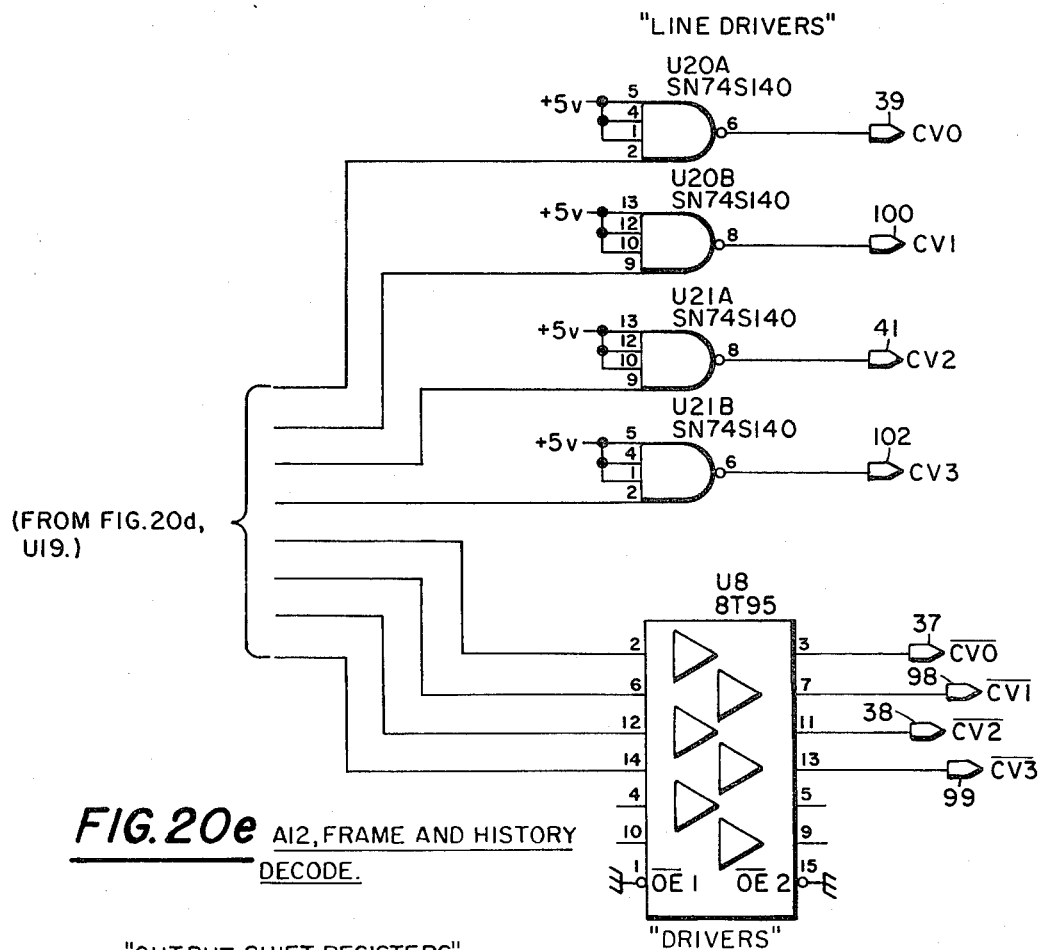
FIG.20e  A12, FRAME AND HISTORY DECODE.
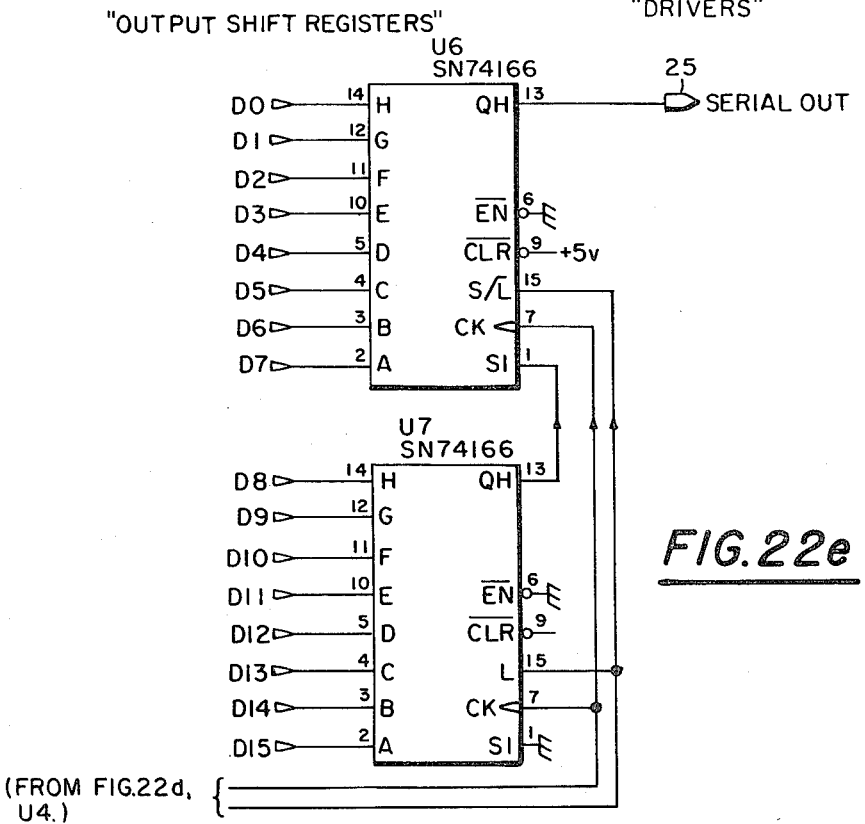
FIG.22e  MAIN MEMORY.

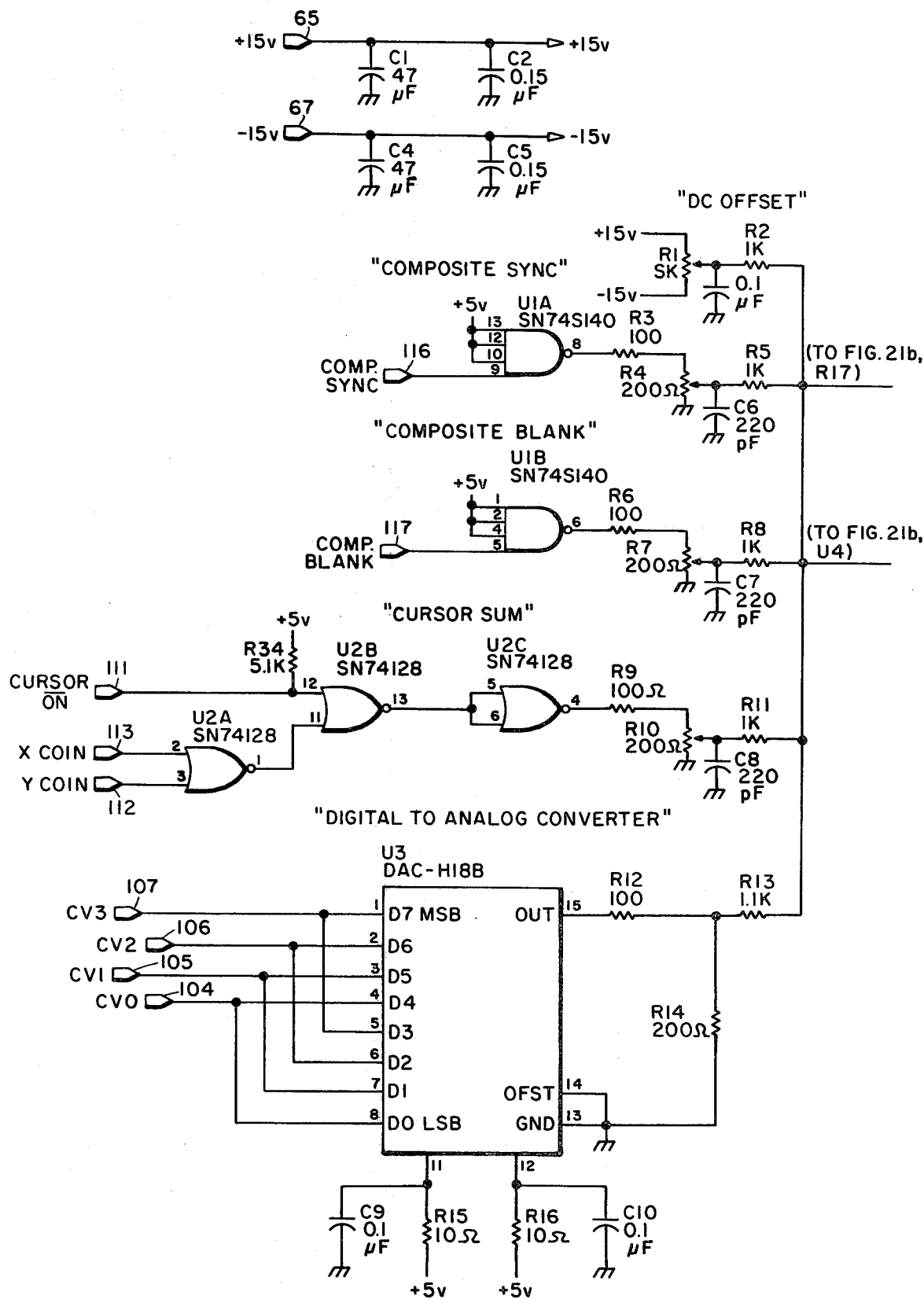
FIG. 21a A13, VIDEO SUM.

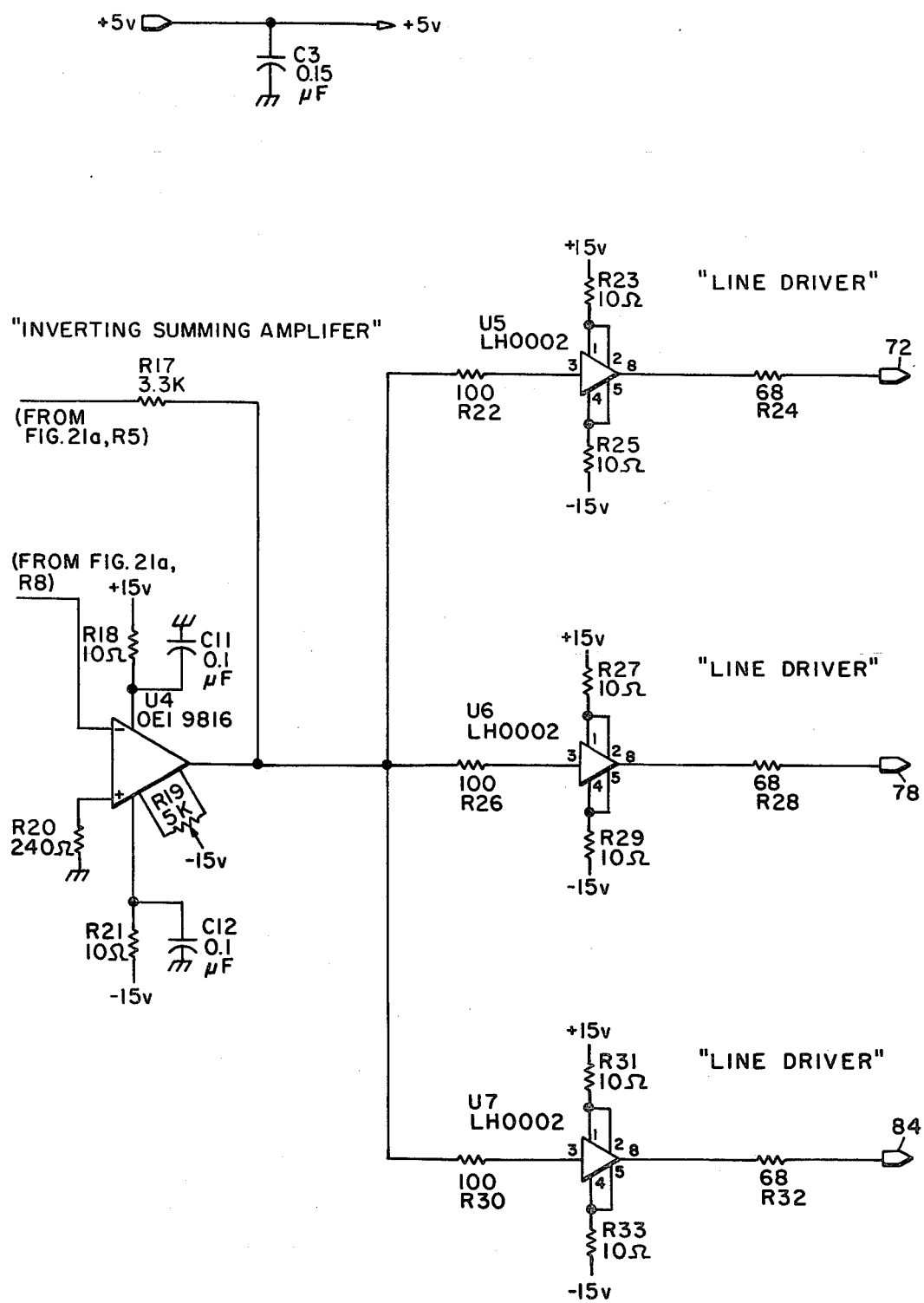
FIG.21b  A13, VIDEO SUM.

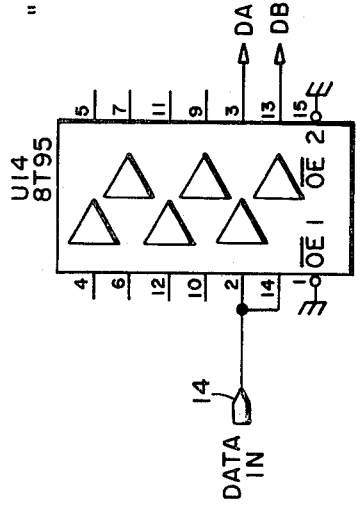
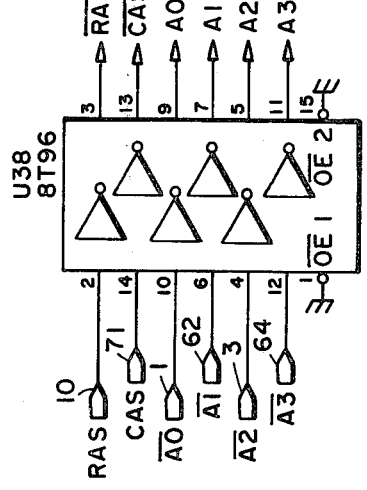
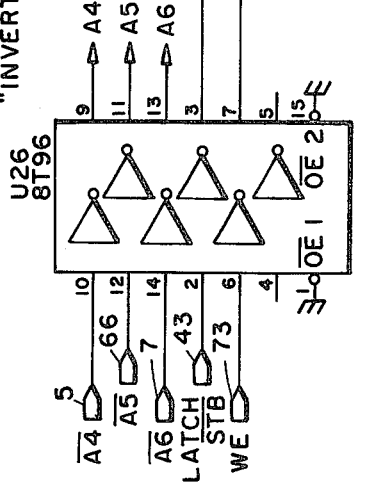
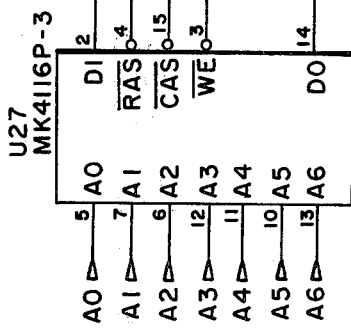
FIG. 22a  MAIN MEMORY.

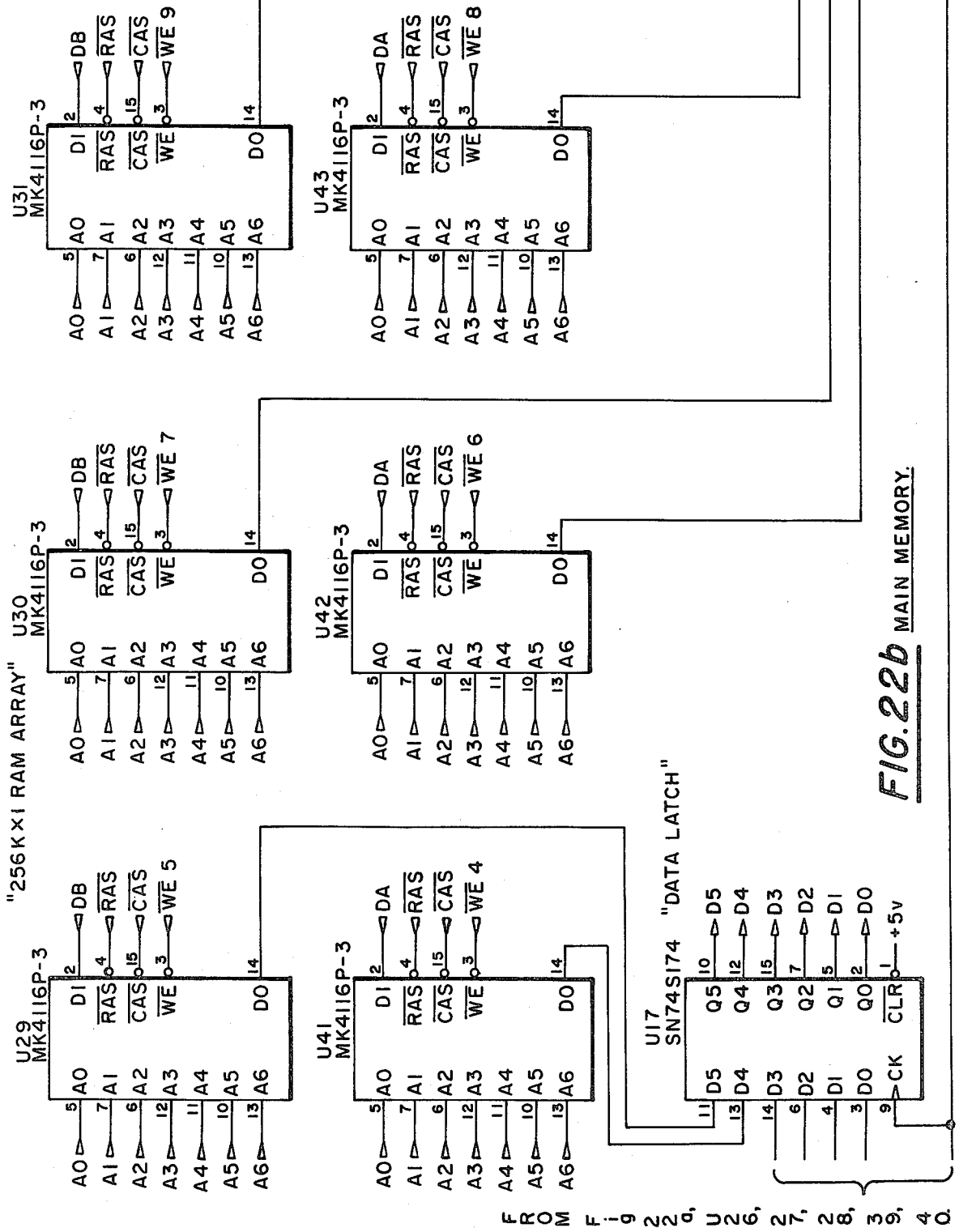
FIG.22b MAIN MEMORY.

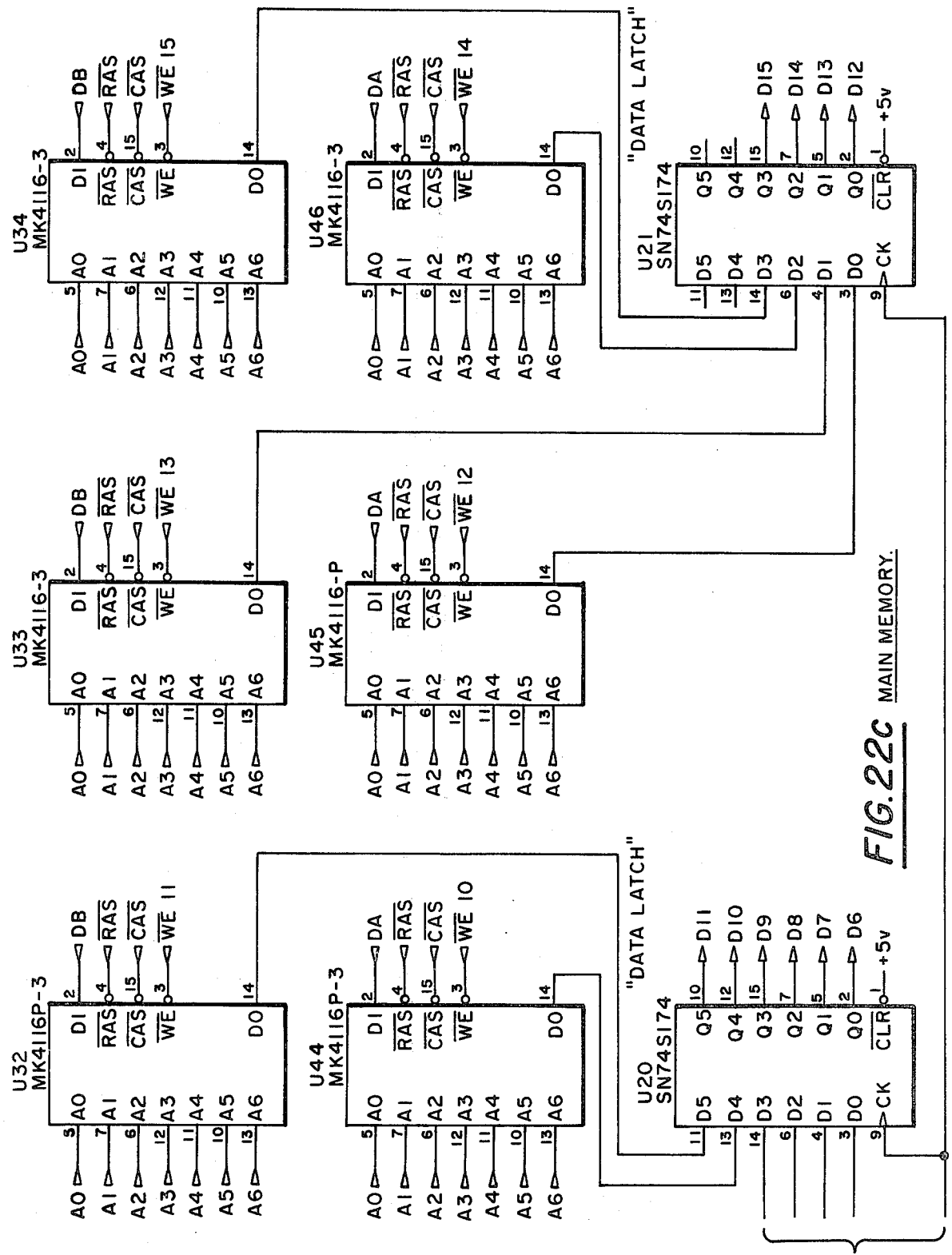
FIG. 22c MAIN MEMORY.

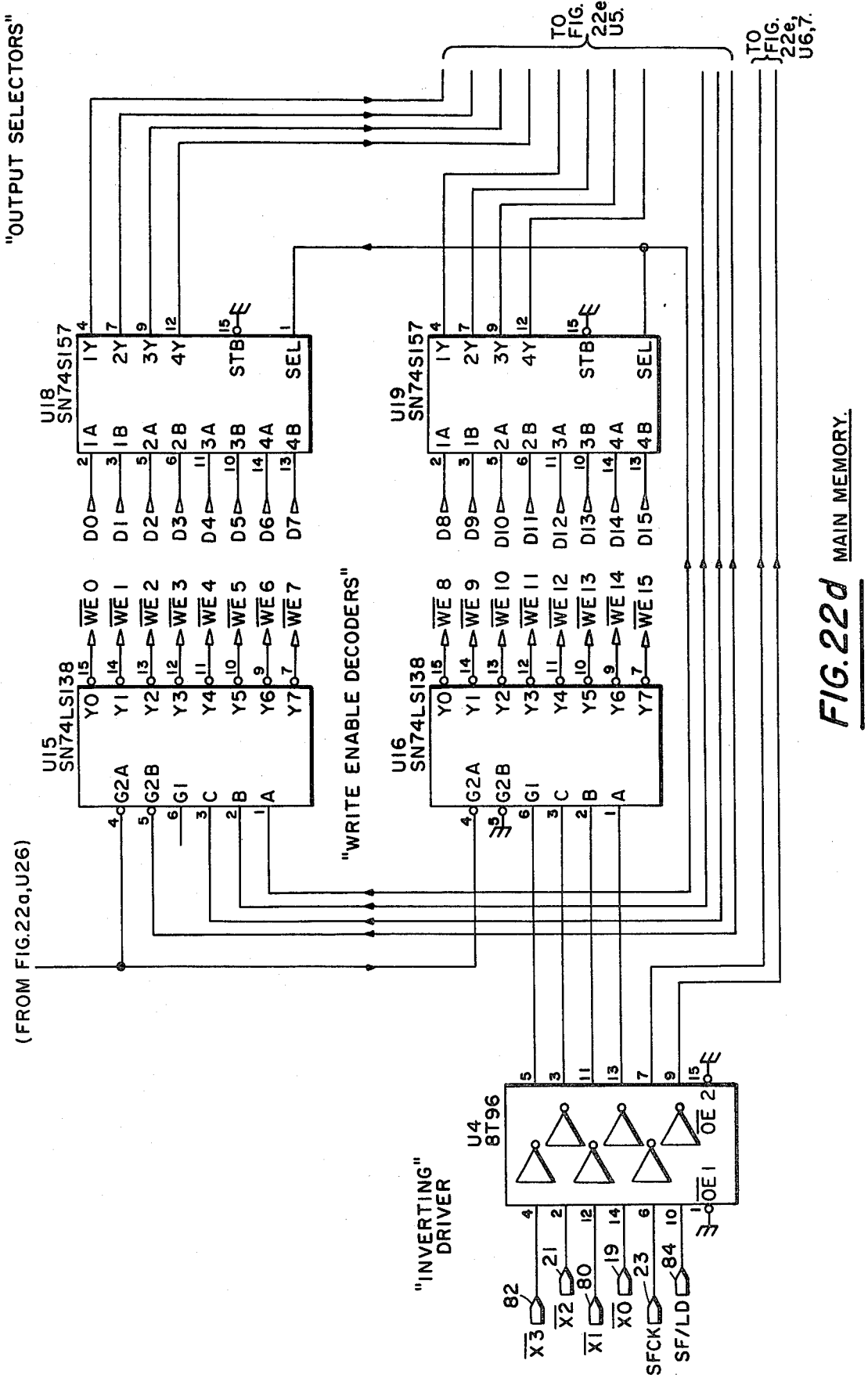
FIG. 22d MAIN MEMORY.

TIME ENCODED SPATIAL DISPLAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to radar systems and more particularly to time compressed display of radar video signals.

In any time compressed display, signals or data which has been accumulated over a long period of time may be presented to the operator in a very short time span, for instance, at T.V. frame rates. FIG. 1 is a block diagram of a conventional prior art design used for a time compressed radar display. Referring now to FIG. 1 this prior art technique will be described. Typically, incoming radar video data in the form of analog signals is converted to digital signals via analog-to-digital converter 12. Incoming radar position data is converted from its polar coordinate format by scan converter 14 to a rectangular coordinate format which is T.V. compatible. Every time the radar scanning antenna completes a revolution, the entire radar video history for that scan is stored on a T.V. video disc or some other bulk storage medium 16. The entire video history for each scan is thus stored. A write frame counter 18 is incremented once each antenna revolution by the antenna once around network 20 and is used to generate an address to put the frame of data in storage. For storing 16 frames of incoming video information, for instance, a four-bit write frame counter would be used. The write frame counter is typically a modulo counter which in real time is counted from 0 to 15 (in the present example) over and over again. At the end of each antenna scan the video return for that scan is used to replace the previously stored frame with the current frame of data for the most recent scan. This allows the video disc bulk storage area to always contain the video returns for the most recent 16 scans (in the present example) of the antenna. At the output, the read frame counter 22 is used to address the frames in bulk storage 16 in chronological order, i.e. the order in which they were recorded. The reading from the bulk storage area 16 is typically done at 525 line T.V. rates with the read frame counter 22 being incremented once per T.V. frame time. This is done under control of the timing and control network 24. The data is read out of the bulky memory 16 via T.V. formatter 26 to a T.V. display. An operator looking at the display sees the history of the last 16 (in the present example) antenna scans presented to him over and over again at T.V. frame rates. This presentation allows the operator to readily detect moving targets on the screen through the clutter.

The problem with this approach is that there is a significant degree of frame-to-frame redundancy and the bulk memory requirements are enormous.

SUMMARY OF THE INVENTION

The present invention relates to a technique and apparatus for a time compressed display and more particularly to a time compressed radar display. The present invention is an apparatus and technique for a time encoded spatial display (TIESPAD) that records events occurring in a defined space over a period of time and breaks the space down into small cells and codes the data in each cell to reflect the significance of the data and the time of activity, thereby reducing memory needs significantly. More particularly, incoming radar video return signals are time and history tagged over a predetermined number of radar scans. Such encoding of the incoming radar video return signals is further accompanied by providing a memory address to each of the data cell signals. The stored data is decoded at the output of the system of the present invention to generate a time compressed display. This time compressed display is a unique and efficient method of generating a time compressed radar display and eliminates the need for a huge bulk memory normally found in time compressed display systems.

More particularly, a scan conversion from polar to rectangular coordinates is performed to convert the radar azimuth and range data into rectangular coordinates. The scanned area is broken down into a rectangular format of data cells so as to be compatible with being read out at T.V. rates. A read and write frame counter are used similarly as in the prior art system described with respect to FIG. 1 above. During each scan of the radar antenna, however, every cell the radar beam covers is converted to an X, Y address and the peak or average of video occurring in the cell is attached to the corresponding address. Logic circuitry examines the contents of every memory location which is thus addressed. In real time, at each memory location three basic things are stored: (1), the highest value of video occurring in that cell during the most recent n scans of the antenna; (2), the number of antenna revolutions during the last n scans of the antenna in which the video level exceeded the threshold level; (3), the last frame count on which the video level exceeded the threshold.

No attempt is made to store all the radar video which comes in during the n scans of the antenna. This is the major advantage of the present invention over conventional time compressed radar display systems.

At the output end the time compressed display is generated by decoding the three data items described above to determine on what frame counts of the read frame counter the video for each of the data cells should be displayed. Thus a significant savings in memory and cost is achieved.

OBJECTS OF THE INVENTION

It is the primary object of the present invention to disclose a unique time compressed display technique and apparatus requiring a substantially smaller memory than prior art systems.

It is a further object of the present invention to disclose a unique method and apparatus for generating a time compressed display for a radar system.

These and other objects of the invention will become more readily apparent from the ensuing specification when taken together with the drawings.

BRIEF DESCRIPTION OF THE DRAWINGS

FIGS. 3a and 3b are a network diagram of a modularized form of the time compressed display of the present invention.

FIGS. 4a, 4b, 4c, 4d, 5a, 5b, 6a, 6b, 7a, 7b, 7c, 7d, 7e, 7f, 8a, 8b, 8c, 8d, 9a, 9b, 9c, 9d, 10a, 10b, 10c, 10d, 11a, 11b, 11c, 11d, 12a, 12b, 12c, 12d, 13a, 13b, 13c, 13d, 14a, 14b, 14c, 14d, 14e, 14f, 15a, 15b, 15c, 16, 17a, 17b, 17c, 17d, 17e, 17f, 18a, 18b, 18c, 19, 20a, 20b, 20c, 20d, 20e, 21a, 21b, 22a, 22b, 22c, 22d and 22e are detailed network and timing diagrams of actual circuit cards suitable for implementation of the modular design of the present invention illustrated in FIG. 3.

DESCRIPTION OF THE PREFERRED EMBODIMENTS

Figure 2:
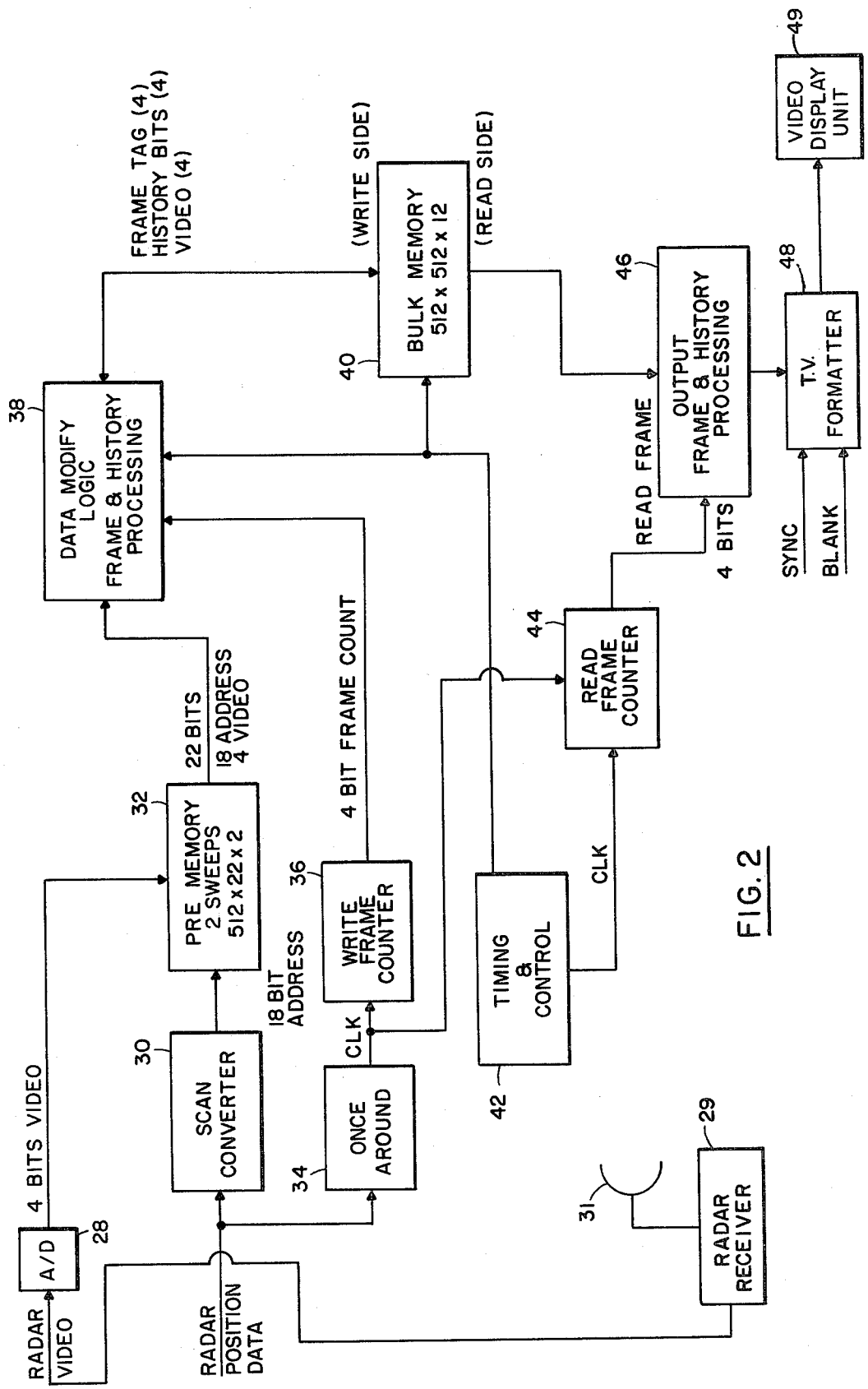
FIG. 2 is a schematic block diagram of the apparatus of the time compressed display system of the present invention.
Figure 13C:
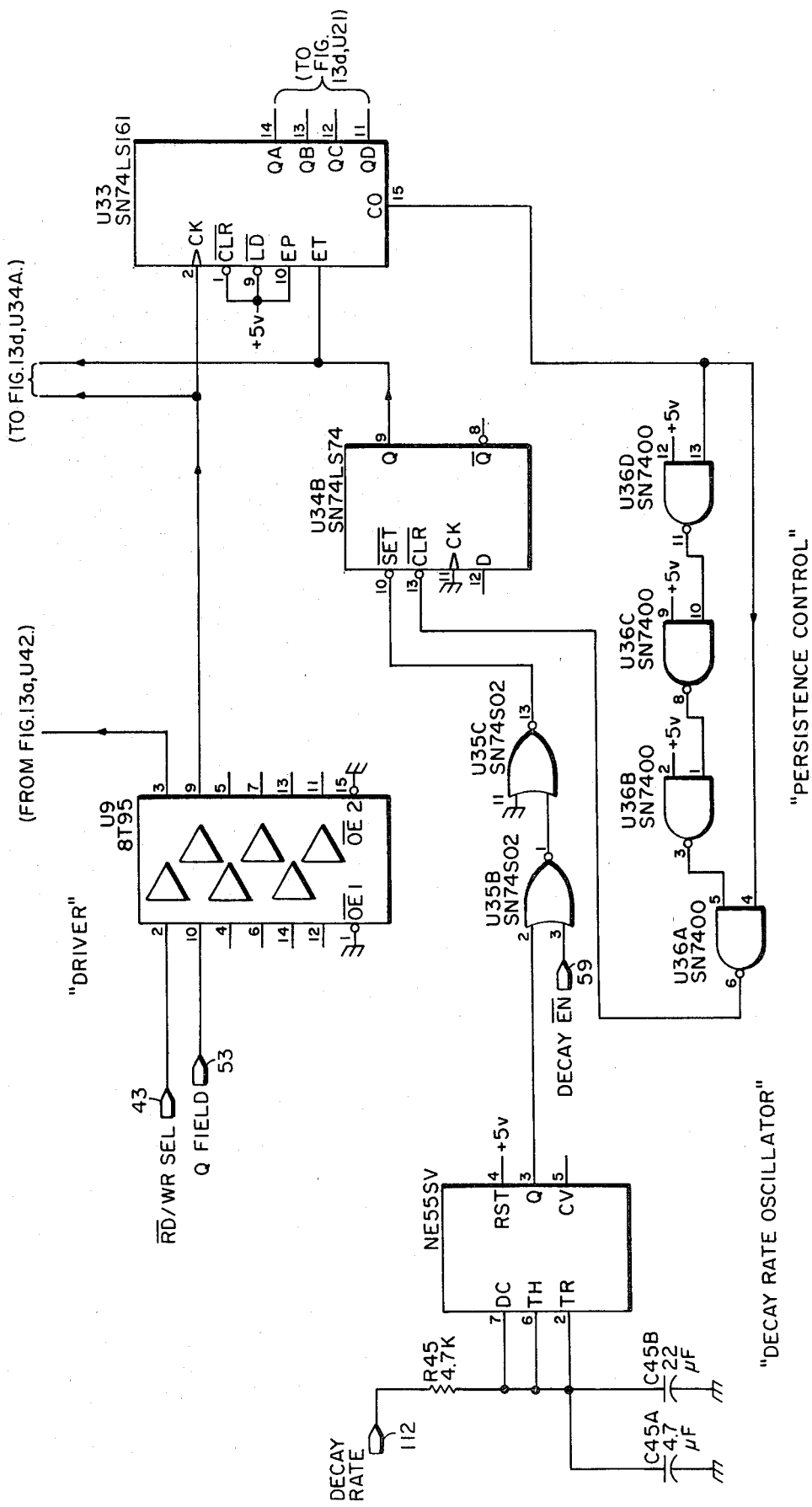

Referring now to FIG. 2, the technique and apparatus of the present time compressed display will be described. The present invention as described herein is directed to an output T.V. display containing 512×512 display cells. Further, as described herein the present invention is directed to radar return video words of 4-bits, 4-bit frame words and 4-bit history words to be defined below. Notwithstanding these specific values of word length and output display requirements and the other specific values stated herein, it is to be understood that the present invention is not limited to these specific values and that output displays of different sizes and different word lengths may be utilized within the scope of the present invention.

Figure 1:
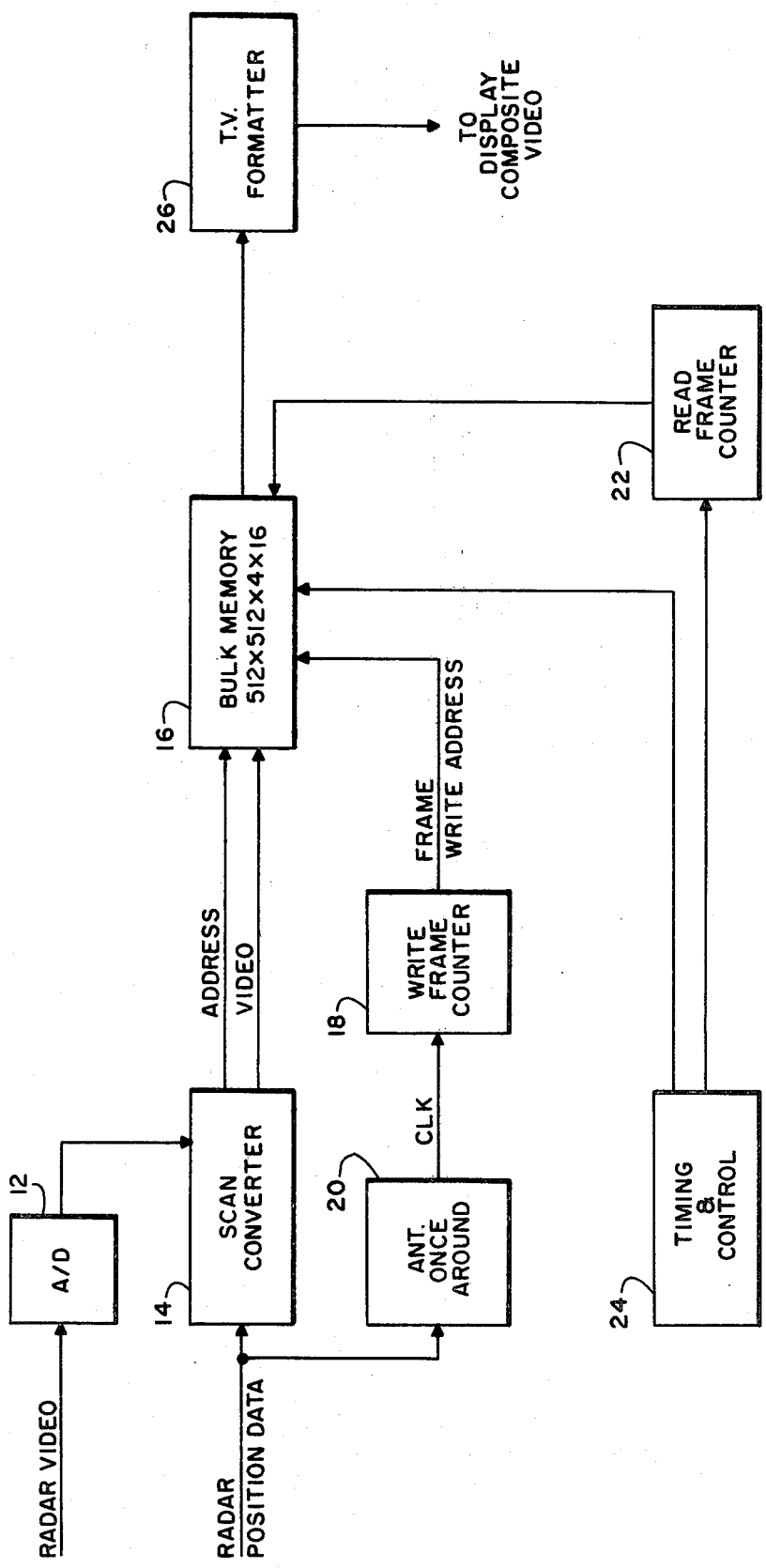
FIG. 1 is a schematic block diagram of a prior art radar display system.

As in the prior art system of FIG. 1, the radar video return signal is received in analog form by A/D converter 28 via radar receiver 29. In the present embodiment this analog video return signal is converted by the A/D converter 28 to a 4-bit digital video signal. Each 4-bit word represents one of 16 gray shades. The analog processing of A/D converter 28 includes DC restoration, gain control, peak or average detection and low-pass filtering as is well known. It should be understood at this point that the hardware illustrated in FIG. 2 is suitably coupled to a radar system having a radar scanning antenna 31 and a radar position data output which is in a polar coordinate format.

Scan converter 30 receives the radar polar coordinate position data and converts this radar azimuth and range data into rectangular format, i.e. X, Y coordinates. Thus an 18-bit address, in the present example, is assigned to each 4-bit video word from the output of the A/D converter 28. Every cell covered by the radar beam is thus converted to an X, Y address by the scan converter 30 and the peak or average of video occurring in the cell is attached to the 18-bit address (for a 512×512 rectangular bulk memory). The 4-bit video word for each cell covered by the radar beam and its associated 18-bit address is stored in prememory 32. Once around pulse generator 34 generates a signal pulse every time a revolution of the scanning antenna is completed and this signal is used to clock the write frame counter 36. The output of the write frame counter 36 is a 4-bit frame count which is used to tag the video signal in each data cell with the count of the frame number out of each n revolutions of the scanning antenna of the radar system in which that video signal occurred. The data modify logic frame and history processing unit 38 examines the contents of every memory location once each antenna scan. Each location is addressed with the 18-bit value received from the scan converter 30. The data modify logic unit 38 thus stores in memory 40, in real time at each memory location three items of information: (1) the highest value of video occurring in each data cell during the most recent n scans of the antenna (n=16 in the present example); (2) the number of antenna revolutions during the last 16 scans of the antenna in which the video level exceeded a predetermined threshold level; (3) the last frame count on which the video level exceeded the threshold. These three stored parameters are identified, respectively, as follows: (1) highest video value (4-bits in the present example); (2) H-history bits; (3) F-frame tag.

The timing and control of the receipt and entry of the video and address bits and the frame count is performed by the timing and control unit 42 the design of which would be readily appreciated by one of ordinary skill in the art. It is significant to note that no attempt is made to store all of the radar video which is received during the 16 scans of the scanning antenna of the radar system. For a 4-bit value of video and a 512×512 memory, conventional time compression techniques require 512×512×4-bits for each of 16 frames or antenna scans. In the present invention since it is decided that a significant event has occurred only if the video level has exceeded a predetermined threshold level, which preferably exceeds the average value of noise, the total memory required is a 512×512×12 memory (for implementing a 16 frame time compressed display). This is because the present system stores only a 12 bit word at each memory location rather than storing 16 frames of data at each location, i.e. rather than storing 16 4-bit words at each location. To generate a time compressed display, a read frame counter 44 is controlled by timing and control unit 42 similarly as in any time compressed display system. The output frame and history processing unit 46 receives the 4-bit read frame word and decodes the 4-bit frame tag word and the 4-bit history word to determine on what frame counts of the read frame counter the video for each of the 512×512 data cells should be displayed by video display unit 49. For example, if a target was picked up in a cell on write frames 13, 14, 15 and 0, stored in memory 40 would be a frame tag (F) of 0 and the value 4 for history (H). The target will consequently be displayed on read frame counts 13, 14 and 15 and 0 of the read frame counter, generating the same effect as if all four of those frames were stored as in a conventional time compressed display. The write frame counter 44 is a modulo counter that counts from 0 to 15, in the present example, using the pulse from the antenna once around 34 as the clock.

To remove old history bits, a decision is made comparing the current write frame count to the frame count and history bits stored in memory 40 each time the radar sweep comes by each cell in bulk memory 40. It is noted here that the term radar sweep is not the same as antenna revolution and refers rather to the time necessary for receiving the return signal from one pulse of the radar system. If the video received from the current frame for the cell does not exceed the threshold, and the current frame count falls within the values of stored frame count minus the history, then the history bits are decremented by one. This process provides for the clearing out of old data and allows the present invention to function like any time compressed display system. Thus, in decoding the 4-bit video word, the 4-bit frame word and the 4-bit history word, the start frame for the event is taken as frame minus history (F−H) and the end time is frame (F). The decode circuit simply unblanks the video via T.V. formatter 48 at each display cell when the read frame count falls between these time limits.

The present invention illustrated in FIG. 2 has been implemented in 12 separate modules for circuit cards.

Referring to FIGS. 3a and 3b, there is illustrated an overall system block diagram showing the module interconnections. The functional features described with reference to FIG. 2 for each of the separate components illustrated in FIG. 2 are illustrated in FIGS. 3a and 3b by incorporation within each of the blocks illustrated in FIGS. 3a and 3b of the number of the corresponding functional block illustrated in FIG. 2. For instance, the scan converter function of scan converter 30 illustrated in FIG. 2 is performed by the X address generator and Y address generator illustrated in FIGS. 3a and 3b. These X and Y address generators therefore carry the number 30 to correlate their function to the function of scan converter 30 in FIG. 2. Although the illustration of the present invention in FIG. 2 and the description thereof provided above is believed to be sufficient to enable one of ordinary skill in the art to make and use this invention, a further functional description of each of the modules illustrated in FIGS. 3a and 3b is provided below. Further, the details of an actual implementation of the present invention for each of the modules illustrated in FIGS. 3a and 3b is illustrated in FIGS. 4 through 22, inclusive. It is further noted that the "A" numbers appearing in each of the modules in FIGS. 3a and 3b identify the corresponding circuit card illustrated in FIGS. 4 through 22, inclusive. Thus, the analog to digital module illustrated in FIG. 3a contains the circuit card identification "A1" and the details of the analog to digital circuit card are illustrated in FIG. 6, parenthetically identified as the "A1" circuit card. The 12 modules are further described as follows:

Synchro-to-ΔX/ΔY Module, A0

This module (FIGS. 4a, 4b, 4c, 4d, 5a and 5b) receives an 11-bit azimuth word from the synchro-to-digital converter and generates sine and cosine modulated pulse trains corresponding to the change in position along the radar sweep. The nine least significant bits (LSBs) of the azimuth word define an angle between 0° and 90° and are used for addressing the sine and cosine look-up tables. The two most significant bits (MSBs) of the azimuth word define the quadrant and are used to invert the 9-bit azimuth word during quadrant foldover, to provide full 360° coverage.

The cascaded look-up tables convert the 9-bit azimuth input into 16-bit binary values of sine and cosine. Each 16-bit word is latched into storage registers at the start of each radar sweep. These 16-bit sine and cosine words are then used to control the rate of pulse generation by the cascaded rate multipliers for the ΔX and ΔY pulse trains.

The inputs to the rate multipliers include the 16-bit rate word, a 10.237 MHz gated clock (CK), and an enable signal (EN). The rate multipliers are preset with the rate word during radar dead time and are enabled for generating pulse trains at the start of the radar sweep. Each ΔX or ΔY pulse represents a change in position of about 16 yards. The resulting ΔX and ΔY pulse trains are buffered via line drivers, U29A and U29B, for distribution to the X and Y address generator modules.

Sign ΔX and sign ΔY are generated to indicate the direction of travel along the respective X and Y axes. These signals are derived from the two MSBs of the 11-bit azimuth word by detecting the sweep quadrant (U19B, U19C and U19D). Both signals are buffered for distribution to the X and Y address generator modules. Also, sign ΔY is used on the frame and history encoder module to generate a "once around" pulse for indicating a 360° rotation of the radar antenna.

Another function on this module is a power supply controller for sequencing the turn-on and turn-off of the dc power supplies (−15, −5, +5, +12 and +15 volts). This controller energizes the power supplies in the following sequence: the +5 volt supplies; the triple supply of −5/−15/+15 volts; the +12 volt supply. The turn-off sequence is done in reverse order. This sequence is used to protect the MK 4116 memory chips, which might be damaged if the 12 volt supply were applied first.

Analog-to-Digital Module, A1

This module (FIGS. 6a and 6b) conducts limited analog processing and converts the radar video signal into a 4-bit digital word. The analog processing includes dc restoration, gain control, peak detection, and low-pass filtering. The dc restorer circuit clamps the baseline of the video signal to signal ground via Q1A and CR1A. Gain control is provided via potentiometer R5A.

A 2.5 X inverting amplifier is included to match the full-scale input range of the analog-to-digital converter. The output of the amplifier is buffered by U2 and sampled by the peak/average detector. The voltage on storage capacitor C7 is buffered by U3 and converted into a digital word on control of the start-of-conversion (SOC) pulse. The voltage on C7 is reset by the end-of-conversion (EOC) pulse.

The 4-bit video word represents one of 16 gray shades. A 3-bit range mark word is added to the 4-bit video word via NOR gates U8A, U8B, U8C, and U8D. The resulting video word is then buffered for distribution to the prememory modules.

Sweep Timing Control Module, A3

This module (FIGS. 7a, 7b, 7c, 7d, 7e and 7f) generates the sweep timing signals, sampling strobes, and range marks for controlling the radar interface module set: snychro-to-ΔX/ΔY module, analog-to-digital module, X and Y address generator modules, and prememory modules. Sweep timing consists of the following synchronizing signals: start-of-sweep (SOS), end-of-sweep (EOS), load counters (LC), and prememory select (SEL). These signals synchronize the generation of sweep addresses and the conversion of radar video with the start of each radar sweep.

SOS is generated by the leading edge of radar trigger and indicates the beginning of a new radar sweep. This control signal is used to clear the range counter (U30, U42, U41, U40, and U29), to clear the "LC" flip flop (U5A), and to latch the sine/cosine words into storage registers.

EOS is generated approximately 100 microseconds before the next SOS pulse. This is done by storing the maximum range count between consecutive SOS pulses, then detecting the range count that occurs about 100 microseconds before the maximum range count. The EOS pulse is used to preset the "LC" flip flop (U5A).

The output of the "LC" flip flop (U5A) is a 100-microsecond LC pulse that occurs during radar dead time. This pulse is used to toggle the "SEL" flip flop (U5B), to preset the address counters on the X and Y address generator modules, and to reset the rate multipliers on the synchro-to-ΔX/ΔY module.

The output of the "SEL" flip flop (U5B) controls the time multiplexing operation of the two prememory modules and the selection of prememory write enable (PMWE) strobes. Prememory write enable strobes are generated from either end-of-conversion (EOC) or prememory read/write (PM R/W). They reflect the different data rates during alternate radar sweeps.

Start-of-conversion (SOC) is initiated whenever the sweep changes position in the display matrix. This pulse is generated by a change in the LSB of either the 9-bit X or 9-bit Y sweep address. The SOC pulse initiates one conversion cycle for the analog-to-digital module. It also latches the X/Y sweep addresses into pipeline registers (U16, U17, and U18), and latches the range mark amplitude into storage register U9.

Address Generator Modules, A4, A5

There are two identical address generator modules (FIGS. 8a, 8b, 8c, 8d, 9a, 9b, 9c and 9d): A4 generates the X sweep address; A5 generates the Y sweep address. Both address generator modules operate in parallel and identically. In the present example 8 bits are used for each X and Y address along with one sign bit.

The purpose of these modules is to receive the ΔX/ΔY clocks, to generate a 17-bit address count, and to provide a range-scaled 9-bit sweep address. The ΔX/ΔY pulse train and sign ΔX/ΔY are buffered for controlling a 17-bit address counter. This counter consists of five cascaded up/down binary counters (U4, U5, U6, U7, and U8). The other inputs to this counter are a load counter (LC) strobe and a 17-bit offset word.

The 17-bit address counter is preset to the offset coordinate by the LC strobe during radar dead time. The LC strobe enables the address counter to start counting at start-of-sweep. ΔX/ΔY clocks the address counter and sign ΔX/ΔY controls the up/down direction of counting. The resulting 17-bit address word is buffered and distributed to the range scaling and off-screen detection circuits.

Range scaling generates a 9-bit sweep address from the 17-bit address count. This is done by selecting the appropriate group of 8 bits from the address counter's 16 LSBs. The address counter MSB is always used as the sweep address sign bit. This data selection process is done in two stages to accommodate the nine different range scales.

Off-screen detection is accomplished by examining the unused bit field between the address counter's MSB and the selected range scale's eight bits. If all the bits in this field are identical and equal to the inverted MSB, an on-screen flat is generated.

For example, on a 32-mile range scale, the following selection will occur:

Buffered counter outputs A4 to AA1 will be selected for the X0/Y0 to X7/Y7 sweep address LSBs.

Buffered counter outputs AS will be selected for the XS/YS sweep address MSB.

Buffered counter outputs A12 to A15 will be examined for a matched condition with AS. If a matched condition occurs, an on-screen flat is generated. An off-screen condition from either the A4 or A5 module will cause the range scaling data selectors (U34 and U35) to output a zero sweep address for both X and Y.

Prememory Modules, A6, A7

There are two identical prememory modules (FIGS. 10a, 10b, 10c, 10d, 11a, 11b, 11c, 11d) that operate in a time multiplex mode. These modules provide temporary storage for the incoming radar data and transfer the data out upon demand by the memory timing. Each prememory module contains a 1024×22 bit bipolar memory, a 10-bit address counter, and two groups of data selectors. These two modules operate alternately: as one receives incoming data, the other transmits outgoing data. Just before the start of the next sweep, the modules exchange operations so that the receiving module becomes the transmitter and the transmitting module becomes the receiver.

The 10-bit address counter is cleared by the LC strobe during radar dead time, and is clocked by the prememory write enable (PMWE) clock. The 10-bit address is heavily buffered to drive the 22 bipolar memory chips.

The two groups of data selectors are divided into input selectors and output selectors. The input selectors select incoming radar data for data storage during receive operations and select "zero" data during transmit operations. The output selectors conduct the multiplexing of the prememory outputs for the memory. The outgoing video data are transmitted to the frame and history encode module, and the outgoing sweep addresses are sent to the address select module.

Address Select Module, A8

This module (FIGS. 12a, 12b, 12c, 12d, 13a, 13b, 13c, and 13d) generates an 18-bit test address for manual operations, conducts the time multiplexing of sweep, display and test addresses into a 7-line address bus, and provides the control for a persistence feature with a variable decay rate.

An 18-bit test address is generated by two 9-bit counters: X cursor counter and Y cursor counter. Each counter is independently controlled by use of two toggle switches on the control panel: X CLK/Y CLK and X UP (Y UP)/X DWN(Y DWN). This test address provides manual access and entry of data into any area of memory.

The time multiplexing process is done in several steps. The first step is to select a write address from either the sweep address inputs or from the cursor counters. This write address is used during memory write cycles for randomly accessing one memory cell.

The second step is to interweave display addresses wth the write addresses during read and write memory cycles. The display address is used to read 16 consecutive memory cells during each read cycle. This block transfer is done 32 times during each TV line. Therefore, only 14 bits of addressing are required during these read cycles. The last step of address multiplexing is required to format the 14-bit memory address onto the 7-line address bus. This is done by dividing the memory address into a 7-bit row word and a 7-bit column word. Inverting line drivers are provided for distributing the address bus to the 12 memory modules.

The 4 LSBs of the write address are multiplexed with a 4-bit persistence address and are buffered for distribution to the memory modules. This 4-bit address is decoded on each memory module for generating a write enable strobe to the appropriate RAM chip. The persistence address is selected only during persistence erase cycles. This occurs when the scan converter is operated in the variable decay mode. The normal read cycles are converted into read-modify-write cycles, and the video level at each display cell is decreased by one gray shade. This process takes 16 TV frames (0.53 second) to access the 256k display cells and to decrease the screen brightness by one gray shade.

Timing and Control Module, A9

This module (FIGS. 14a, 14b, 14c, 14d, 14e, 14f, 15a, 15b, and 15c) synchronizes the operation of all other modules with the timing of the TV raster. A crystal oscillator produces a 20.475 MHz master clock for clocking the TV sync generator and for advancing the 11-bit horizontal position counter. The horizontal line time is locked to this frequency such that 1300 clock pulses are counted per horizontal line. Various control signals are generated by detecting specific counts or count multiples along the horizontal line. Each memory cycle is 16 clock periods long and each horizontal line is divided into 81 full memory cycles.

The end-of-line signal indicates the last full memory cycle in the horizontal line and clears the horizontal position counter just before the start of the next line. Flip-flop U46A is cleared at count 1296, then is set by the leading edge of horizontal drive.

The read enable signal enables the time multiplexing of read and write addresses and enables the stealing of memory cycles for read cycles. Flip-flop U46B is set at count 236, then is cleared at count 1260.

The read cycle signal steals memory cycles for read operations. The first 15 memory cycles in each horizontal line are dedicated to write operations. The first read cycle starts at count 240 and lasts for the next 16 counts. This is followed by alternating write and read cycles till the end of line. There are 32 read cycles during each horizontal line.

The shift/load and shift lock signals control the block transfer of data from the memory into parallel-to-serial shift registers. First a block of 16 words is read out of memory and loaded into the shift register. Then the words are shifted out at a serial data rate of 10.237 MHz. The first load command occurs at count 256 and is repeated every 32 counts. There are 32 shift/load pulses during each horizontal line.

The read/write address select signal controls the time multiplexing of read and write addresses. Flip-flop U27A is toggled every 16 counts beginning at count 236.

The display blank signal enables the display of video during active line time for 1024 counts and blanks out the display during the remaining time. Flip-flop U27B is set at count 256 and cleared at count 1280. This signal also enables 512 shift clock pulses to be generated during this time.

The prememory output transfer flip-flop controls the transfer of data from the prememories to the memory. The load strobe (LD STB) signal clocks the prememory outputs into data latches on the address select module and on the frame and history encode module. The LED strobe (LED STB) clocks memory data into the LED indicators on the control panel.

Row address strobe (RAS), row/column address select (RW/CM), column address strobe (CAS), latch strobe (Lat STB), and write enable (WE) are generated during each memory cycle for synchronizing the read-modify-write functions within the 781-nanosecond cycle time. Write enable is inhibited during read cycles and is enabled during write cycles and persistence erase cycles. FIG. 16 shows a typical 16-count memory cycle. RAS goes active low at count 0 and initiates the start of a memory cycle. It also strobes the 7-bit row address into each 16k RAM chip. Then, on count 1, the row/column address select puts the 7-bit column address into the address bus. CAS goes active low at count 3 and strobes the 7-bit column address into each 16k RAM chip. At this time, since WE is in a read state, data appear at the 16k RAM output after the 135-nanosecond access time. These data are strobed into buffer registers by latch strobe at count 6. This completes the read portion of the memory cycle. The next 195 nanoseconds are dedicated for data processing during the modify portion of the memory cycle. The write portion starts with WE going active low at count 10. Data into the 16k RAM chip must be stable for the next 55 nanoseconds to insure that the correct data are strobed into memory. Lastly, at count 13, RAS, CAS, RW/CM, and WE are reset in preparation for the next memory cycle.

Another function of this module is to generate the X/Y display address and to detect its coincidence with the X/Y test address. The Y display address is generated by an 8-bit counter and a set-clear flip-flop. The flip-flop, U32B, generates the Y address LSB, YRO, by detecting odd-field or even-field pulses from the TV sync generator. The other Y address bits are generated by counting horizontal drive pulses in each TV field. This counting process is delayed 5 lines after the trailing edge of vertical drive to provide a vertically-centered display.

A Y cursor coincidence pulse is generated when the 9-bit Y display address is identical to the 9-bit Y test address. This coincidence pulse is used in the video sum module for unblanking a horizontal cursor on the TV display.

The X display address is generated by subtracting an offset value from the horizontal position count. The resulting 5-bit address is sent to the address select module. The X cursor coincidence pulse is generated by comparing the outputs of the X position counter with the 9-bit X test address. This coincidence pulse is used for unblanking a vertical cursor on the TV display.

Frame and History Encoder Module, A10

This module (FIGS. 17a, 17b, 17c, 17d, 17e, and 17f, 18a, 18b, and 18c,) contains the input processing circuits for encoding the TIESPAD data. This requires comparing the new data with past history at each display cell, then determining the condition of eight possible states:

| Processing State | Input Conditions | Data Into Memory |
|---|---|---|
| 1. A new hit | NV≧T CF≠F H≠15 | PV CF H+1 |
| 2. A mulltiple hit on same frame | NV≧T CF=F H≠15 | PV CF H |
| 3. Landmass/saturated history | NV≧T H=15 | PV CF H |
| 4. Status quo | NV<T CF≠F−0 H≠0 | OV F H |
| 5. No hits/history decrement | NV<T CF=F−0 H≠0 | OV F H−1 |
| 6. No hits/erase video | NV<T CF=F H=0 | NV CF H |
| 7. No hits/old noise | NV<T CF≠F H=0 NV<OV | OV F H |

| Processing State | Input Conditions | Data Into Memory |
| --- | --- | --- |
| 8. No hits/new noise | NV<T CF≠F H=0 NV≧OV | NV CF H |

Legend:
NV — New video
T — Video threshold
CF — Current frame numer
F — Old frame number
H — Old history number
OV — Old video
PV — Peak video Each state requires that a specific type of video, frame, and history data be loaded back into memory. All this processing is done during the 195-nanosecond modify time of each write cycle.

New video is received from prememory A and latched into register U7, where it is stored for the full 781-nanosecond memory cycle. This new video is compared with the video threshold word to determine whether a target or noise is at the display cell. This new video is also compared with the old video from memory to determine the largest value of video between the two words.

Each 360° revolution of the radar antenna generates via the sync-to-ΔX/ΔY module a once-around pulse that increments a 4-bit current frame counter. The once-around pulse occurs as the radar antenna swings across the +X axis from the first to the fourth quadrant. The current frame count provides a time reference for all hits occurring in one 360° rotation of the antenna. The current frame count is compared with the old frame number to determine whether there is a "multiple hit" condition or a "no hit/erase video" condition. The current frame count is also compared with the start frame number (F-H) to determine whether there is a "no hit/history decrement" condition.

Meanwhile, during the 195-nanosecond modify time of each write cycle, old video, frame, and history data are received from memory via buffer drivers U24, U25, and U13. This 12-bit data word represents the past history at the display cell and is modified before loading data back into memory.

When the MODE SELECT switch is in any of the simple scan converter modes, the TIESPAD processing routines are disabled and the selection of processed video is controlled from the control panel. When the MODE SELECT switch is in the TIESPAD position, the video select gates are controlled by the processing states and not by the video select code from the control panel.

The video selectors (U12, U11, U10 and U9) select one of six types of video data for writing into memory: peak video, new video, old video, decremented video, zero video, and test video. Peak video is the larger value between the old video and the new video. Decremented video is selected during persistence erase cycles and is generated by subtracting one gray shade from the old video. Zero video is used to clear the video portion of memory. Test video provides the means for manual entry of video data into memory.

The frame selectors (U51, U52, U39, and U40) select one of three types of frame data for writing into memory: current frame, old frame, and test frame. Current frame represents the new frame number associated with the last hit.

The history selectors (U53, U54, U41 and U42) select one of six types of history data for writing into memory: old history, zero history, history of 1, incremented history, decremented history, and test history. Incremented history is generated by adding a value of one to the old history. Decremented history is generated by subtracting a value of one from the old history.

TV Sync Driver Moudule, A11

This module (FIG. 19) contains the level shifting and driver circuits for generating RS-170 TV sync signals for use by other TV processing equipment. This requires translation of 0 volt and +5 volt signal levels to −4 volt and 0 volt signal levels, respectively. In addition, these 4 volt sync signals must have enough drive to appear across a 75 ohm load impedance with a source impedance of 75 ohms. These four TV sync signals are horizontal drive, vertical drive, composite sync and composite blank. Each output signal is wired to a BNC connector on the right side panel.

Frame and History Decoder Module, A12

This module (FIGS. 20a, 20b, 20d and 20e) contains the output processing circuits for decoding the TIESPAD data. The 4-bit read frame counter, U13, provides the time reference for replaying the 16 frames of history and provides for a repeat rate that is selectable at the control panel. The video at a display cell is unblanked only when the read frame count is within the start frame (F-H) and last frame (F) limits. Otherwise, the video is blanked out when the read frame count is outside these limits and during retrace times.

The on frame enable signal controls the unblanking of video by enabling the video gating circuits (U6A, U6B, U7A, and U7B). This enable signal is generated when the read frame count falls into one of three brackets: inside bracket, outside bracket, and zero history. The inside bracket condition is used when F is greater than H such that the start frame, F-H, is a positive number. The outside bracket condition is used when F is less than H such that the start frame is a negative number. And the zero history condition is used when H=0.

The module also provides for a moving target indicator (MTI) mode by recognizing that large history values are related to very slow or stationary targets. Therefore, landmass and clutter can be eliminated by blanking out the video that corresponds with history valves above a history threshold. This history threshold is controlled by the HISTORY DECODE lever switch on the control panel. U16 compares the history data with the history threshold and outputs an enable pulse for the on frame and MTI enable gates.

When the MODE SELECT switch on the control panel is in any of the simple scan converter modes, the TIESPAD decoding circuits are disabled and the video data are always allowed thru the video gating circuits, unaffected by the on frame detect and MTI enable gates.

Video Sum Module, A13

This module (FIGS. 21a and 21b) converts the 4-bit video words into an analog signal, mixes in X cursor and Y cursor, mixes in composite sync and composite blank, and buffers the composite video signal. Adjustable gain controls are provided for setting the cursor, sync, and blank levels. An 8-bit digital-to-analog converter is ued in this 4-bit configuration to yield the full output swing of zero to +1 volt.

X cursor coincidence and Y cursor coincidence are mixed via NOR gate U2A. A CURSOR (on/off) switch is located on the control panel for enabling the display of X and Y cursors.

Main Memory Module

Each memory module (FIGS. 22a, 22b, 22c, 22d and 22e) contains a 256k×1 RAM array, a 4-to-16 line decoder, a 16-to-1 line data selector, and a 16-bit parallel-to-serial shift register. On-board buffering is provided for distribution of addresses and strobes to each of the 16 RAMs. In addition, buffer registers are included to latch the data from the RAM outputs.

During memory write cycles and persistence erase cycles only one memory cell is read out and written into. The 4-bit X address selects one of the 16 RAM chips for sending data out, then generates an active write enable pulse to that selected RAM chip for writing data in.

During memory read cycles, the outputs from all 16 RAM chips are loaded into the 16-bit shift register. This shift register is clocked by a 10.237 MHz clock and is loaded once every 16 clock pulses. No write enable signals are generated for this memory cycle.

Obviously many modifications and variations of the present invention are possible in the light of the above teachings. It is therefore to be understood that within the scope of the appended claims the invention may be practiced otherwise than as specifically described.

What is claimed is:

1. In a radar display system for a radar system including a scanning antenna and means connected to said antenna for generating a video return signal data value for each of n video data cells corresponding to the area scanned during each complete revolution of said antenna, said radar display system further including a scan converter for converting polar coordinate azimuth and range values from said radar system to rectangular coordinate format and for providing a corresponding unique storage address to each one of said data values, the improvement comprising:
   means connected to said scan converter for determining and storing the highest value of video return signal occurring in each of said n video data cells during a predetermined number of revolutions of said antenna, for determining and storing the number of said predetermined number of antenna revolutions in which the value of said video return signals for each of said n data cells exceeded a predetermined threshold level and for determining and storing the count of said predetermined number of antenna revolutions on which said threshold level was last exceeded for each of said n data cells.

2. The improvement of claim 1 wherein said radar display system further comprises:
   an analog-to-digital converter connected to the input of said determining and storing means for converting each of said video return signal values from analog-to-digital form.

3. The improvement of claim 2 wherein said determining and storing means includes:
   a pre-memory network connected to said scan converter;
   a logic network connected to the output of said pre-memory network; and
   a bulk memory network connected to the output of said logic network.

4. The improvement of claim 3 further comprising:
   a decoder connected to the output of said bulk memory network for selectively decoding the contents of said bulk memory for enabling a time compressed television display.

5. The improvement of claim 1 further comprising:
   a decoder connected to the output of said determining and storing means for selectively decoding the contents of said determining and storing means for enabling a time compressed television display.

6. A method of generating signals for a time compressed display for a radar system which includes a scanning antenna and means connected to said scanning antenna for generating an analog video return signal data value for each of n video data cells corresponding to the area scanned during each complete revolution of said antenna comprising the steps of:
   (a) converting said analog video return signal data values to corresponding video signal digital data values,
   (b) converting polar coordinate azimuth and range position data from said radar system to corresponding rectangular coordinate format,
   (c) generating, using the results of step (b), a rectangular coordinate storage address for each of said digital data values;
   (d) determining and storing the highest video signal digital data value occurring in each of said n video data cells during a predetermined number of revolutions of said antenna;
   (e) determining and storing the number of revolutions during each said predetermined number of revolutions of said antenna in which the value of said video signal digital data values for each of said n video data cells exceeded a predetermined threshold level; and
   (f) determining and storing the count of said predetermined number of antenna revolutions on which said threshold level was last exceeded for each of said n video data cells.

7. The method of claim 6 further comprising the step of:
   (g) selectively displaying the values for each of said n video data cells determined in (d) above on a television display screen in a number of T.V. format display frames equal to the number determined in (e) above during each n T.V. frames displayed.

8. The method of claim 7 further comprising the step of:
   (h) for each of said n video data cells, subtracting the value determined in (f) above from the value determined in (e) above to determine a start frame number; and
   (i) beginning said selective displaying in step (g) above on said display frame having said start frame numbers.

* * * * *